United States Patent
Ohtsubo et al.

(10) Patent No.: US 7,419,029 B2
(45) Date of Patent: Sep. 2, 2008

(54) DRIVER DRIVING POSITION ADJUSTABLE DEVICE OF VEHICLE

(75) Inventors: Tomonori Ohtsubo, Hiroshima (JP); Hiroki Uemura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 416 days.

(21) Appl. No.: 10/968,389

(22) Filed: Oct. 20, 2004

(65) Prior Publication Data

US 2005/0109555 A1 May 26, 2005

(30) Foreign Application Priority Data

| Nov. 20, 2003 | (JP) | 2003-390121 |
| Dec. 1, 2003 | (JP) | 2003-400988 |
| Dec. 4, 2003 | (JP) | 2003-405362 |
| Dec. 19, 2003 | (JP) | 2003-422415 |

(51) Int. Cl.
*B60K 26/00* (2006.01)

(52) U.S. Cl. .......................... 180/326; 180/330; 74/560

(58) Field of Classification Search ............... 180/326, 180/90.6, 330; 296/75, 65.05, 65.08; 74/512, 74/560, 562, 562.5

See application file for complete search history.

(56) References Cited

U.S. PATENT DOCUMENTS

| 3,288,239 A * | 11/1966 | Ristau .......................... 180/78 |
| 4,062,566 A * | 12/1977 | Hensler et al. ............... 280/751 |
| 4,392,546 A * | 7/1983 | Brown et al. ................ 180/326 |
| 4,484,722 A * | 11/1984 | Larson et al. ............... 244/235 |
| 5,199,319 A * | 4/1993 | Fujiu ........................... 74/493 |
| 5,748,473 A | 5/1998 | Breed et al. |
| 6,151,984 A * | 11/2000 | Johansson et al. ............. 74/512 |
| 6,450,530 B1 * | 9/2002 | Frasher et al. ............... 280/735 |
| 6,453,767 B1 * | 9/2002 | Willemsen et al. ............. 74/512 |
| 6,474,728 B1 * | 11/2002 | Mendis et al. .............. 296/204 |
| 6,634,669 B2 * | 10/2003 | Levine ........................ 280/735 |
| 6,830,123 B2 * | 12/2004 | Ohki et al. ................... 180/326 |
| 2002/0033297 A1 * | 3/2002 | Ohki et al. ................... 180/326 |
| 2002/0074785 A1 * | 6/2002 | Levine ........................ 280/735 |

FOREIGN PATENT DOCUMENTS

| JP | 07-096784 | 4/1995 |
| WO | WO 01/64468 A1 | 9/2001 |
| WO | WO 03/078201 A1 | 9/2003 |

OTHER PUBLICATIONS

European Search Report Application No. EP 04 02 7199 dated Jan. 26, 2005.

* cited by examiner

*Primary Examiner*—Christopher Ellis
*Assistant Examiner*—Joseph Rocca
(74) *Attorney, Agent, or Firm*—Studebaker & Brackett PC; Donald R. Studebaker

(57) ABSTRACT

There is provided a driver driving position adjusting device, comprising a movable floor panel adjusting mechanism operative to adjust at least a vertical position of a movable floor panel, an adjusting device operative to adjust at least one of a seat face position of a driver seat, an operating angle of the pedal operated by the leg portion of the driver and a position of a steering, and a driving position adjusting operating device operative to operate the movable floor panel adjusting mechanism and the adjusting device.

Accordingly, the proper driving position and pedal operation can be provided regardless of the body size of driver, by adjusting at least the vertical position of the movable floor panel on which the leg portion of the driver operating the pedal is placed.

18 Claims, 39 Drawing Sheets

PRIOR ART

DRIVER DRIVING POSITION ADJUSTABLE DEVICE OF VEHICLE

BACKGROUND OF THE INVENTION

The present invention relates to a driver driving position adjusting device of a vehicle which is operative to adjust a driving position of a driver on a driver seat.

In general, the layout of a seat 100, a floor panel 101 and an accelerator pedal 102 is designed so as to be suitable for a standard (medium) size of driver M in conventional vehicles as shown in FIG. 37. The seat 100, which comprises a seat cushion 103, a seat back 104 and a headrest 105, is supported by a seat slide (not illustrated) as shown in FIG. 38, so that hip points P11, P12 and P13 of drivers L, M and S sitting on the seat cushion 103 are movable substantially horizontally and longitudinally. However, the accelerator pedal 102 and the floor panel 101 are both fixed.

Herein, this conventional structure has the following two problems.

A large size of driver L with a higher eye point can get a sufficiently clear front view with the drivers' eyes illustrated by a broken line eL in FIG. 37 when sitting on the seat 100. A small size of driver S, however, has a lower eye point and therefore the driver's eyes illustrated by a two-dotted broken line eS in FIG. 37 may be interrupted by a hood 106, thereby providing a difficulty in getting such a clear front view. Particularly, there is a problem that a near view may not be obtained sufficiently.

Meanwhile, the drivers L, M and S operate the accelerator pedal 102, putting their heels on a floor mat 107 which is placed on the floor panel 101. Herein, although there may be no particular problem with the large size of driver L and the medium size of driver M, the small size of driver S may have the following problem. Namely, since the leg of the small size of driver S does not reach the accelerator pedal 102 enough, the above-described operation of the accelerator pedal 102 with the driver's heal on the floor mat 107 may require a toe portion to press the pedal 102. Also, the pedal 102 moves forward as the pedal 102 is pressed. Accordingly, it may be difficult for the small size of driver S to operate the accelerator pedal 102 properly. In order to solve this difficulty, the small size of driver S usually operates the accelerator pedal 102, after keeping the driver's heel away from the floor mat 107.

Further, conventionally, the drivers L, M and S adjust their driving positions themselves to obtain the proper operation of the accelerator pedal 102 and a brake pedal and the clear front view.

In order to solve the above-described problems, a conventional driving position adjusting operating device of a vehicle shown in FIG. 39 had been invented (see Japanese Patent Laid-Open Publication No. 7-96784).

The conventional device shown in FIG. 39 is configured such that a seat 200 is adjustable in a slant direction between its front-and-upper position and its rear-and-lower position and a brake pedal and/or an accelerator pedal 201 are movable substantially horizontally and longitudinally in order to provide a proper positional relationship between the pedal 201 and the seat 200 regardless of the body size of driver.

In this conventional device shown in the figure, the leg of the small size of driver may reach the pedal 201 enough. However, since the pedal 201 is movable only horizontally and longitudinally, the small size of driver still cannot press the center of the pedal properly, putting the heel on a floor mat placed on a floor panel 202 even though the pedal 201 is adjusted in a position (toward the driver) which is illustrated by a solid line in FIG. 39.

SUMMARY OF THE INVENTION

The present invention has been devised in view of the above-described problems, and an object of the present invention is to provide a driver driving position adjusting device of a vehicle which can provide a proper driving position and a proper pedal operation regardless of the body size of driver.

This object is solved by a driver driving position adjusting device of a vehicle according to the present invention of claim 1. Preferred embodiments of the present invention are subject of the dependent claims.

According to the present invention, there is provided a driver driving position adjusting device of a vehicle, comprising a floor panel position adjusting device operative to adjust at least a vertical position of a floor panel on which a leg portion of a driver operating a pedal is placed, an adjusting device operative to adjust at least one of a seat face position of a driver seat, an operating angle of the pedal to be operated by the leg portion of the driver, and a position of a steering, and a driving position adjusting operating device operative to operate the floor panel position adjusting device and the adjusting device.

According to the driver driving position adjusting device of a vehicle of the present invention, since at least the vertical position of the floor panel on which the leg portion of the driver operating the pedal is placed is adjusted and this adjustment is done along with the adjustment of at least one of the seat face position of the driver seat, the operating angle of the pedal operated by the leg portion of the driver, and the position of the steering, the proper driving position and the proper pedal operation can be obtained regardless of the body size of driver.

According to a preferred embedment, the adjusting device comprises a seat position adjusting device operative to adjust the seat face position of the driver, and the driving position adjusting operating device is operative to operate the floor panel position adjusting device and the seat position adjusting device.

Accordingly, the seat face can be adjusted in an upper position and the vertical position of the floor panel can be adjusted upward for the smaller size of driver, whereas the seat face can be adjusted in a lower position and the vertical position of the floor panel can be adjusted downward for the larger size of driver. As a result, regardless of the body size of driver, both the proper driving position and the clear front view can be obtained, and such proper driving position can be obtained even though the longitudinal adjusting distance of the seat is small, and also the proper pedal operation can be obtained by adjusting the vertical position of the floor panel.

According to another preferred embodiment, the floor panel position adjusting device is operative to adjust the vertical position and a panel angle of the floor panel.

Accordingly, since the floor panel position adjusting device adjusts not only the vertical position of the floor panel but also the panel angle of the floor panel, a relative angle between the pedal and the floor panel can be maintained at a substantially constant angle during the vertical movement of the floor panel. Also, even though the size or the heel size of driver's shoes change, such change may be absorbed properly by pressing an appropriate position of the pedal.

According to another preferred embodiment, the driving position adjusting operating device is operative to operate the floor panel position adjusting device and the seat position adjusting device such that the devices are operated together with a specified relationship. The specified relationship may be arranged such that the floor panel is moved upward from its lower position when the seat is moved upward and forward from its lower position, whereas the floor panel is moved downward from its upper position when the seat is moved downward and rearward from its upper position.

Accordingly, since both the floor panel position adjusting device and the seat position adjusting device are operated together by the driving position adjusting operating device, the operation can be simplified and improved.

According to another preferred embodiment, the seat position adjusting device is operative to adjust a height and an angle of a seat face.

Accordingly, since both the height and the angle of the seat face are adjusted, the clear front view and the more proper driving position can be obtained regardless of the body size of driver.

According to another preferred embodiment, the adjusting device further comprises a pedal position adjusting device operative to adjust the operating angle of the pedal operated by the driver.

Accordingly, since the pedal operating angle is adjusted in addition to the seat face position of the driver seat and the vertical position of the floor panel, the proper pedal operation can be provided regardless of the body size of driver.

According to another preferred embodiment, the driving position adjusting operating device is operative to operate the floor panel position adjusting device, the seat position adjusting device, and the pedal position adjusting device such that the devices are operated together with a specified relationship. The specified relationship may be arranged such that the floor panel is moved upward from its lower position and the pedal is rotated around its rotational center toward the driver when the seat is moved upward and forward from its lower position, whereas the floor panel is moved downward from its upper position and the pedal is rotated around its rotational center away from the driver when the seat is moved downward and rearward from its upper position.

Accordingly, since the floor panel position adjusting device, the seat position adjusting device and the pedal position adjusting device are operated together by the driving position adjusting operating device, the operation can be simplified and improved.

According to another preferred embodiment, the floor panel adjusted by the floor panel position adjusting device is moved upward when the seat adjusted by the seat position adjusting device is moved forward and upward.

Accordingly, both the proper driving position and the clear front view can be obtained more properly.

According to another preferred embodiment, the adjusting device comprises the pedal position adjusting device operative to adjust at least the operating angle of the pedal to be operated by the leg portion of the driver, and the driving position adjusting operating device is operative to operate the floor panel position adjusting device and the pedal position adjusting device. Herein, the pedal may be the accelerator pedal and/or the brake pedal.

Accordingly, the floor panel can be adjusted respectively: in an upper position for the small size of driver; in a middle position for the standard size of driver; and in a lower position for the large size of driver. Also, the pedal operating angle can be adjusted at a substantially constant angle regardless of the body size of driver. As a result, since even the leg of the smaller size of driver reach the pedal enough, the driver can sit on the seat properly and the driving position of the driver can be improved greatly. Thus, the operations of the pedal and the steering wheel are improved, and proper views for vehicle side mirrors, providing a narrower view angle, and vehicle meters are obtained as well. Additionally, since the pedal operating angle is adjusted at the substantially constant angle regardless of the body size of driver, the optimization of the driver's leg portion during the pedal operation can be attained.

According to another preferred embodiment, the floor panel position adjusting device is operative to adjust the vertical position and a panel angle of the floor panel. It is preferred that the floor panel angle is adjusted respectively: in a front-high and rear-low state when the floor panel is in the lower position; in a substantially horizontal state when the floor panel is in the middle position; and in a front-low and rear-high state when the floor panel is in the upper position.

Accordingly, since the floor panel position adjusting device adjusts not only the vertical position of the floor panel but also the panel angle of the floor panel, a relative angle between the pedal and the floor panel can be maintained at a substantially constant angle during the vertical movement of the floor pedal. Also, even though the size or the heel size of driver's shoes change, such change may be absorbed properly by pressing the appropriate position of the pedal.

According to another preferred embodiment, the driving position adjusting operating device is operative to operate the floor panel position adjusting device and the pedal position adjusting device such that the devices are adjusted together with a specified relationship. It is preferred that the pedal operating angle is maintained at the substantially constant angle even though the floor panel is adjusted from the lower position to the upper position by way of the middle position.

Accordingly, since the floor panel position adjusting device and the pedal position adjusting device are operated together by the driving position adjusting operating device, the operation can be simplified and improved.

According to another preferred embodiment, the pedal position adjusting device is operative to adjust the operating angle of the pedal and a height of a pedal pressing face.

Accordingly, since both the pedal operating angle and the pedal pressing face height are adjusted, the optimization of the driver's leg portion during the pedal operation can be attained further, and the driver can press the pedal center properly regardless of the body size of driver.

According to another preferred embodiment, the adjusting device further comprises the seat position adjusting device operative to adjust the seat face position of the driver seat.

Accordingly, since the seat face position of the driver seat is adjusted by the seat position adjusting device in addition to the adjustments of the pedal operating angle by the pedal position adjusting device and the vertical position of the floor panel (on which the heel of the driver operating the pedal is placed) by the floor panel position adjusting device, the driving position and the state of the driver's leg portion during the pedal operation can be further optimized. Further, the clear front view can be obtained properly, and therefore the front view of even the smaller size of driver can be prevented from being interrupted by the vehicle hood.

According to another preferred embodiment, the driving position adjusting operating device is operative to operate the floor panel position adjusting device, the pedal position adjusting device, and the seat position adjusting device such that the devices are adjusted together with a specified relationship. The specified relationship may be arranged such that the floor panel is moved upward from its lower position when the seat is moved upward and forward from its lower position, whereas the floor panel is moved downward from its upper position when the seat is moved downward and rearward from its upper position.

Accordingly, since both the pedal position adjusting device and the seat position adjusting device are operated together by the driving position adjusting operating device, the operation can be simplified and improved.

According to another preferred embodiment, the pedal adjusted by the pedal position adjusting device is moved toward the driver when the floor panel adjusted by the floor panel position adjusting device is moved upward from a lower position thereof.

Accordingly, since both the floor panel and the pedal are adjusted so as to be suitable for the large, standard and small size of drivers respectively, both the improvement of driving position and the optimization of driver's leg portion during the pedal operation can be attained regardless of the body size of driver.

According to another preferred embodiment, the adjusting device comprises the seat position adjusting device operative to adjust the seat face position of the driver seat and the pedal position adjusting device operative to adjust the operating angle of the pedal operated by the leg portion of the driver; and the driving position adjusting operating device is operative to adjust the seat, pedal and floor panel such that the driver is moved along a specified arc having a center thereof which corresponds to a rotational center of the pedal under a state where a specified driver position is maintained, and is operative to operate the floor panel position adjusting device and the pedal position adjusting device such that the devices are adjusted together with a specified relationship.

The above-described pedal may be configured so as to be either one or all of the accelerator pedal, brake pedal and clutch pedal. It is preferred that the above-described floor panel is configured so as to be a movable floor panel which is separate from an existing part of floor panel which is fixed. Also, it is preferred that the above-described specified relationship is arranged such that the pedal is moved around its rotational center toward the driver when the floor panel is moved upward from its lower position.

Accordingly, the seat face and the floor panel can be adjusted in their upper positions and the pedal operating angle can be adjusted so as to be suitable for the small size of driver, the seat face and the floor panel can be adjusted in their lower positions and the pedal operating angle can be adjusted so as to be suitable for the large size of driver, and the seat face and the floor panel can be adjusted in their middle positions and the pedal operating angle can be adjusted so as to be suitable for the standard size of driver.

As a result, regardless of the body size of driver, both the proper driving position and the clear front view, even for the small size of driver, can be obtained, and such proper driving position can be obtained even though the longitudinal adjusting distance of the seat is small, and also the proper pedal operation can be obtained by adjusting the floor panel. Additionally, since the pedal operating angle, floor panel position and seat face position are adjusted, optimization of the leg-portion angle and the pedal operating direction of the driver operating the pedal can be attained.

The difference of body size of the drivers is mainly expressed to the difference of the total length of the thighs and the lower legs (i.e., the difference of length of the legs). Accordingly, the angle between the thigh and lower leg of driver and the operating direction to press the pedal face by the driver who sits on the seat with legs being upward-joint bent depend on the body size of the driver sitting on the seat. Herein, since the seat face position and the pedal operating angle are adjusted respectively by the seat position adjusting device and the pedal position adjusting device, the both (the seat face position and the pedal operating angle) can be adjusted so as to be suitable for the driver's body size. As a result, the optimization of the leg-portion angle and the pedal operating direction of the driver operating the pedal can be attained, and the proper pedal operation can be obtained regardless of the body size of driver.

Additionally, since the seat, pedal and floor panel are adjusted such that the driver is moved along the specified arc having the center thereof which corresponds to the rotational center of the pedal under the state where the specified driver position (comfortable position from the human engineering standpoint) is maintained, the comfortable driving position can be always provided to the driver. Further, since both the pedal position adjusting device and the floor panel position adjusting device are operated together by the driving position adjusting operating device, the operation can be simplified and improved.

According to another preferred embodiment, the specified relationship is arranged such that the floor panel adjusted by the floor panel position adjusting device is moved upward from the lower position thereof when the pedal adjusted by the pedal position adjusting device is moved around the rotational center of the pedal toward the driver.

Accordingly, the leg of even the small size of driver can reach the pedal enough to provide the proper driving position. This proper driving position can also improve the operation of pedal and steering wheel and provide the driver with a proper sitting. Thus, proper views for vehicle side mirrors, providing the narrower view angle, and vehicle meters are obtained as well.

According to another preferred embodiment, the position of the pedal is adjusted by the pedal position adjusting device in relation to the seat position adjustment of the seat position adjusting device.

Accordingly, since the seat face position and the pedal operating angle are adjusted in relation to each other, further optimization of the leg-portion angle and the pedal operating direction of the driver operating the pedal can be attained. Namely, when the driver is the smaller-size one, the seat face is adjusted in the upper position and also the pedal operating angle is adjusted in relation to this, thereby providing a proper operation state where the pedal is pressed down from above. While, when the driver is the larger-size one, the seat face is adjusted in the lower position and also the pedal operating angle is adjusted in relation to this, thereby providing a proper operation state where the pedal is pressed in a proper direction. Also, further clear front view can be provided even to the smaller size of driver by the adjustment of seat position.

According to another preferred embodiment, the pedal adjusted by the pedal position adjusting device is moved toward the driver when the seat adjusted by the seat position adjusting device is moved forward and upward from a rear-and-lower position thereof.

Accordingly, further optimization of the leg-portion angle and the pedal operating direction of the driver operating the pedal can be attained.

According to another preferred embodiment, the position of the floor panel is adjusted by the floor panel position adjusting device in relation to the seat position adjustment of the seat position adjusting device.

Accordingly, the seat face position and the floor panel position are adjusted in relation to each other. Since particularly the floor panel position is adjusted, the leg of even the small size of driver can reach the pedal enough to provide the proper pedal operation. Also, since the seat face position is adjusted, sufficiently clear front view can be provided even to the small size of driver.

According to another preferred embodiment, the floor panel adjusted by the floor panel position adjusting device is moved upward from the lower position when the seat adjusted by the seat position adjusting device is moved forward and upward from the rear and lower position.

Accordingly, both the proper driving position and the clear front view can be obtained further properly.

According to another preferred embodiment, the pedal position adjusting device is operative to adjust the operating angle of the pedal and the height of pedal pressing face.

Accordingly, the height of pedal pressing face can be adjusted respectively by the pedal position adjusting device: in the lower position for the large size of driver with long legs; in the upper position for the small size of driver with short legs; and in the middle position for the standard size of driver. Thus, since the height of pedal pressing face is adjusted in addition to the adjustment of pedal operating angle, the pedal operation can be further improved, enabling the driver to press the pedal center.

According to another preferred embodiment, the floor panel position adjusting device is operative to adjust the vertical position and the panel angle of the floor panel.

Accordingly, since the floor panel position adjusting device adjusts not only the vertical position (i.e., height) of the floor panel but also the panel angle of the floor panel, the relative angle between the pedal and the floor panel can be maintained at the substantially constant angle during the vertical movement of the floor pedal. Also, even though the size or the heel size of driver's shoes change, such change may be absorbed properly by pressing the appropriate position of the pedal (see the pedal center).

According to another preferred embodiment, the seat position adjusting device is operative to adjust an angle, a longitudinal position and a vertical position of seat face of the driver seat.

Accordingly, the seat face can be adjusted respectively by the seat position adjusting device: in the front-and-upper position for the small size of driver; in the rear-and-lower position for the large size of driver; and in the middle position for the standard size of driver. Thus, since the longitudinal position and the vertical position of the seat face are adjusted in addition to the seat face angle and the pedal operating angle, further optimization of the leg-portion angle and the pedal operating direction of the driver operating the pedal can be attained, and the clear front view can be provided regardless of the body size of driver, even to the small size of driver.

According to another preferred embodiment, the driving position adjusting operating device is operative to operate the floor panel position adjusting device, the seat position adjusting device, and the pedal position adjusting device such that the devices are adjusted together with a specified relationship. The specified relationship may be arranged such that the floor panel is moved upward from its lower position and the pedal is rotated around the rotational center toward the driver when the seat is moved upward and forward from its lower position, whereas the floor panel is moved downward from its upper position and the pedal is rotated around the rotational center away from the driver when the seat is moved downward and rearward from its upper position.

Accordingly, since the floor panel position adjusting device, the seat position adjusting device, and the pedal position adjusting device are operated together by the driving position adjusting operating device, the operation can be simplified and improved.

According to another preferred embodiment, the adjusting device comprises a steering position adjusting device operative to adjust the position of the steering, and the driving position adjusting operating device is operative to operate the floor panel position adjusting device and the steering position adjusting device.

It is preferred that the above-described floor panel is configured so as to be the movable floor panel which is separate from the existing part of floor panel which is fixed. Also, the above-described pedal may be configured so as to be at least one of the accelerator pedal, brake pedal and clutch pedal.

Accordingly, the floor panel can be adjusted respectively: in the upper position for the small size of driver; in the lower position for the large size of driver; and in the middle position for the standard size of driver, so that respective drivers can operate the pedal with their proper leg-portion angles. In addition to this, the steering position can be adjusted according to the body size of driver.

As a result, the proper driving position can be obtained regardless of the body size of driver. Particularly, the optimization of the leg-portion angle (angles of thighs, lower legs, and feet) and the arm-portion angle (angles of upper arms, lower arms, and hands) can be attained.

According to another preferred embodiment, the steering position adjusting device is operative to adjust the steering position such that the steering is moved around the rotational center of the pedal.

Accordingly, the positional relationship between the drivers' arm portion and the steering wheel can be made proper regardless of the body size of driver, maintaining the proper driving position.

According to another preferred embodiment, the floor panel position adjusting device is operative to adjust the vertical position and the panel angle of the floor panel.

Accordingly, since the floor panel position adjusting device adjusts not only the vertical position (i.e., height) of the floor panel but also the panel angle of the floor panel, the relative angle between the pedal and the floor panel can be maintained at the substantially constant angle during the vertical movement of the floor pedal. Also, even though the size or the heel size of driver's shoes change, such change may be absorbed properly by pressing the appropriate position of the pedal (see the pedal center).

According to another preferred embodiment, the driving position adjusting operating device is operative to operate the floor panel position adjusting device and the steering position adjusting device such that the devices are adjusted together with a specified relationship.

Accordingly, since both the floor panel position adjusting device and the steering position adjusting device are operated together by the driving position adjusting operating device, the operation can be simplified and improved.

According to another preferred embodiment, the specified relationship is arranged such that the floor panel adjusted by the floor panel position adjusting device is moved upward from the lower position when the steering wheel of steering adjusted by the steering position adjusting device is moved upward.

Accordingly, further optimization of the leg-portion angle of the driver operating the pedal and the arm-portion angle of the driver operating the steering wheel can be attained.

According to another preferred embodiment, the steering position adjusting device is operative to adjust the position and the angle of the steering.

Accordingly, since not only the steering position but also the steering angle are adjusted, the operation of steering wheel can be further improved.

According to another preferred embodiment, the adjusting device further comprises the pedal position adjusting device operative to adjust the operating angle of the pedal operated by the driver.

Accordingly, since the pedal operating position is adjusted in addition to the adjustment of floor panel position, the leg of even the small size of driver can reach the pedal enough to provide the proper driving position. This proper driving position can also improve the operation of pedal and steering wheel and provide the driver with the proper sitting. Thus, proper views for vehicle side mirrors, providing the narrower view angle, and vehicle meters are obtained as well.

According to another preferred embodiment, the adjusting device further comprises the seat position adjusting device operative to adjust the seat face position of the driver seat.

Accordingly, the seat face position of the driver seat is adjusted by the seat position adjusting device in addition to the adjustments of the floor panel vertical position by the floor panel position adjusting device and the steering position by the steering position adjusting device, even the small size of driver can operate the pedal properly and the clear front view of the driver can be obtained.

According to another preferred embodiment, when the seat adjusted by the seat position adjusting device is moved forward and upward from the rear-and-lower position, the floor panel adjusted by the floor panel position adjusting device is moved upward from the lower position and the pedal adjusted by the pedal position adjusting device is moved around the rotational center of the pedal toward the driver. The movement of the pedal around the rotational center means the both adjustments of the pedal operating position and the pedal operating angle.

Accordingly, the seat face and the floor panel can be adjusted in their upper positions and the pedal operating position and angle can be adjusted so as to be suitable for the small size of driver, the seat face and the floor panel can be adjusted in their lower positions and the pedal operating position and angle can be adjusted so as to be suitable for the large size of driver, and the seat face and the floor panel can be adjusted in their middle positions and the pedal operating position and angle can be adjusted so as to be suitable for the standard size of driver.

As a result, regardless of the body size of driver, both the proper driving position and the clear front view, even for the small size of driver, can be obtained, and such proper driving position can be obtained even though the longitudinal adjusting distance of the seat is small, and also the proper pedal operation can be obtained by adjusting the floor panel. Additionally, since the pedal operating position and angle, floor panel position and seat face position are adjusted, optimization of the leg-portion angle and the pedal operating direction of the driver operating the pedal can be attained. Further, optimization of the arm-portion angle of the driver operating the steering wheel can be attained by the adjustment of steering position.

The difference of body size of the drivers is mainly expressed to the difference of the total length of the thighs and the lower legs (i.e., the difference of length of the legs). Accordingly, the angle between the thigh and lower leg of driver and the operating direction to press the pedal face by the driver who sits on the seat with legs being upward-joint bent depend on the body size of the driver sitting on the seat. Herein, since the seat face position and the pedal operating position and angle are adjusted respectively by the seat position adjusting device and the pedal position adjusting device, the both (the seat face position and the pedal operating position and angle) can be adjusted so as to be suitable for the driver's body size. As a result, the optimization of the leg-portion angle and the pedal operating direction of the driver operating the pedal can be attained, and the proper pedal operation can be obtained regardless of the body size of driver.

Other features, aspects, and advantages of the present invention will become apparent from the following description of the invention which refers to the accompanying drawings.

DETAILED DESCRIPTION OF THE INVENTION

Figure 1:
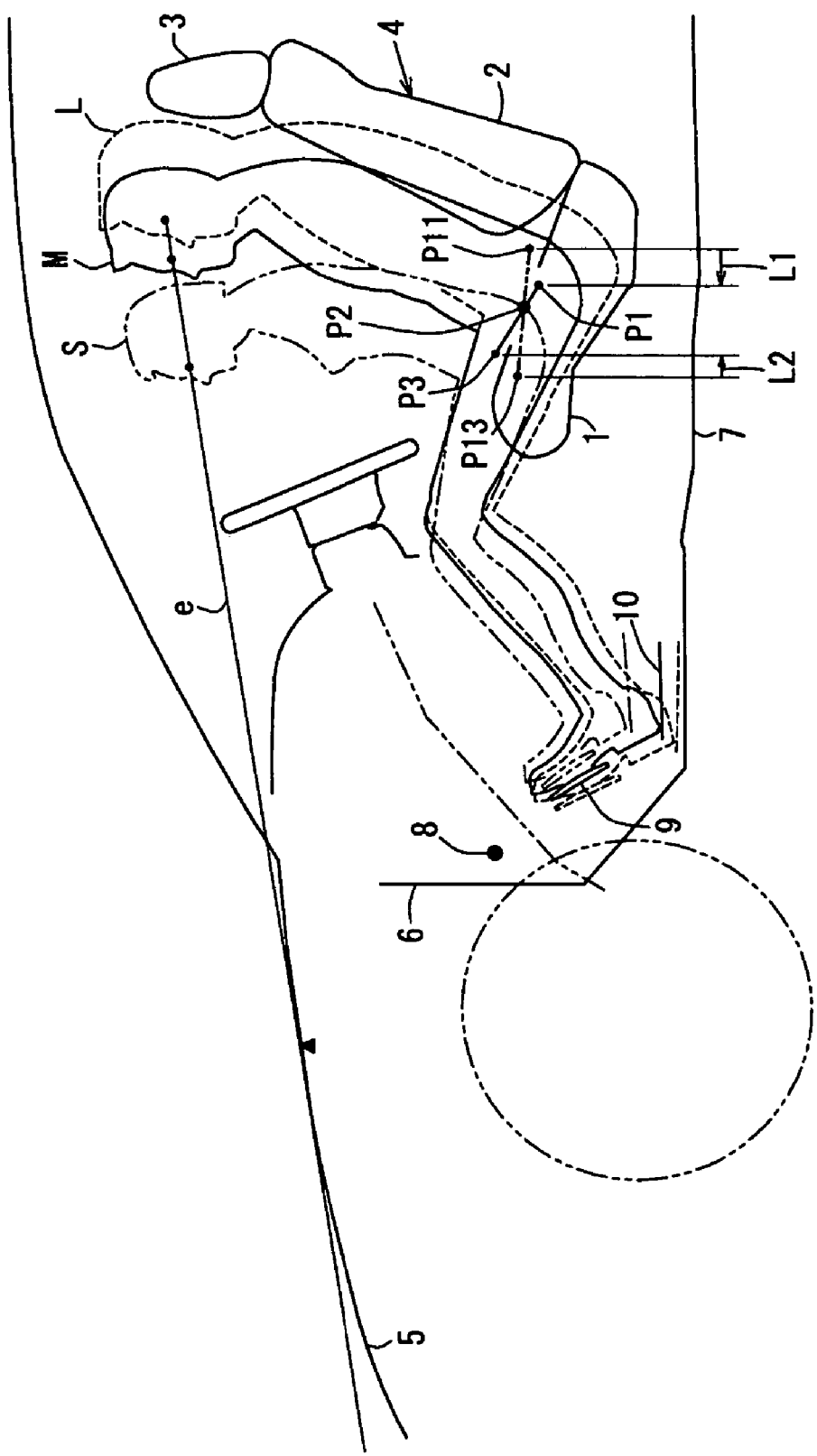
FIG. 1 is a side view showing a driver driving position adjusting device of a vehicle according to the present invention.

Preferred embodiments of the present invention will be described referring to the accompanying drawings. It should be understood that even though embodiments are separately described, single features thereof may be combined to additional embodiments.

The figures show a driver driving position adjusting device of a vehicle. First, a abstract of its basic structure will be described referring to FIGS. 1 through 4.

In FIGS. 1 through 4, a reference character L denotes a large size of driver, a reference character M denotes a standard (medium) size of driver, and a reference character S denotes a small size of driver. The drivers L, M and S sit on a seat (driver seat) 4 including a seat cushion 1, a seat back 2 and a headrest 3.

A reference numeral 5 denotes a hood, a reference numeral 6 denotes a dash lower panel (dash panel), and a reference numeral 7 denotes a floor panel (so-called base floor). At the side of the dash lower panel 6 is provided an accelerator pedal 9 as a pedal which is movable around a rotational center 8. Although the floor panel 7 is fixed, there is provided a movable floor panel 10 at a portion, on which a leg portion (see a heel) of the drivers L, M and S operating the accelerator pedal 9 and a brake pedal 51, which is described below (see FIG. 14), is placed. Accordingly, a dual floor structure consisting of the floor panel (fixed floor) 7 and the movable floor panel 10 is constituted.

Generally, it is said from the human engineering standpoint that human being (driver) feels comfortable in a position where the thigh and lower leg are open when the sitting position is low, and feels comfortable in a position where the thigh and lower leg are closed when the sitting position is high. Herein, in view of the concept that the driver always feel comfortable with the hip points which are decided by rotating the driver positions approximately around the rotational center 8 of the accelerator pedal 9, maintaining the above-described comfortable positions, the hip points of driver will be set as described below.

Figure 2:
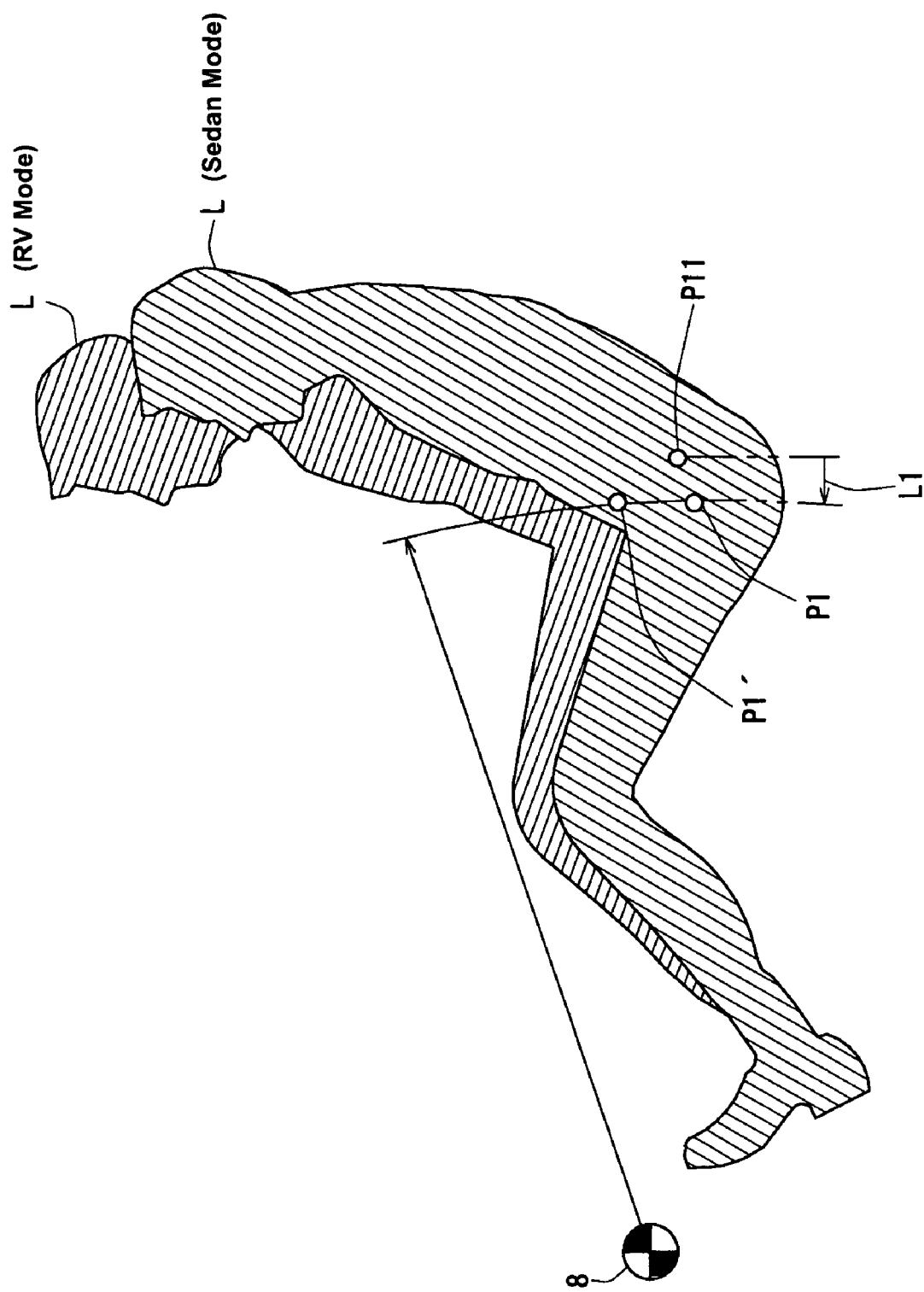
FIG. 2 is an explanatory diagram of hip point setting.

For the large size of driver L, by lowering the hip point P1' of the driver L in a RV mode shown in FIG. 2 to the hip point P1 in a sedan mode along the arc having its center corresponding to the rotational center 8 of the accelerator pedal 9, maintaining the comfortable position with an opening angle (approximately 128 degrees) between the thigh and lower leg which is slightly narrower than a conventional angle (approximately 135 degrees), the hip point P1 is set in a lower-and-forward position with respect to the conventional hip point P11.

For the small size of driver S, by raising the hip point to the hip point P3 along the arc having its center corresponding to the rotational center 8 of the accelerator pedal 9, maintaining the comfortable position with the opening angle (approximately 130 degrees) between the thigh and lower leg which is slightly greater than a conventional angle (approximately 114 degrees), the hip point P3 (see FIG. 1) is set in an upper-and-rearward position with respect to the conventional hip point P13. Accordingly, the eyes e of respective drivers L, M and S are configured so as to be on the identical line as shown in FIG. 1.

Figure 3:
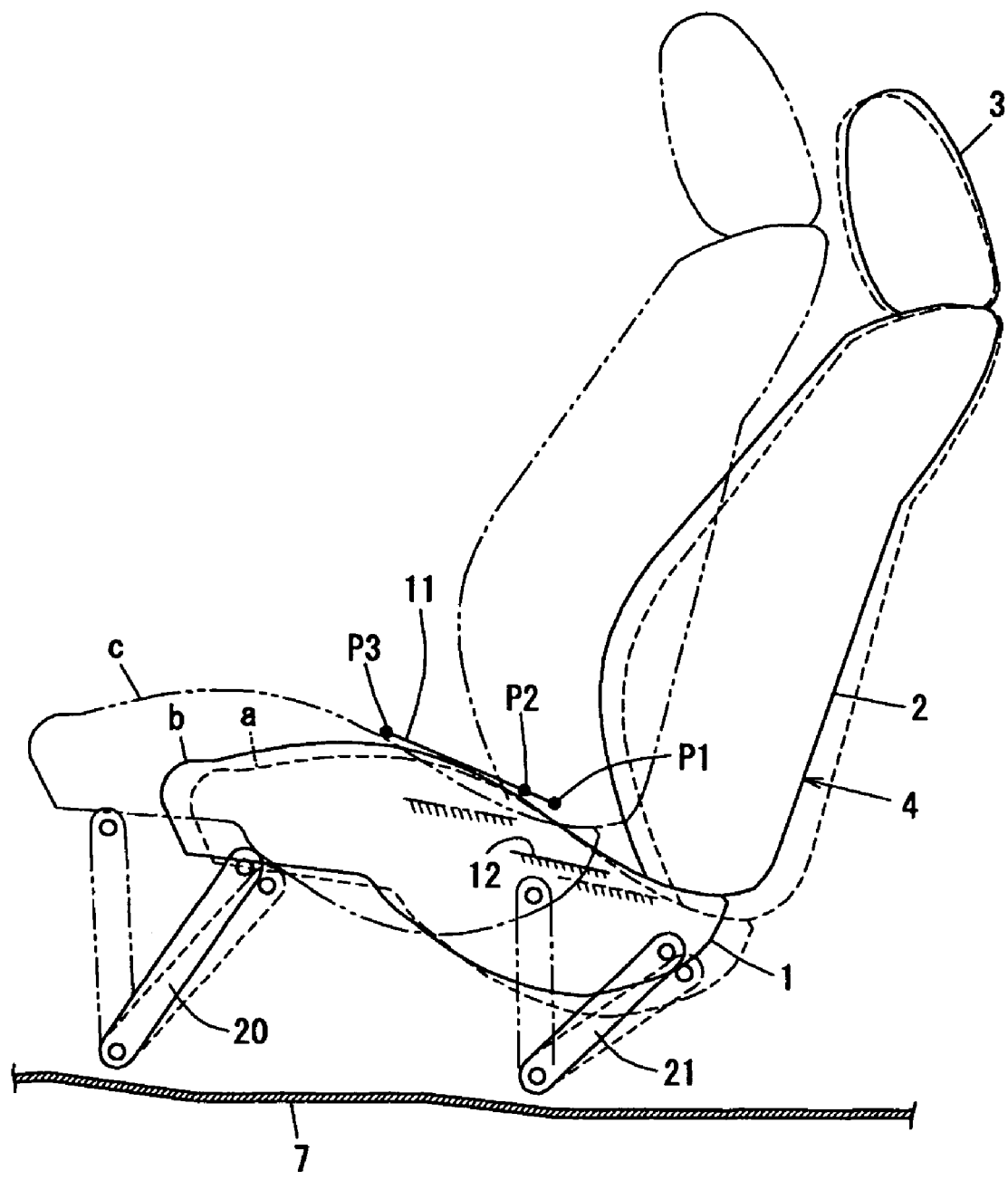
FIG. 3 is a side view showing a seat adjustment by a seat position adjusting device.
Figure 4:
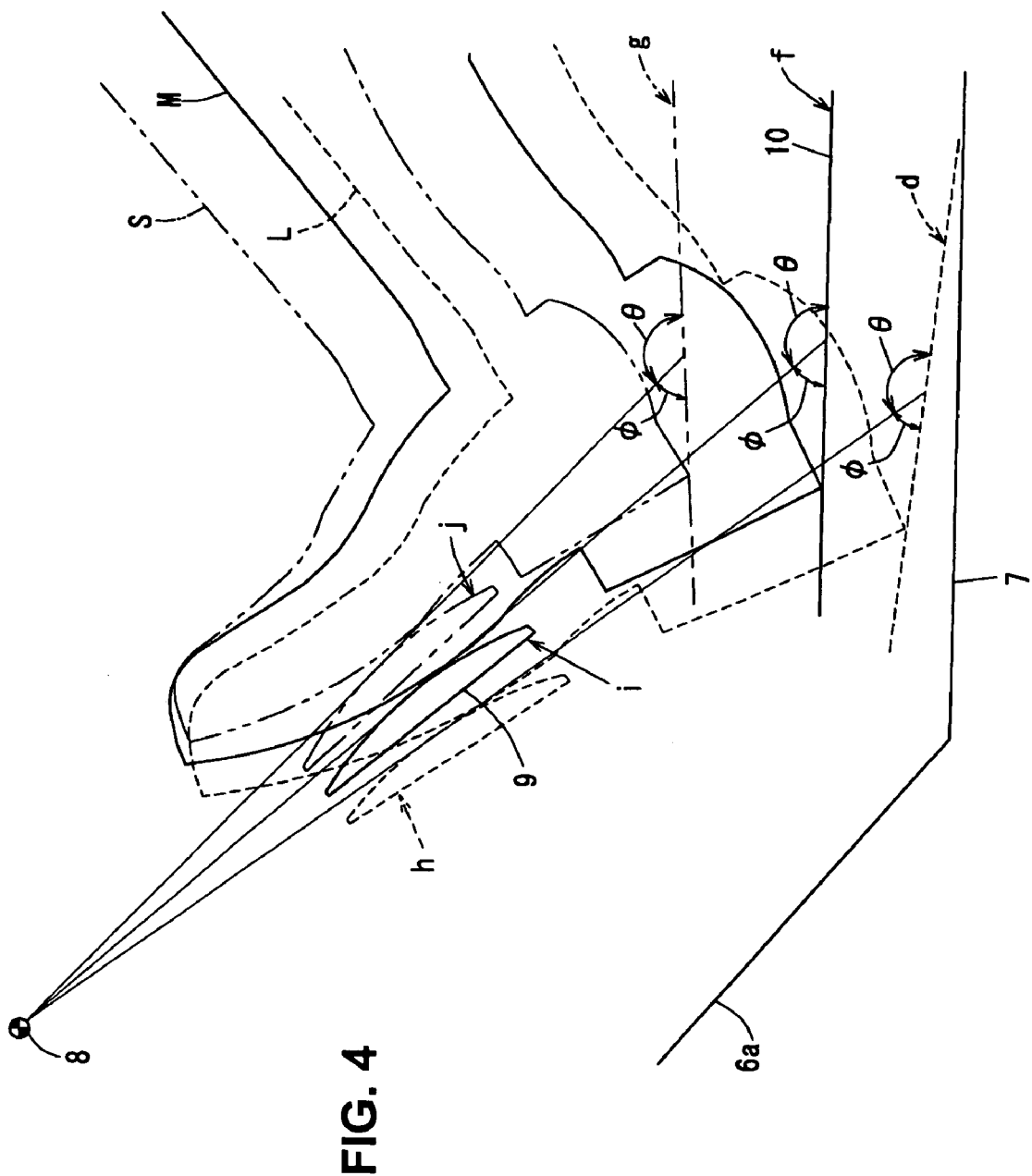
FIG. 4 is a side view showing a relational adjustment of a movable floor panel and a pedal.

In FIGS. 3 and 4, respective positions of the seat 4, the accelerator pedal 9 and the movable floor panel 10 are illustrated respectively: by the broken line with reference characters a, h, d for the large size of driver L; by the solid line with reference characters b, i, f for the standard size of driver M; and by the two-dotted broken line with reference characters c, j, g for the small size of driver S.

Namely, the seat 4 is configured such that the position of seat face 12 of the seat cushion 1 is moved upward and forward from the lower position along a line 11 passing the hip point P1 for the driver L and the hip point P3 for the driver S shown in FIG. 3. Also, both height and angle of the seat face 12 are adjustable.

Herein, the seat face angle of the seat cushion 1 is adjusted so as to change from the front-high and rear-low position to the horizontal position when the seat 4 is moved forward and upward as apparent from FIG. 3. Also, the operating angle of the accelerator pedal 9 is adjusted in such a manner that the pedal 9 is rotated around its rotation center 8 toward the driver, from the position h (see the broken line) for the large size of driver L to the position j (see the two-dotted broken line) for the small size of driver S, as shown in FIG. 4.

Further, the movable floor panel 10 is moved upward when the accelerator pedal 9 is moved toward the driver as shown FIG. 4. Herein, the floor panel angle of the movable floor panel 10 is adjusted so as to change from the front-high and rear-low position (see position d) to the front-low and rear-high position (see position g) by way of the horizontal position (see position f) when the movable floor panel 10 is moved upward from the lower position. As a result, the angles θ and φ between the accelerator pedal 9 and the movable floor panel 10 have the same respective values regardless of the positions d, f, g of the movable floor panel 10.

Since the hip point P1 for the large size of driver L is set in the lower-and-forward position with respect to the conventional hip position P11 as shown in FIG. 1, the seat 4 can be located forward by a distance L1. Accordingly, it may be possible to enlarge the rear-seat space and improve the package efficiency without changing the vehicle space or the wheel base length. Also, since this forward location of the seat 4 allows the driver to sit forward with respect to a center pillar, the driver can be protected properly against the center pillar which may be deformed inward during a vehicle side collision, thereby improving the safety.

Also, since the hip point P3 for the small size of driver S is set in the upper-and-rearward position with respect to the conventional hip position P13 as shown in FIG. 1, the distance between the hip points P3 and P1 can be shortened. Accordingly, the adjusting amount of the seat 4 in the longitudinal direction can be shortened by a total of the distance L1 and the distance L2. Also, since the hip point P3 for the small size of driver S is set in the rearward position with respect to the conventional one, proper views for vehicle side mirrors, providing the narrower view angle, and vehicle meters can be obtained.

Figure 5:
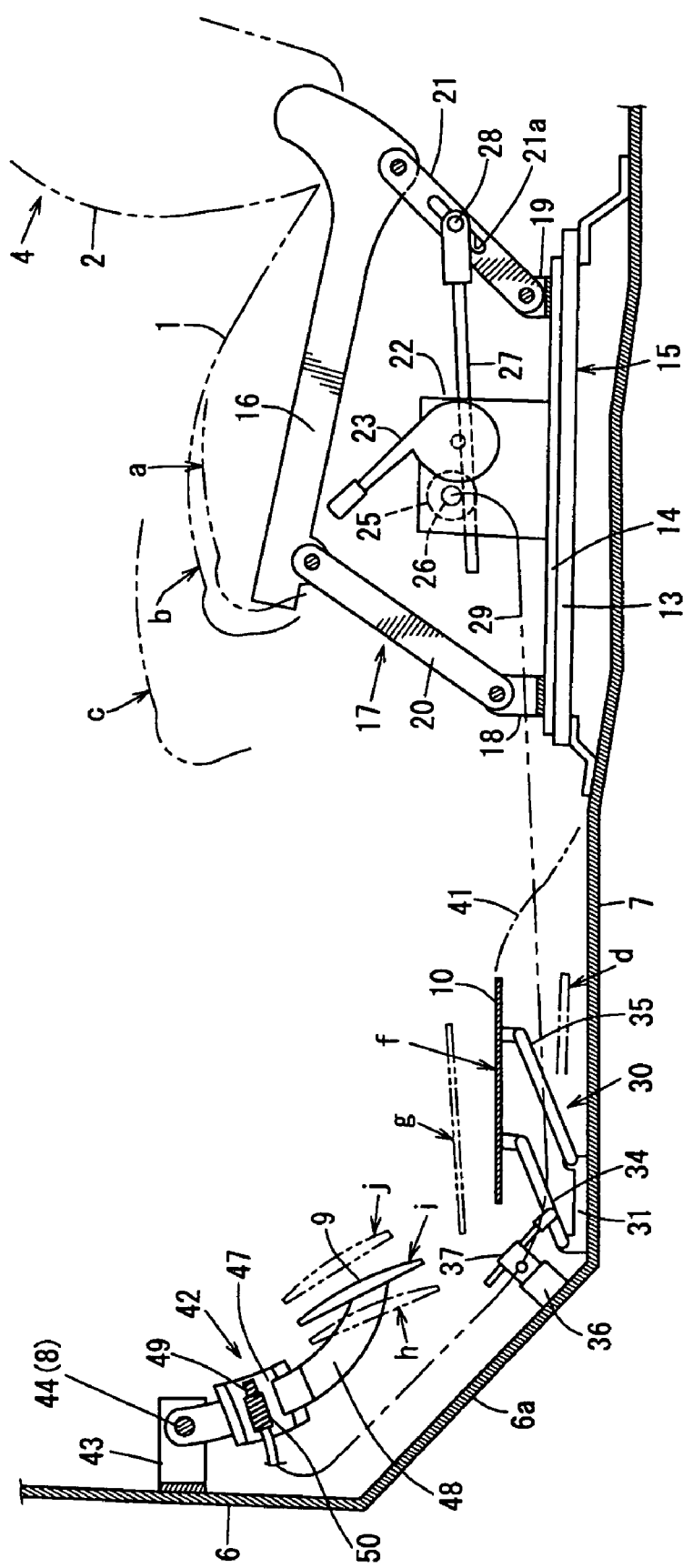
FIG. 5 is a side view showing a specific structure of the driver driving position adjusting device of a vehicle.

FIG. 5 shows an embodiment which materializes the basic structure shown in FIGS. 1 through 4. In FIG. 5, a lower rail 13 and an upper rail 14 are attached to the floor panel 7 (fixed base floor) located at the seat 4 (driver seat), and there is provided a seat slide mechanism 15 to slide the seat 4 longitudinally according to the driver's needs. Herein, the upper rail 14 is usually fixed with respect to the lower rail 13. Between the upper rail 14 and a seat frame 16 to which the seat cushion 1 is fixed is provided a seat position adjusting device 17 operative to adjust longitudinal and vertical positions of seat face and an angle of seat face of the seat 4 together.

Figure 6:
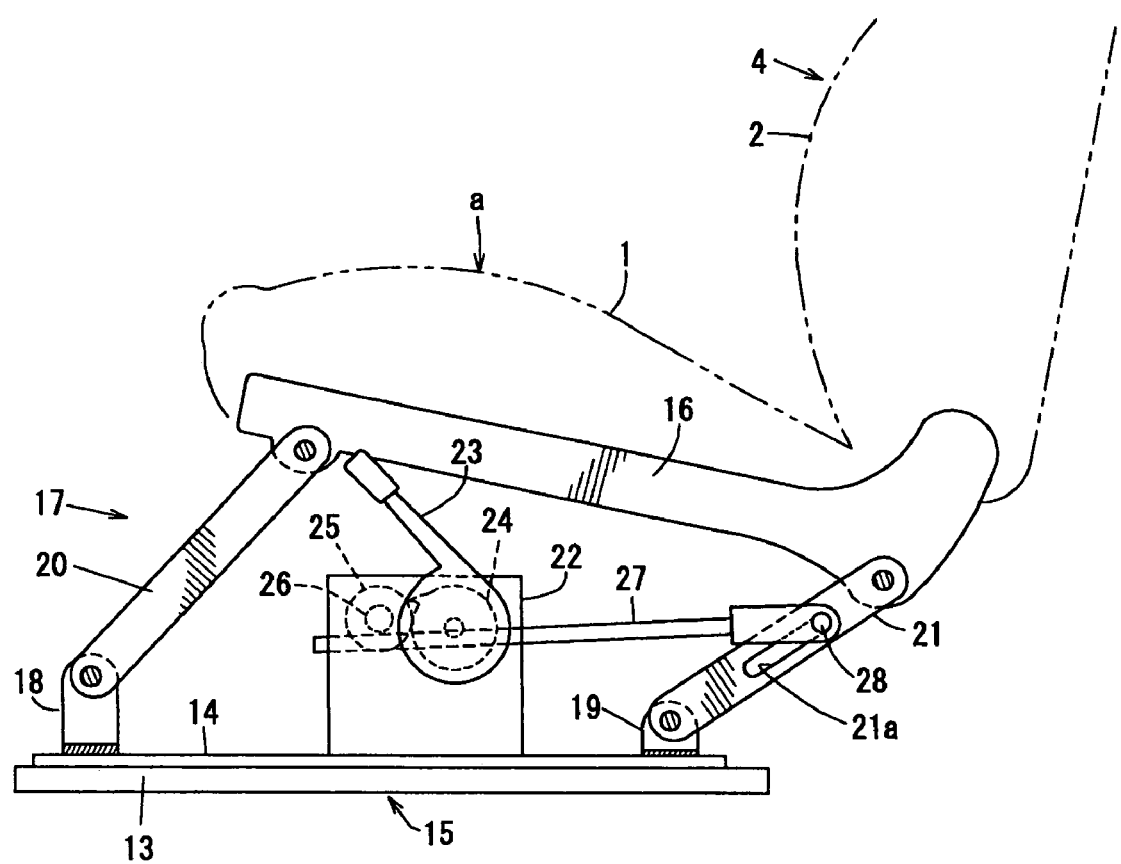
FIG. 6 is a side view showing a lower position of the seat.
Figure 7:
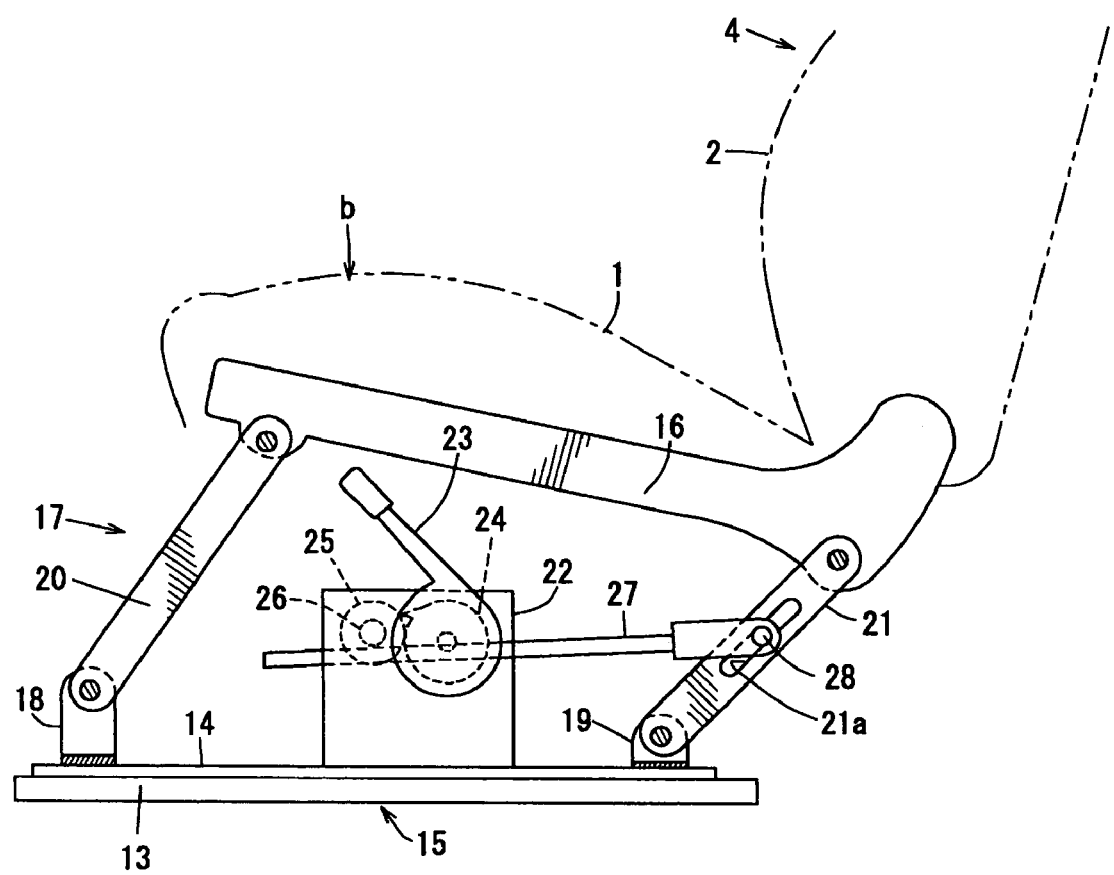
FIG. 7 is a side view showing a middle position of the seat.
Figure 8:
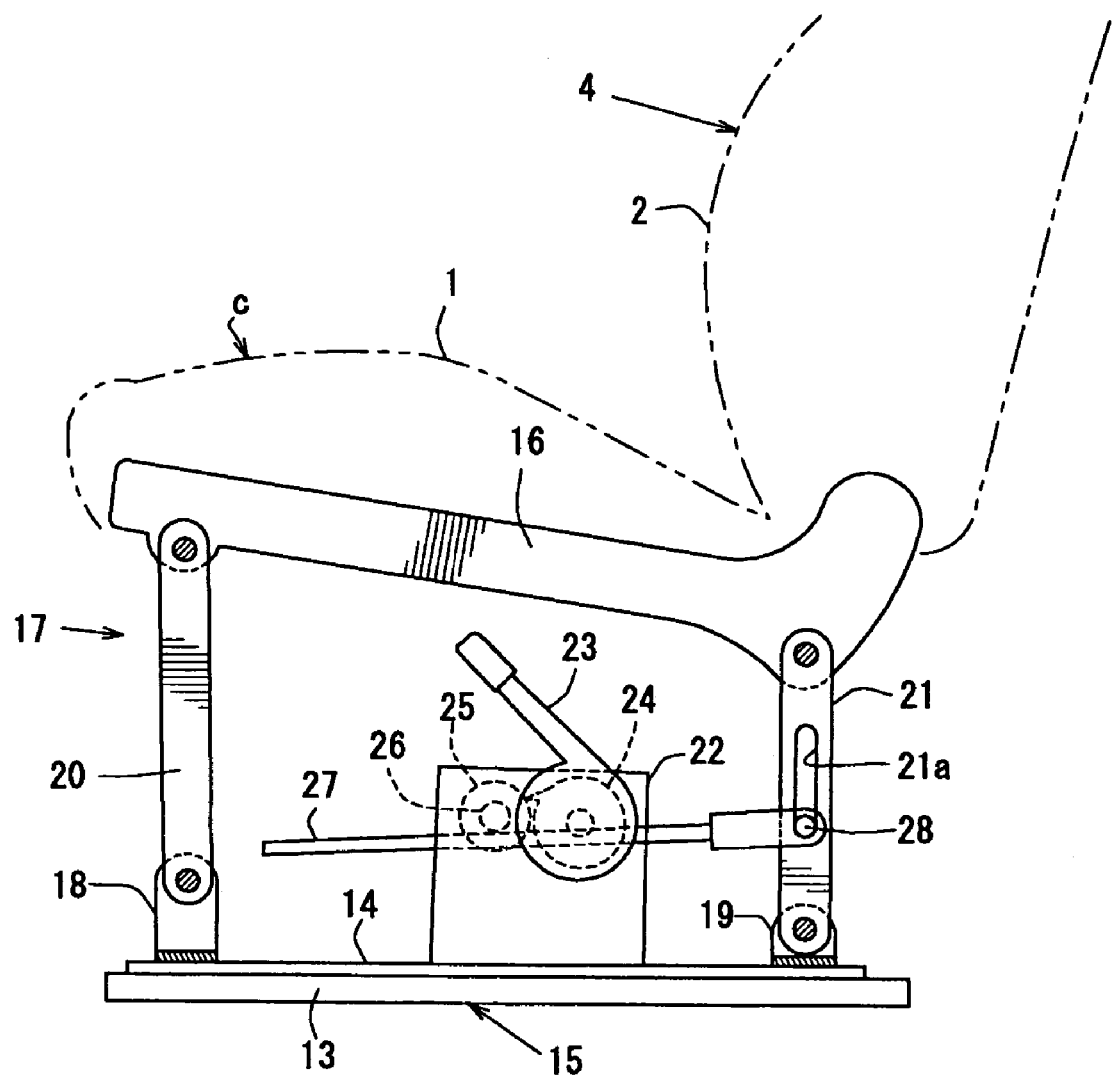
FIG. 8 is a side view showing an upper position of the seat.

The seat position adjusting device 17 is configured as shown in FIGS. 6, 7 and 8. Namely, support brackets 18 and 19 are fixed to at front and rear ends of the upper rail 14, the front support bracket 18 and the front end of the seat frame 16 are coupled by a link 20 via pins, the rear support bracket 19 and the rear end of the seat frame 16 are coupled by another link 21 via pins, and the length of the front link 20 is configured so as to be longer than that of the rear link 21.

Also, a gearbox 22 is attached to the upper rail 14, a gear 24 is driven by an operation of a lever 23 which constitutes a driving position adjusting operating device, the gear 24 rotates a pinion (or a worm) via a gear 25 in the gearbox, and a rack member 27 is configured so as to move back and forth via the pinion 26. Further, a pin 28 at the rear end of the rack member 27 is inserted in a long hole 21a of the rear link 21, and the link 21 is configured so as to get up or down according to the back-and-forth movement of the rack member 27.

Accordingly, the seat 4 is adjusted in the respective positions a, b, c shown in FIGS. 6, 7 and 8 via the seat position adjusting device 17 with a double-link structure according to the operation of the manually-operated lever 23. Herein, the position a shown in FIG. 6 corresponds to a sitting state of the large size of driver L, the position b shown in FIG. 7 corresponds to a sitting state of the standard size of driver M, the position c shown in FIG. 8 corresponds to a sitting state of the small size of driver S, and the seat face angle and height are adjustable together as described above because the front and rear links 20 and 21 are configured such that those length are different from each other.

Figure 9:
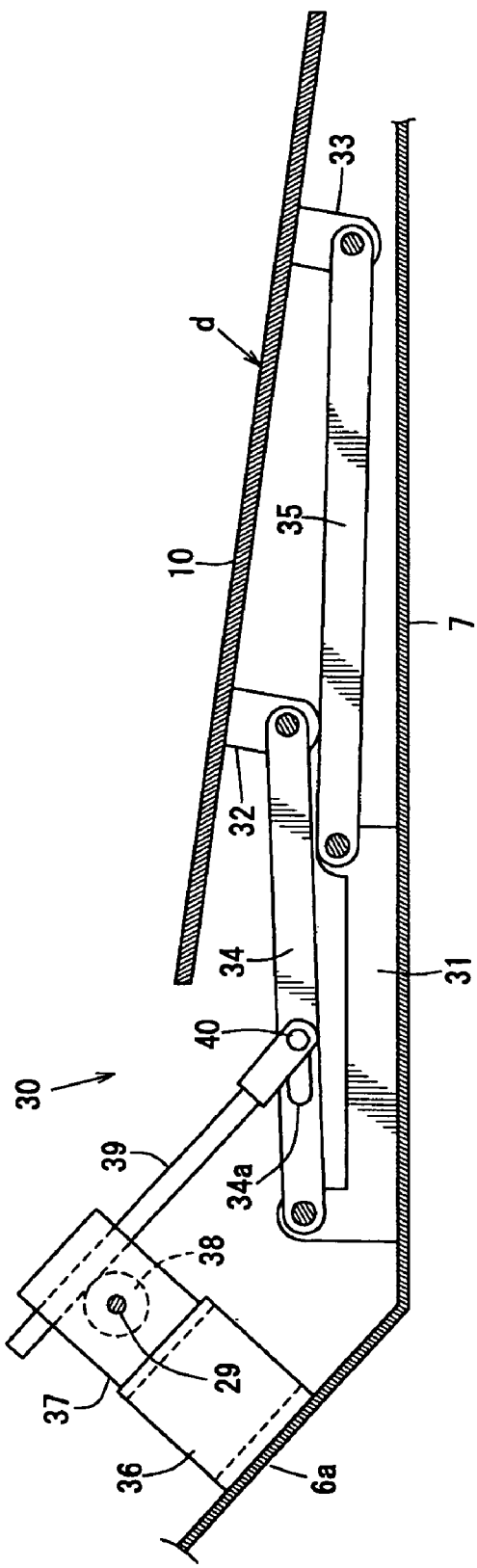
FIG. 9 is a side view showing a lower position of the movable floor panel.
Figure 10:
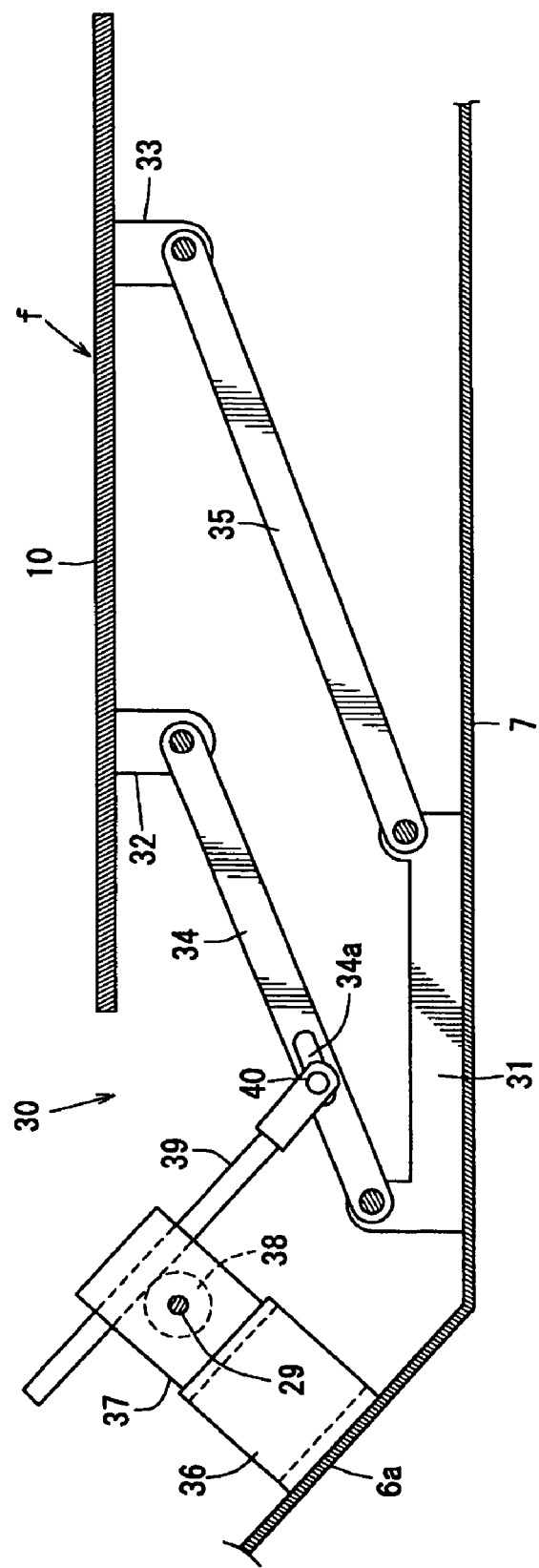
FIG. 10 is a side view showing a middle position of the movable floor panel.
Figure 11:
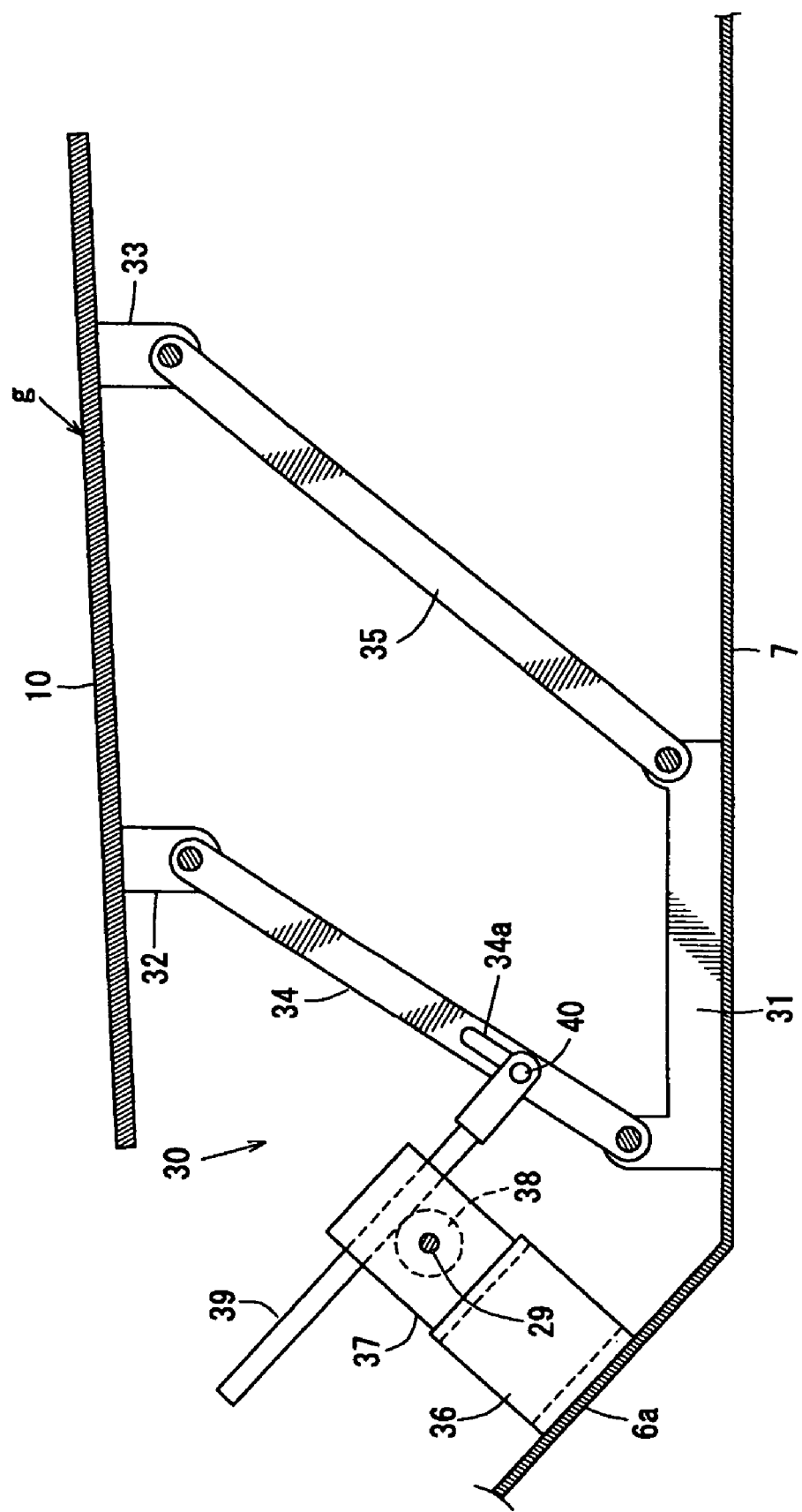
FIG. 11 is a side view showing an upper position of the movable floor panel.

Further, to the above-described pinion 26 is attached a flexible shaft 29 (so-called bending shaft), shown in FIG. 5, or a power transmitting cable as a linkage device. Also, as shown in FIG. 5, there is provided a movable floor panel adjusting mechanism 30 as a floor panel position adjusting device which adjusts together the vertical position and the floor panel angle of the movable floor panel 10 on which the leg portion (see heel) of the driver operating the accelerator pedal 9 and the brake pedal 51 described below (see FIG. 14). The movable floor panel adjusting mechanism 30 is configured as shown in FIGS. 9, 10 and 11.

Namely, a support bracket 31 is attached to the upper face of the fixed floor panel 7, brackets 32 and 33 are attached respectively to the front and rear ends of the lower face of the movable floor panel 10, the front portion of the support bracket 31 and the front bracket 32 are coupled by a link 34 via pins, the rear portion of the support bracket 31 and the rear bracket 33 are coupled by another link 35 via pins, and the length of the rear link 35 is configured so as to be longer than that of the front link 34.

Also, a gearbox 37 is attached via a bracket 36 to a lower-end slant portion 6a of the dash lower panel 6, utilizing an open space, a rack member 39 is driven by a pinion 38 or a worm which is supported in the gearbox 37, a pin 40 at the rear end of the rack member 39 is inserted in a long hole 34a of the front link 34, and the link 34 is configured so as to get up or down according to the back-and-forth movement of the above-described rack member 39.

Herein, the above-described pinion 38 is configured so as to be rotated by the flexible shaft 29 (or the power transmission cable) as shown in FIG. 5 as well. Namely, the movable floor panel 10 is adjusted via the movable floor panel adjusting mechanism 30 with a double-link structure in the respective positions d, f, g shown in FIGS. 9, 10 and 11 according to the rotation of the flexible shaft 29. The vertical position and the floor panel angle of the movable floor panel 10 correspond respectively to the states shown by broken, solid and two-dotted broken lines in FIG. 4. The position d shown in FIG. 9 corresponds to a leg-portion placing state of the large size of driver L, the position f shown in FIG. 10 corresponds to a leg-portion placing state of the standard size of driver M, and the position g shown in FIG. 11 corresponds to a leg-portion placing state of the small size of driver S. The above-described movable floor panel 10 is covered by a floor mat 41 as shown in FIG. 5. Herein, the movable floor panel 10 is configured such that the vertical movement and angular change thereof are adjusted together because the length of the front and rear links 34 and 35 of the movable floor panel adjusting mechanism 30 with the double-link structure are different from each other.

Figure 12:
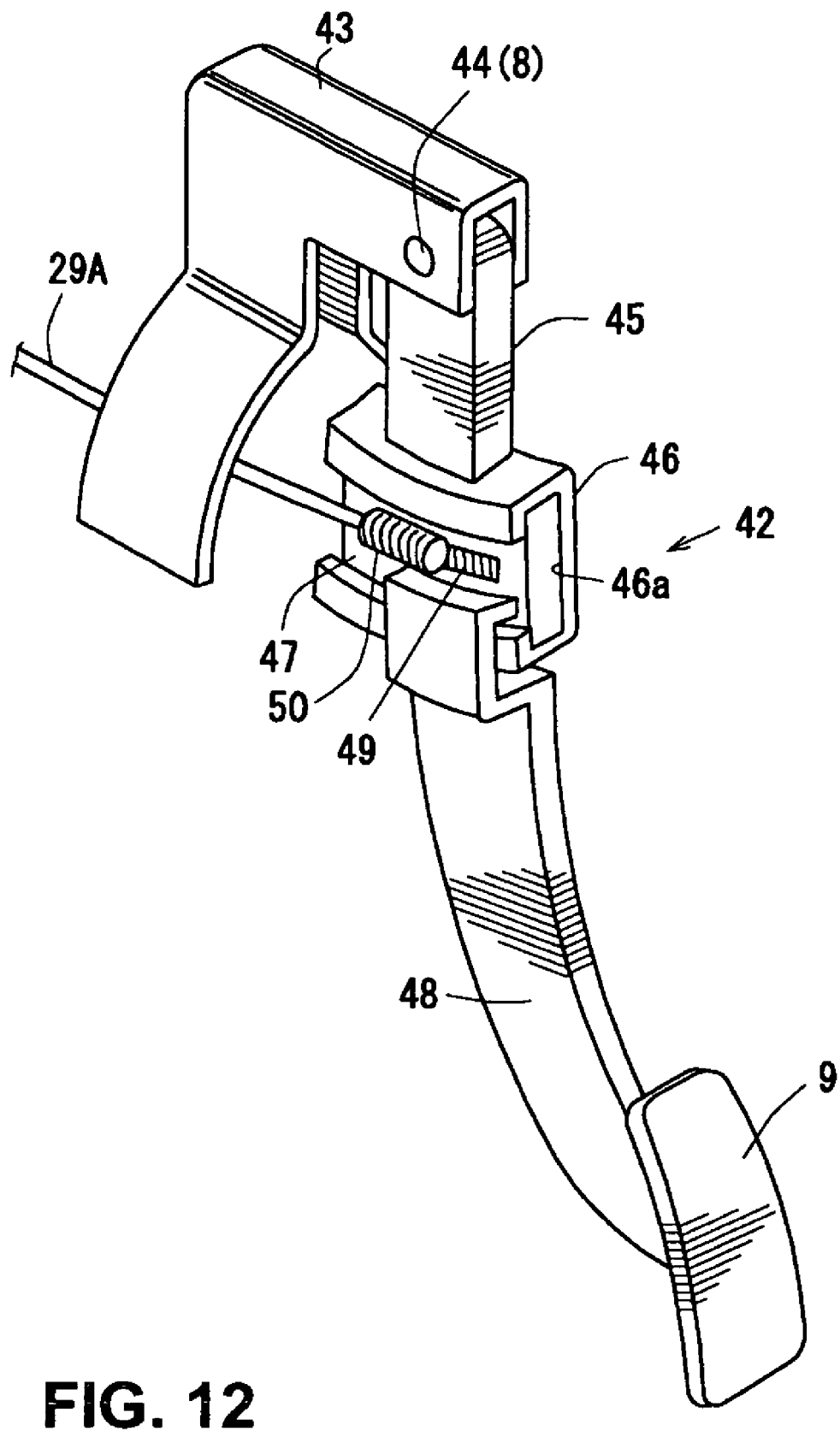
FIG. 12 is a perspective view showing a pedal position adjusting device.
Figure 13:
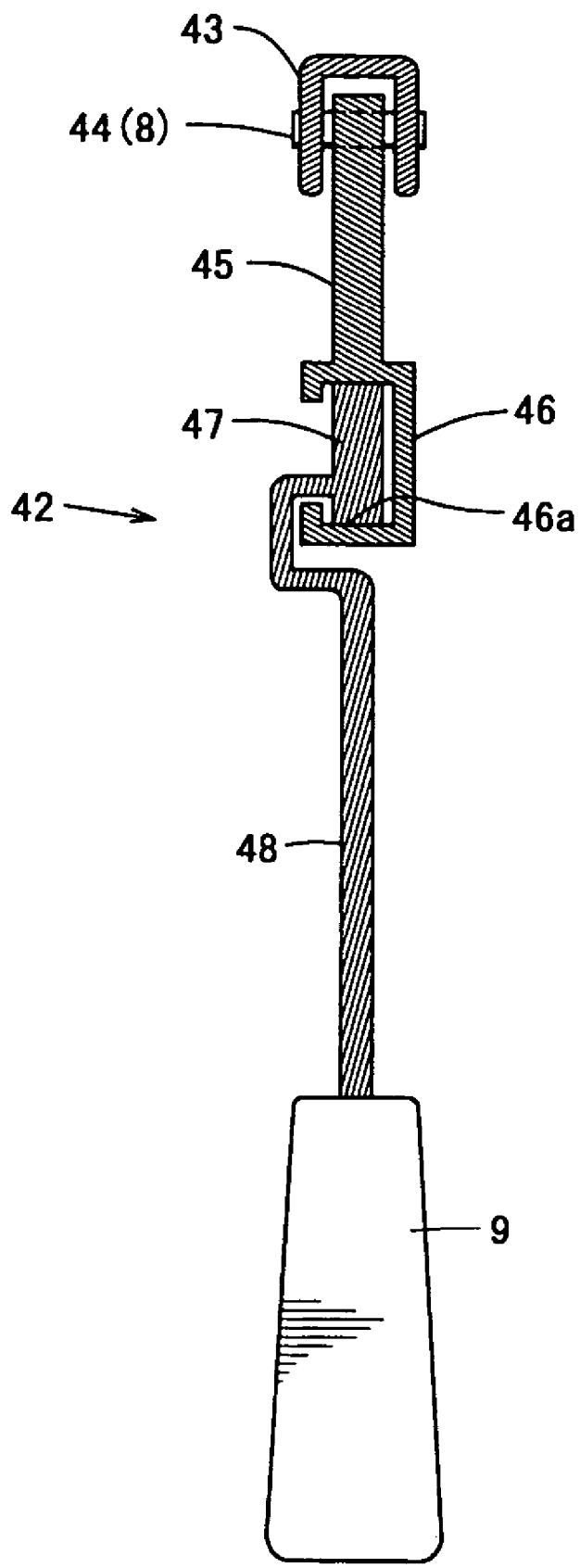
FIG. 13 is a sectional view of a major part of FIG. 12.

Further, as shown in FIG. 5, there is provided a pedal position adjusting device 42 which adjusts together the operating angle and the height of pressing face of the accelerator pedal 9 operated by the drivers L, M and S. The pedal position adjusting device 42 is configured as shown in FIGS. 12 and 13.

Namely, a pedal bracket upper 45 is pivoted at a bracket 43 attached to the dash lower panel 6 via a support shaft 44 constituting the rotational center 8 of the pedal 9, and a guide member 46 with an arc-shape guide groove 46a having its center at the rotational center 8 is attached integrally at a lower portion of the pedal bracket upper 45.

At the above-described guide groove 46a is provided a slider 47 which is movable along its arc. A pedal portion (pressing face portion) of the accelerator pedal 9 is attached to the slider 47 via a pedal bracket lower 48.

Also, a rack portion 49 is formed integrally at the slider 47, and a worm 50 is disposed so as to engage with the rack portion 49 all the time. The worm is driven and rotated by the flexible shaft 29 (specifically, a flexible shaft 29A at the accelerator-pedal side, shown in FIG. 14).

And, when the flexible shaft 29 is rotated, the accelerator pedal 9 is moved back and forth around the rotational center 8 (see support shaft 44) via the pedal position adjusting device 42 as shown in FIGS. 4 and 5. The lower position h of the accelerator pedal 9 shown in FIGS. 4 and 5 corresponds to the large size of driver L, the middle position i corresponds to the standard (medium) size of driver M, and the upper position j corresponds to the small size of driver S. The accelerator pedal 9 is adjusted respectively in the positions h, i, j via the worm 50, rack portion 49 and slider 47 according to the rotation of the flexible shaft 29, and the operating angle and height of the pressing face of the pedal 9 are adjusted together by the pedal position adjusting device 42.

Figure 14:
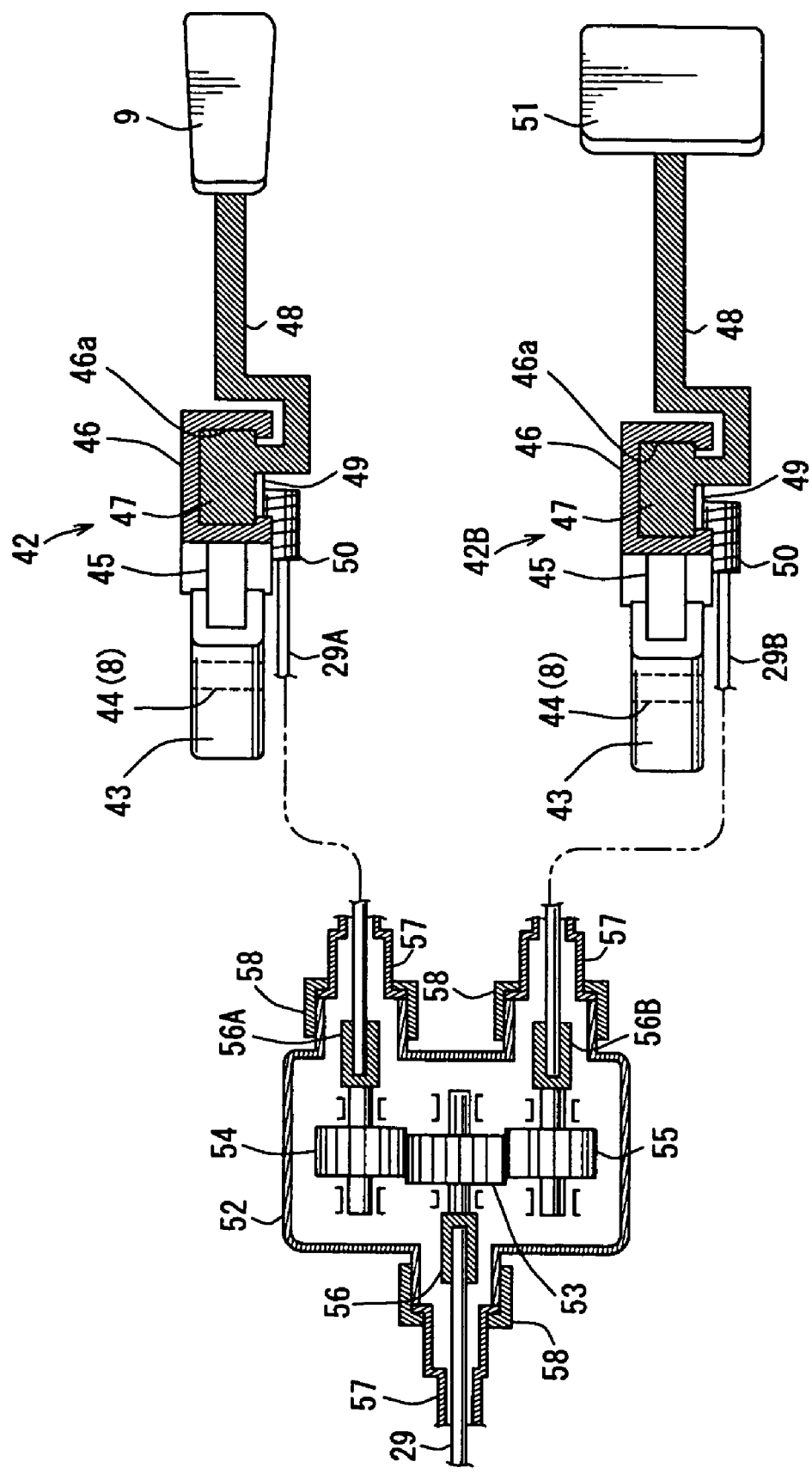
FIG. 14 is a system diagram showing a position adjusting structure of both pedals using flexible shafts.

The brake pedal 51 is configured, as shown in a system diagram FIG. 14, so as to be moved back and forth around the rotational center 8 via a similar pedal position adjusting device 42B to the above-described device 42 for the accelerator pedal 9. The same parts of the devices 42 and 42B are denoted by the same reference characters, and their detailed descriptions will be omitted here. Herein, the flexible shaft 29 is sprit into the accelerator-pedal-side flexible shaft 29A and a brake-pedal-side flexible shaft 29B, which rotate in the same direction, via a gearbox 52.

The gearbox 52 supports rotatably a single input gear 53 and two output gears 54 and 55 therein, and the input gear 53 engages with the output gears 54 and 55. A front end of the flexible shaft 29 is fixed to an input side of the input gear 53 via an inner shaft cramp 56. Respective base ends of the flexible shafts 29A and 29B at the sides of the accelerator pedal 9 and the brake pedal 51 are fixed respectively to output sides of the output gears 54 and 55 via inner shaft cramps 56A and 56B. The flexible shafts 29A and 29B at the sides of the accelerator pedal 9 and the brake pedal 51 are configured so as to rotate in the same direction via the gears 53, 54 and 55 according to the rotation of the common flexible shaft 29.

Herein, in the figure, a reference numeral 57 denotes a cylindrical outer shaft, and a reference numeral 58 denotes an attaching member to attach the outer shaft 57 to the gearbox 52. Further, in the present embodiment, there is provided a driving position adjusting operating device operative to operate the above-described seat position adjusting device 17, movable floor panel adjusting mechanism 30 and pedal position adjusting devices 42 and 42B as shown in FIGS. 5 and 14. Herein, the driving position adjusting operating device comprises the lever 23 (see FIG. 5) and the flexible shafts 29, 29A and 29B (see FIG. 14).

And, the driving position adjusting operating device comprising the lever 23 and the flexible shafts 29, 29A and 29B is configured so as to adjust together the seat position adjusting device 17, movable floor panel adjusting mechanism 30 and pedal position adjusting devices 42 and 42B with a specified relationship.

Namely, when the seat cushion 1 of the seat 4 is moved from the rear-and-lower position a to the front-and-upper position c by way of the middle position b by the seat position adjusting device 17 to locate respective eyes e of the drivers L, M and S on the identical line as shown in FIG. 1, the movable floor panel 10 and the accelerator and brake pedals 9 and 51 are adjusted together in such a manner that the movable floor panel 10 is moved from the lower position d to the upper position g by way of the middle position f by the movable floor panel adjusting mechanism 30 and the both pedals 9 and 51 are moved from the position h away from the driver to the position j closer to the driver by way of the middle position i by the pedal position adjusting devices 42 and 42B.

Also, the above-described seat position adjusting device 17 is configured so as to adjust not only the longitudinal and vertical positions of seat face of the seat cushion 1 but also the angle of seat face of the seat cushion 1 together. Accordingly, the seat-face angle of the seat cushion 1 is adjusted from the front-high and rear-low position to the horizontal position as shown in FIG. 3 according to the movement of the seat cushion 1 from the position a shown in FIG. 6 to the position c shown in FIG. 8 by way of the position b shown in FIG. 7.

Further, the movable floor panel adjusting device 30 is configured so as to adjust not only the vertical position of the movable floor panel 10 but also its angle with respect to the floor panel 7 together. Accordingly, the movable floor panel 10 is adjusted from the front-high and rear-low position (see FIG. 9) to the front-low and rear-high position (see FIG. 11) by way of the horizontal position (see FIG. 10) according to the movement of the movable floor panel 10 from the lower position d (see FIG. 9) to the upper position g (see FIG. 11) by way of the middle position f (see FIG. 10). Herein, the angles θ and φ (see FIG. 4) between the movable floor panel 10 in respective positions d, f, g and the pedal in the corresponding positions h, i, j are configured so as to have the same values regardless of their positions.

Additionally, the above-described pedal position adjusting devices 42 and 42B are operated such that the operating angles (see the angles θ and φ in FIG. 4) of the driver to operate the pedals 9 and 51 have the same angles in the respective positions h, i, j shown in FIG. 5. And, the pressing-face height of the pedals 9 and 51 is also adjusted together with the movable floor panel 10 in such a manner that it is located: in the lower position h when the movable floor panel 10 is in the lower position d (see FIG. 9); in the middle position i when the movable floor panel 10 is in the middle position f (see FIG. 10); and in the upper position j when the movable floor panel 10 is in the lower position g (see FIG. 11).

Namely, relationships between the drives L, M and S and the respective positions of the seat cushion 1, movable floor panel 10 and pedals 9 and 51 is set in such a manner that the positions a, d, h is for the large size of driver L, the positions b, f, i is for the medium size of driver M, and the positions c, g, j is for the small size of driver S.

As described above, according to the embodiment shown in FIGS. 1 through 14, there is provided the driver driving position adjusting device of a vehicle comprising the seat position adjusting device 17 operative to adjust the seat face position (vertical and longitudinal positions) of the seat 4 on which the drivers L, M and S sit, the pedal position adjusting devices 42 and 42B operative to adjust the operating angles of the pedals 9 and 51 operated by the leg portions of the drivers L, M and S, and the movable floor panel adjusting mechanism 30 operative to adjust the position of the movable floor panel 10 on which the leg portions of the drivers L, M and S operating the pedals 9 and 51 are placed. Herein, the driver driving position adjusting device further comprises the driving position adjusting operating device (see the lever 23, flexible shafts 29, 29A and 29B) which adjusts the seat 4, pedals 9 and 51 and movable floor panel 10 such that the driver is moved along the arc having its center which corresponds to the rotational center 8 of the pedals 9 and 51 under the state where the specified driver position (comfortable position from the human engineering standpoint) is maintained, and operates the above-described pedal position adjusting devices 42, 42B and the movable floor panel adjusting mechanism 30 with the specified relationship.

Accordingly, the seat position adjusting device 17 adjusts the seat-face position of the seat 4 on which the drivers L, M and S, the pedal position adjusting devices 42 and 42B adjust the operating angles of the pedals 9 and 51 operated by the driver's leg portions, the movable floor panel adjusting mechanism 30 adjusts the position of the movable floor panel 10 on which the leg portions (specifically, see the heels) of the driver operating the pedals 9 and 51 are placed.

Thus, the seat face of the seat 4 and the movable floor panel 10 can be adjusted in their upper positions and the pedal operating angle of the pedals 9 and 51 can be adjusted to be suitable for the small size of driver S, the seat face of the seat 4 and the movable floor panel 10 can be adjusted in their lower positions and the pedal operating angle of the pedals 9 and 51 can be adjusted to be suitable for the large size of driver L, and the seat face of the seat 4 and the movable floor panel 10 can be adjusted in their middle positions and the pedal operating angle of the pedals 9 and 51 can be adjusted to be suitable for the standard size of driver M.

As a result, regardless of the body size of drivers L, M and S, both the proper driving position and the clear front view, even for the small size of driver S, can be obtained, and such proper driving position can be obtained even though the longitudinal adjusting distance of the seat 4 is small, and also the proper pedal operation can be obtained by adjusting the movable floor panel 10. Additionally, since the pedal operating angle of the pedals 9 and 51, the floor panel position of the movable floor panel 10 and the seat face position of the seat 4 are adjusted, the optimization of the leg-portion angle and the pedal operating direction of the drivers L, M and S operating the pedals 9 and 51 can be attained.

Namely, the difference of body size of the drivers is mainly expressed to the difference of the total length of the thighs and the lower legs (i.e., the difference of length of the legs). Accordingly, the angle between the thigh and lower leg of driver and the operating direction to press the pedal face by the driver who sits on the seat 4 with legs being upward-joint bent depend on the body size of the driver sitting on the seat. Herein, since the seat face position of the seat 4 and the pedal operating angle of the pedals 9 and 51 are adjusted respectively by the seat position adjusting device 17 and the pedal position adjusting devices 42 and 42B, the both (the seat face position and the pedal operating angle of the pedals 9 and 51) can be adjusted so as to be suitable for the driver's body size. As a result, the optimization of the leg-portion angle and the pedal operating direction of the driver operating the pedals 9 and 51 can be attained, and the proper pedal operation can be obtained regardless of the body size of drivers L, M and S.

Additionally, since the seat 4, the pedals 9 and 51 and the movable floor panel 10 are adjusted such that the driver is moved along the specified arc having the center thereof which corresponds to the rotational center 8 of the pedals 9 and 51 under the state where the specified driver position (comfortable position from human engineering standpoints) is maintained, the comfortable driving position can be always provided to the driver.

Further, since both the pedal position adjusting devices 42 and 42B and the movable floor panel adjusting mechanism 30 are operated together by the driving position adjusting operating device (see the lever 23 and the flexible shafts 29, 29A and 29B), the operation can be simplified and improved.

Also, the above-described specified relationship is arranged such that the movable floor panel 10 adjusted by the movable floor panel adjusting mechanism 30 is moved upward from the lower position thereof when the pedals 9 and 51 adjusted by the pedal position adjusting devices 42 and 42B are moved around the rotational center 8 toward the driver. Accordingly, the leg of even small size of driver S can reach the pedals 9 and 51 enough to provide the proper driving position. This proper driving position can also improve the operation of pedals 9 and 51 and the steering wheel and provide the driver with the proper sitting at the seat 4. Thus, proper views for vehicle side mirrors, providing the narrower view angle, and vehicle meters are obtained as well.

Further, the positions of the pedals 9 and 51 are adjusted by the pedal position adjusting devices 42 and 42B in relation to the seat position adjustment of the seat position adjusting device 17. Accordingly, since the seat face position of the seat 4 and the pedal operating angle of the pedals 9 and 51 are adjusted in relation to each other, further optimization of the leg-portion angle and the pedal operating direction of the driver operating the pedals 9 and 51 can be attained. Namely, when the driver is the smaller-size one S, the seat face of the seat 4 is adjusted in the upper position and also the pedal operating angles of the pedals 9 and 51 are adjusted in relation to this, thereby providing the proper operation state where the pedals 9 and 51 are pressed down from above. While, when the driver is the larger-size one L, the seat face of the seat 4 is adjusted in the lower position and also the pedal operating angles of the pedals 9 and 51 are adjusted in relation to this, thereby providing the proper operation state where the pedals 9 and 51 are pressed in the proper direction. Also, further clear front view can be provided even to the smaller size of driver by the adjustment of seat position.

Additionally, the pedals 9 and 51 adjusted by the pedal position adjusting devices 42 and 42B are moved toward the driver when the seat 4 adjusted by the seat position adjusting device 17 is moved forward and upward from its rear-and-lower position. Accordingly, further optimization of the leg-portion angle and the pedal operating direction of the drivers L, M and S operating the pedals 9 and 51 can be attained.

Further, the position of the movable floor panel 10 is adjusted by the movable floor panel adjusting mechanism 30 in relation to the seat position adjustment by the seat position adjusting device 17. Accordingly, the seat face position of the seat 4 and the floor panel position of the movable floor panel 10 are adjusted in relation to each other. Since particularly the floor panel position of the movable floor panel 10 is adjusted, the leg of even the small size of driver S can reach the pedals 9 and 51 enough to provide the proper pedal operation. Also, since the seat face position of the seat 4 is adjusted, sufficiently clear front view can be provided even to the small size of driver S.

Herein, the movable floor panel 10 adjusted by the movable floor panel adjusting mechanism 30 is moved upward from the lower position when the seat 4 adjusted by the seat position adjusting device 17 is moved forward and upward from the rear and lower position. Accordingly, both the proper driving position and the clear front view can be obtained further properly.

Further, the pedal position adjusting devices 42 and 42B are operative to adjust the operating angle of the pedals 9 and 51 and the height of their pedal pressing faces. Accordingly, the height of pedal pressing faces of the pedals 9 and 51 can be adjusted respectively by the pedal position adjusting devices 42 and 42B: in the lower position for the large size of driver L with long legs; in the upper position for the small size of driver S with short legs; and in the middle position for the standard size of driver M. Thus, since the pedal pressing face heights of the pedal 9 and 51 are adjusted in addition to the adjustment of pedal operating angle of the pedals 9 and 51, the pedal operation of the pedals 9 and 51 can be further improved, allowing the driver to press the pedal center.

Additionally, the movable floor panel adjusting mechanism 30 is operative to adjust the vertical position and the panel angle of the movable floor panel 10. Accordingly, since the movable floor panel adjusting mechanism 30 adjusts not only the vertical position (i.e., height) of the movable floor panel 10 but also the panel angle of the movable floor panel 10, the relative angles between the pedals 9 and 51 and the movable floor panel 10 can be maintained at the substantially constant angles during the vertical movement of the movable floor panel 10. Also, even though the size or the heel size of driver's shoes change, such change may be absorbed properly by pressing the appropriate position of the pedals 9 and 51 (see the pedal center).

Also, the seat position adjusting device 17 is operative to adjust the angle, the longitudinal position and the vertical position of seat face of the driver seat 4. Accordingly, the seat face of the seat 4 can be adjusted respectively by the seat position adjusting device 17: in the front-and-upper position for the small size of driver S; in the rear-and-lower position for the large size of driver L; and in the middle position for the standard size of driver M.

Thus, since the longitudinal position and the vertical position of the seat face of the seat 4 are adjusted in addition to the seat face angle of the seat 4 and the pedal operating angles of the pedals 9 and 51, further optimization of the leg-portion angles and the pedal operating directions of the drivers L, M and S operating the pedals 9 and 51 can be attained, and the clear front view can be provided regardless of the body size of driver, even to the small size of driver S.

Further, the driving position adjusting operating device (see the lever 23 and the flexible shafts 29, 29A and 29B) is operative to operate the movable floor panel adjusting mechanism 30, the seat position adjusting device 17, and the pedal position adjusting devices 42 and 42B such that the devices are adjusted together with the specified relationship.

The specified relationship is arranged such that the movable floor panel 10 is moved upward from its lower position and the pedals 9 and 51 are rotated around the rotational center 8 toward the driver when the seat 4 is moved upward and forward from its lower position, whereas the movable floor panel 10 is moved downward from its upper position and the pedals 9 and 51 are rotated around the rotational center 8 away from the driver when the seat 4 is moved downward and rearward from its upper position.

Accordingly, since the movable floor panel adjusting mechanism 30, the seat position adjusting device 17, and the pedal position adjusting devices 42 and 42B are operated together by the driving position operating device (see the lever 23 and the flexible shafts 29, 29A and 29B), the improvement of operation can be attained.

Figure 15:
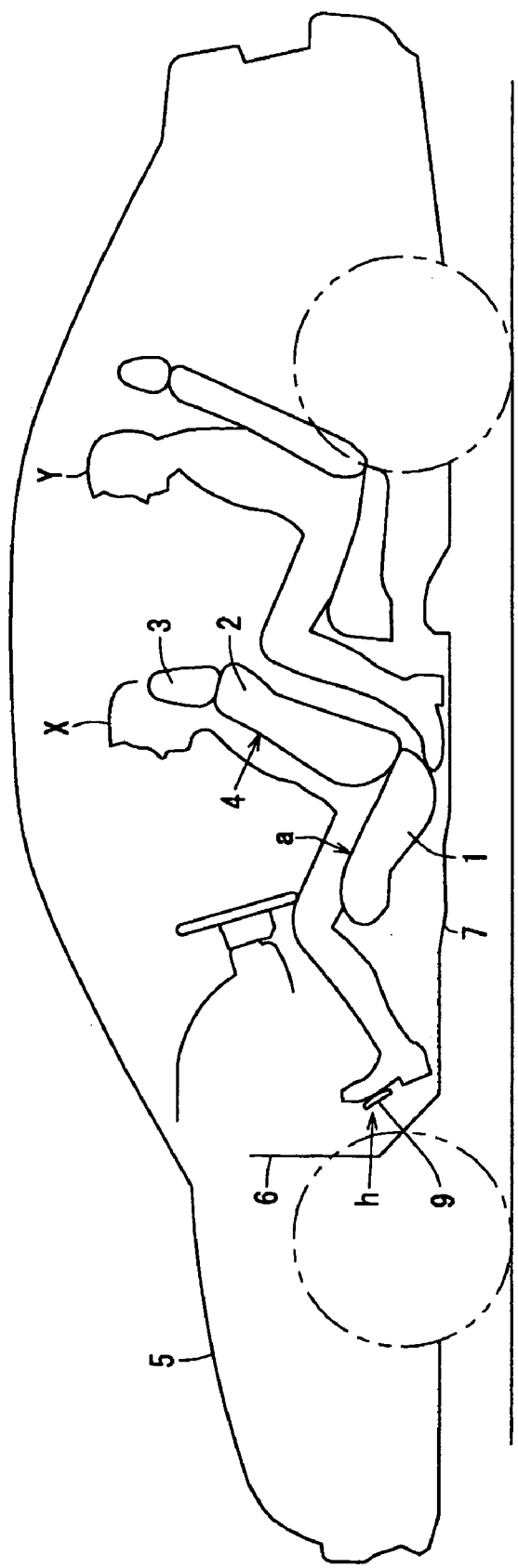
FIG. 15 is an explanatory diagram of a sports mode.
Figure 16:
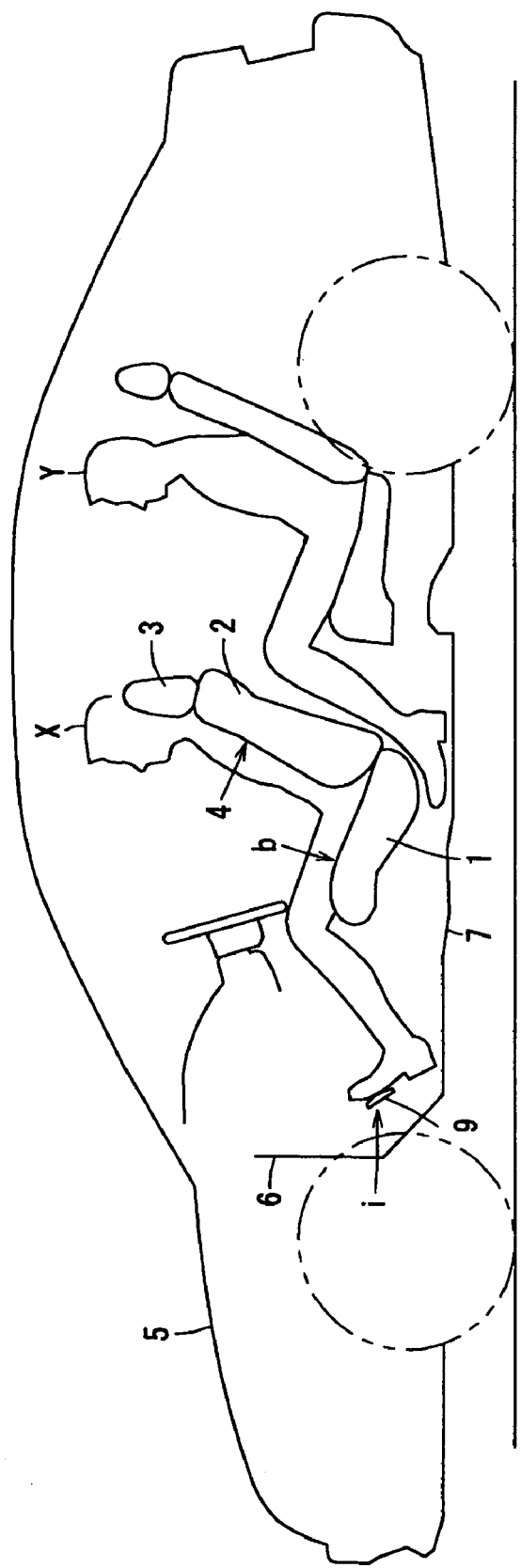
FIG. 16 is an explanatory diagram of a sedan mode.
Figure 17:
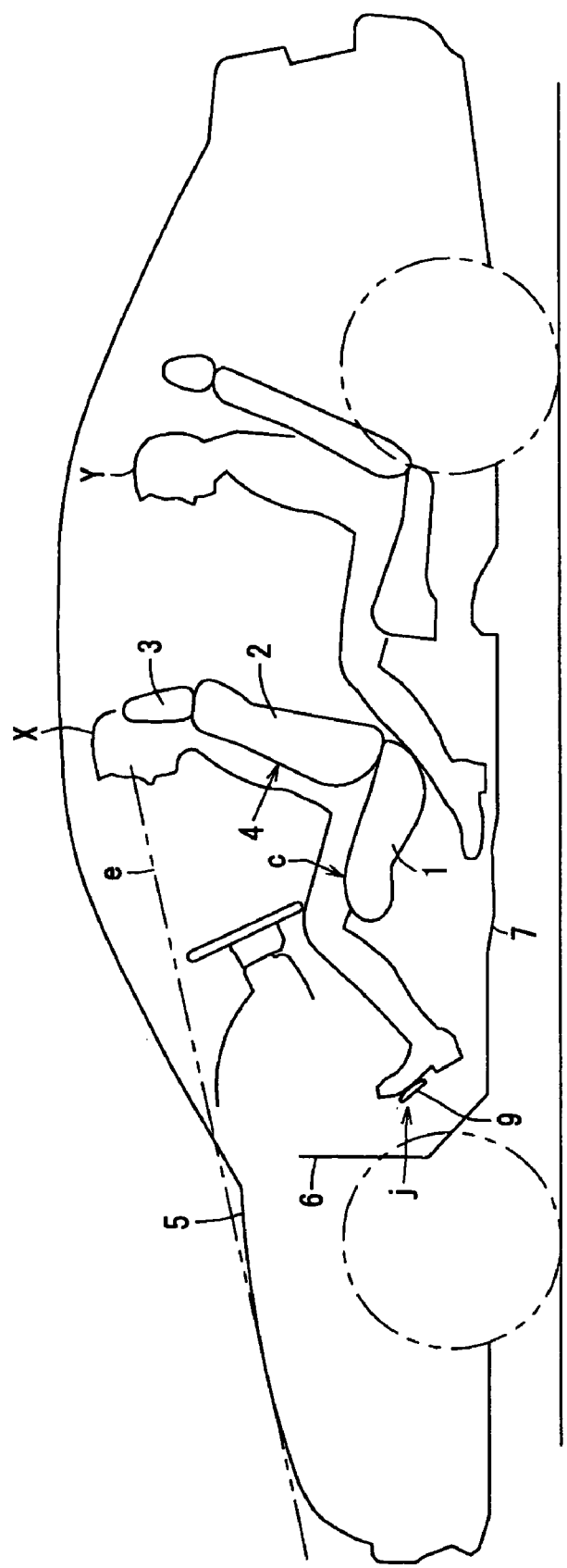
FIG. 17 is an explanatory diagram of a RV mode.
Figure 18:
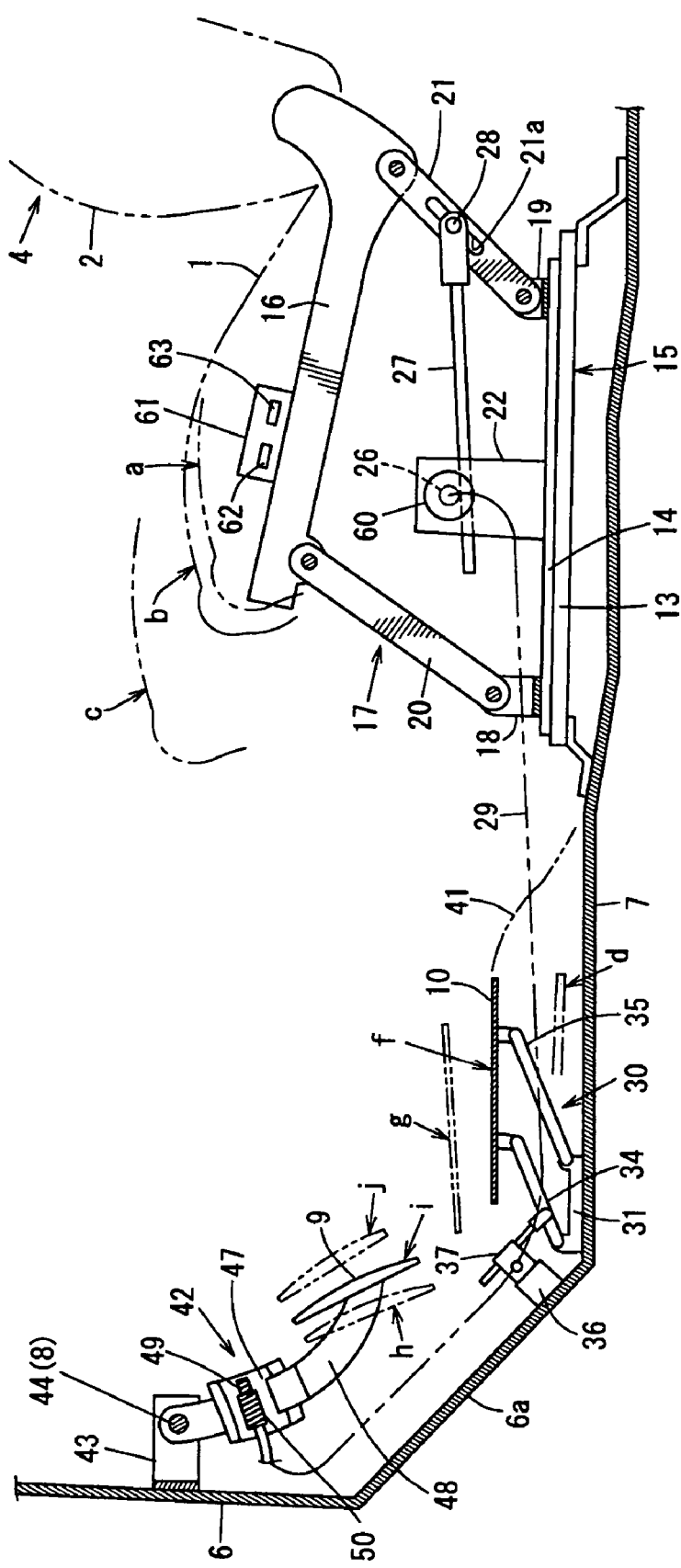
FIG. 18 is a side view showing a driver driving position adjusting device of a vehicle according to another embodiment.
Figure 19:
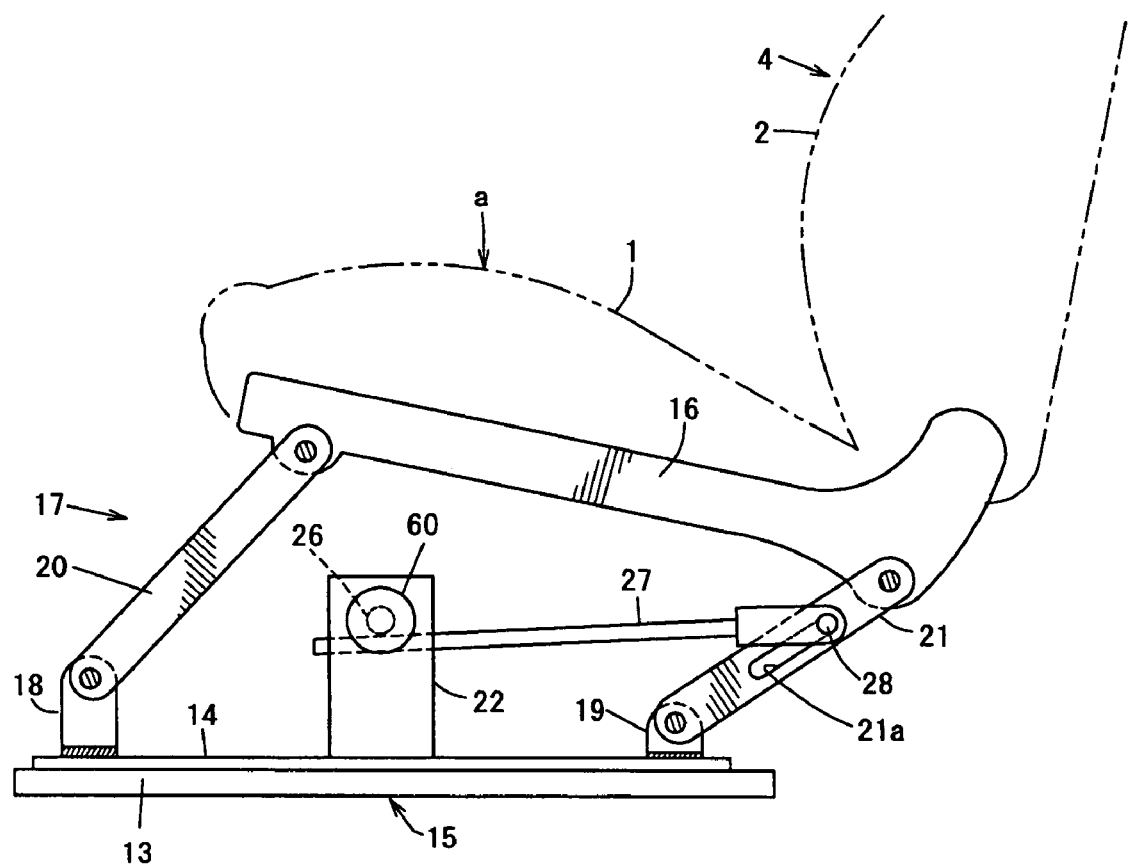
FIG. 19 is a side view showing a lower position of the seat.
Figure 20:
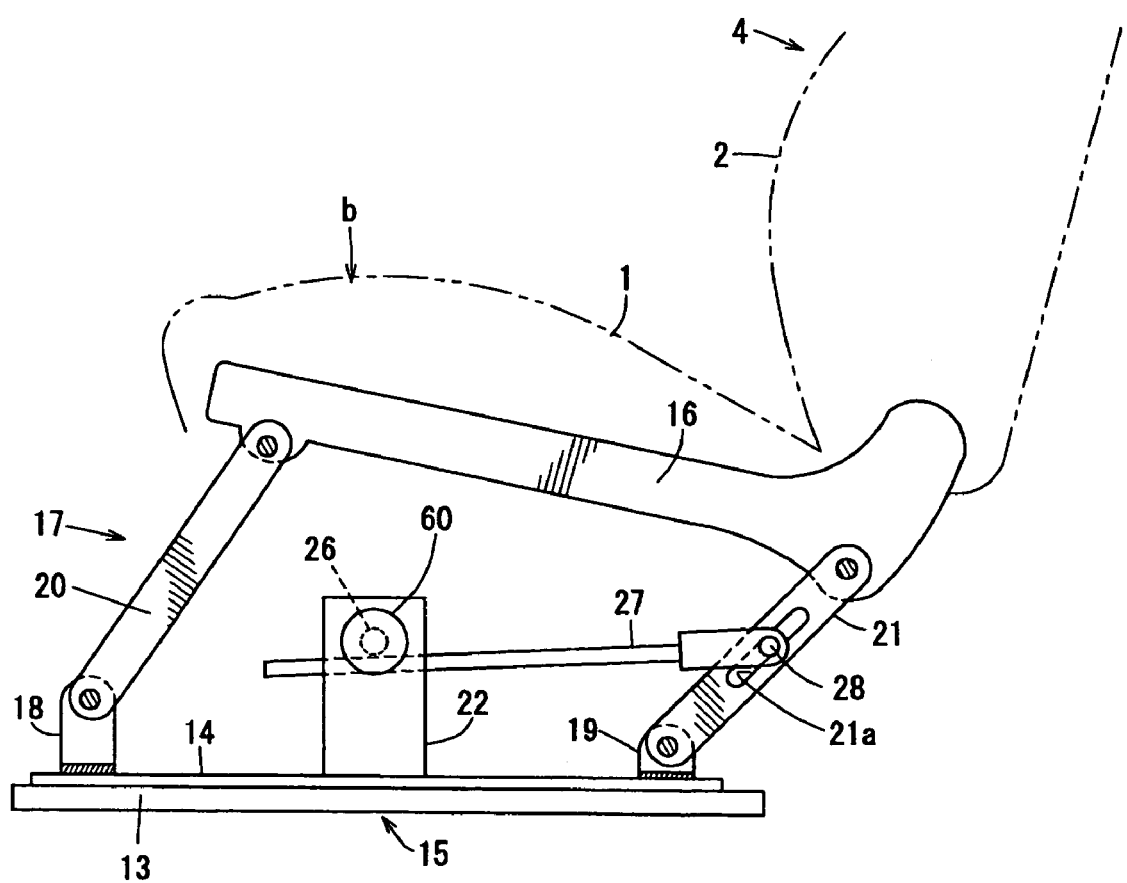
FIG. 20 is a side view showing a middle position of the seat.
Figure 21:
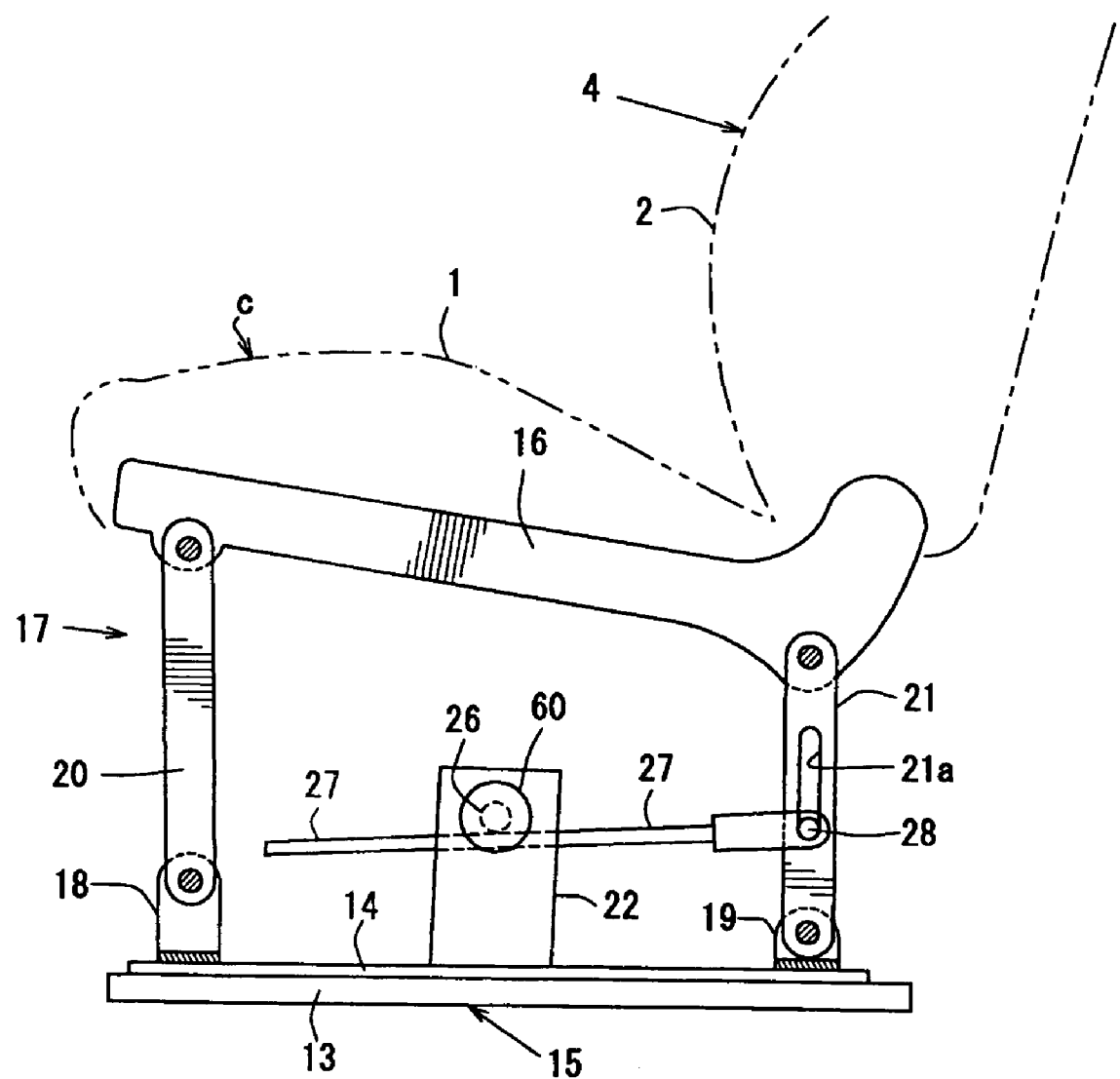
FIG. 21 is a side view showing an upper position of the seat.

FIGS. 15, 16 and 17 show respectively the sports mode, the sedan mode and the RV mode (recreational vehicle mode), which are selected by the same body size of driver X by use of the above-described driver driving position adjusting device. The sports mode shown in FIG. 15 is provided by setting the seat cushion 1 and the accelerator pedal 9 in the respective positions a and h (herein, illustrating the position of the movable floor panel 10 is omitted), the sedan mode shown in FIG. 16 is provided by setting them in the respective positions b and i, and the RV mode shown in FIG. 17 is provided by setting them in the respective positions c and j. Particularly, the state shown in FIG. 17 can provide a sufficiently wide space of foot space for a rear passenger Y and an enlarged rear-seat space, and further improve the package efficiency.

FIGS. 18 through 21 show another embodiment of the driver driving position adjusting device of a vehicle. In the previous embodiment, the pinion 26 (or worm) in the gearbox 22 at the seat position adjusting device 17 is manually operated by the lever 23 fixed to the gear 24. In the present embodiment shown in FIGS. 18 through 21, however, the pinion 26 (or worm) is driven by a motor (reversible motor), and there is provided a switch box 61 comprising a first switch (switch for rotating the motor in a certain direction) 62 and a second switch (switch for rotating the motor in a reverse direction) 63.

In other words, the first and second switches 62 and 63 and the flexible shafts 29, 29A and 29B constitute an electrically-operated driving position adjusting operating device operative to operate the seat position adjusting device 17, the movable floor panel adjusting mechanism 30 and the pedal position adjusting devices 42 and 42B.

This electrically-operated driving position adjusting operating device can also perform substantially the same functions and effects as those of the device in the previous embodiment. Accordingly, the same parts shown in FIGS. 18 through 21 as those shown in FIGS. 5 through 8 are denoted by the same reference characters and detailed description on them are omitted here.

FIGS. 22 through 27 show another embodiment of the movable floor panel adjusting mechanism.

Figure 22:
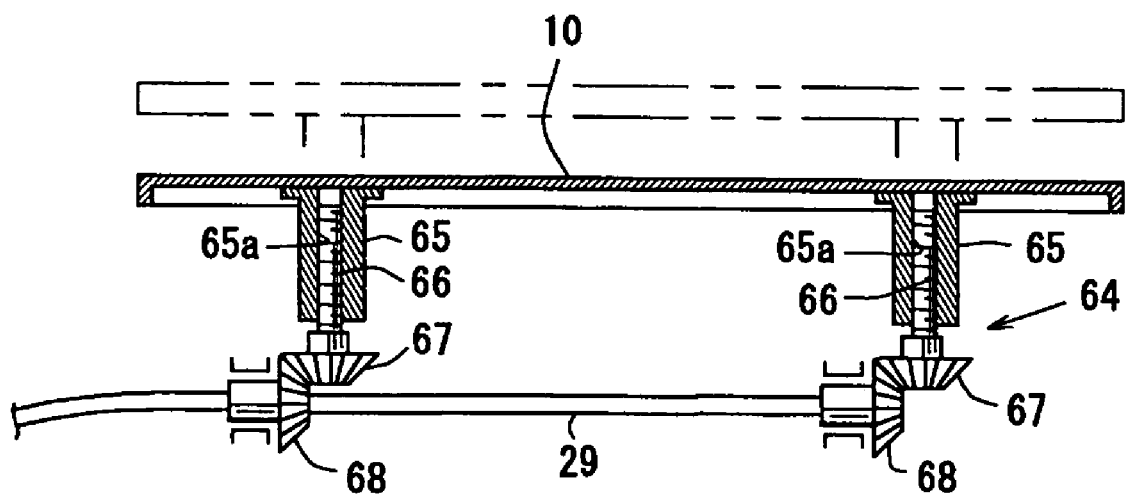
FIG. 22 is a side view showing a movable floor panel adjusting mechanism according to another embodiment.

In a movable floor panel adjusting mechanism 64 shown in FIG. 22, a plurality of guide cylinders 65 having screw holes 65a are fixed to the bottom face of the movable floor panel 10, and driven bevel gears 67 are integrally attached to lower portions of screws (screw shafts) 66 to mesh with the respective screw holes 65a. Meanwhile, driving bevel gears 68 are attached at specified portions of the flexible shaft 29 so as to mesh with the driven bevel gears 67. Accordingly, the movable floor panel 10 is moved up and down by the respective parts 68, 67, 66, 65a and 65 during the rotation of the flexible shaft 29.

The movable floor panel adjusting mechanism 64 shown in FIG. 22 can move up and down the movable floor panel 10, on which the heel of the driver operating the pedals 9 and 51 is placed, maintaining its horizontal position.

Figure 23:
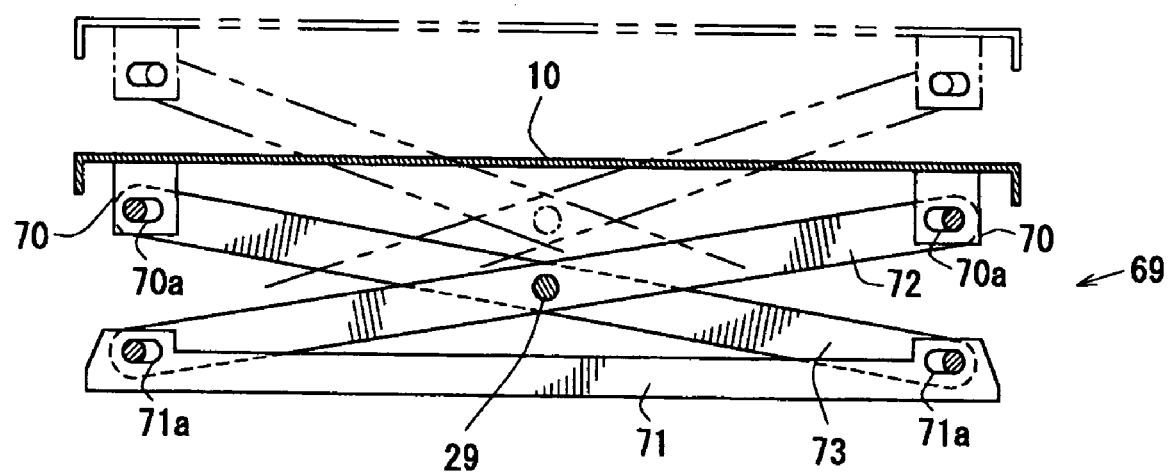
FIG. 23 is a side view showing a movable floor panel adjusting mechanism according to further another embodiment.

In a movable floor panel adjusting mechanism 69 shown in FIG. 23, support brackets 70 are attached to the bottom face of the movable floor panel 10, and a support member 71 is provided at a side of the fixed floor panel 7 (see the previous drawing). And, both ends of two links 72 and 73, which are assembled in a X shape, are coupled to respective long holes 70a and 71a of the support brackets 70 and the support member 71 via pins, and the flexible shaft 29 is provided at the intersection portion of the two links 72 and 73 so as to transfer a rotational force thereof to either one of the two links 72 and 73. Accordingly, the movable floor panel 10 is moved up and down via the links 72 and 73 during the rotation of the flexible shaft 29.

The movable floor panel adjusting mechanism 69 shown in FIG. 23 can move up and down the movable floor panel 10, on which the heel of the drivers L, M and S operating the pedals 9 and 51 is placed, maintaining its horizontal position.

Figure 24:
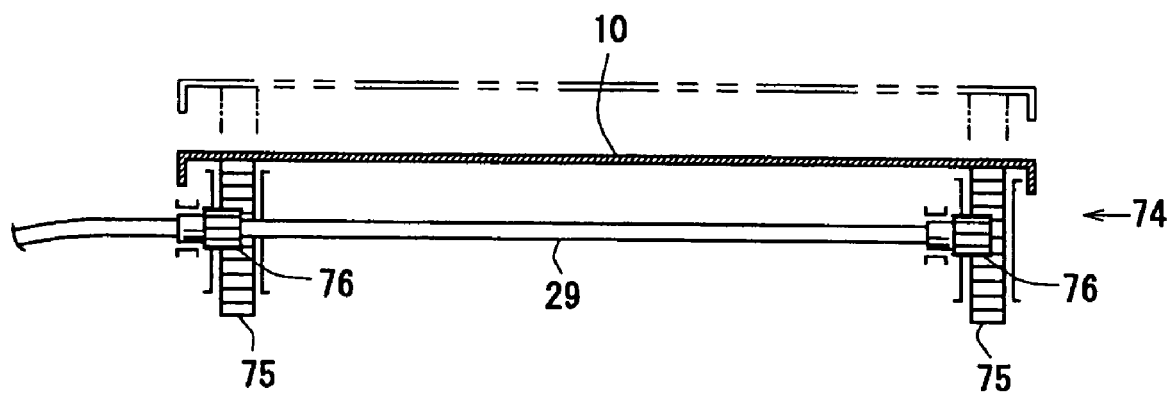
FIG. 24 is a side view showing a movable floor panel adjusting mechanism according to further another embodiment.

In a movable floor panel adjusting mechanism 74 shown in FIG. 24, a plurality of rack members 75, 75 are fixed to the bottom face of the movable floor panel 10, and pinions 76, 76 (or worm) meshing with the rack members 75, 75 are attached to specified portions of the flexible shaft 29 which correspond respectively to the rack members 75, 75. Accordingly, the movable floor panel 10 is moved up and down via the rack and poison mechanism during the rotation of the flexible shaft 29.

The movable floor panel adjusting mechanism 74 shown in FIG. 24 can move up and down the movable floor panel 10, on which the heel of the drivers L, M and S operating the pedals 9 and 51 is placed, maintaining its horizontal position.

Figure 25:
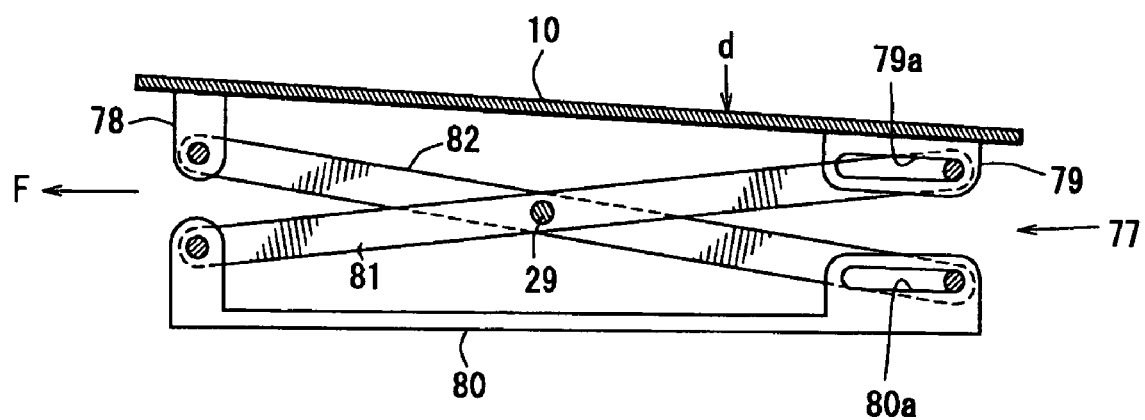
FIG. 25 is a side view showing a movable floor panel adjusting mechanism according to further another embodiment.
Figure 26:
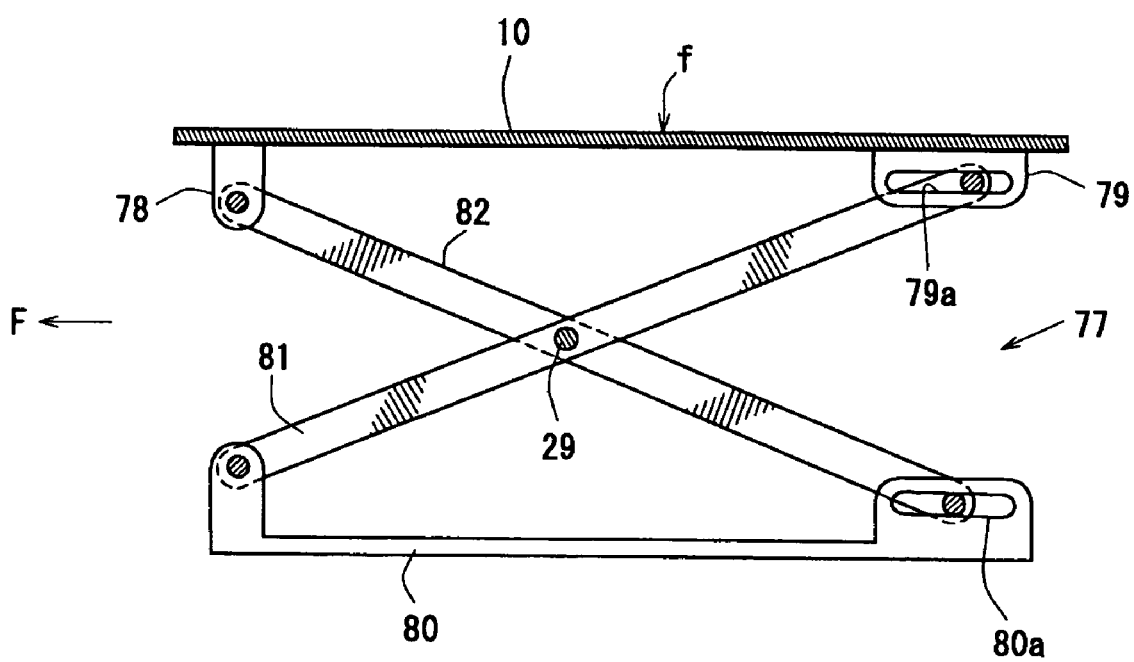
FIG. 26 is a side view showing a middle position of the movable floor panel.
Figure 27:
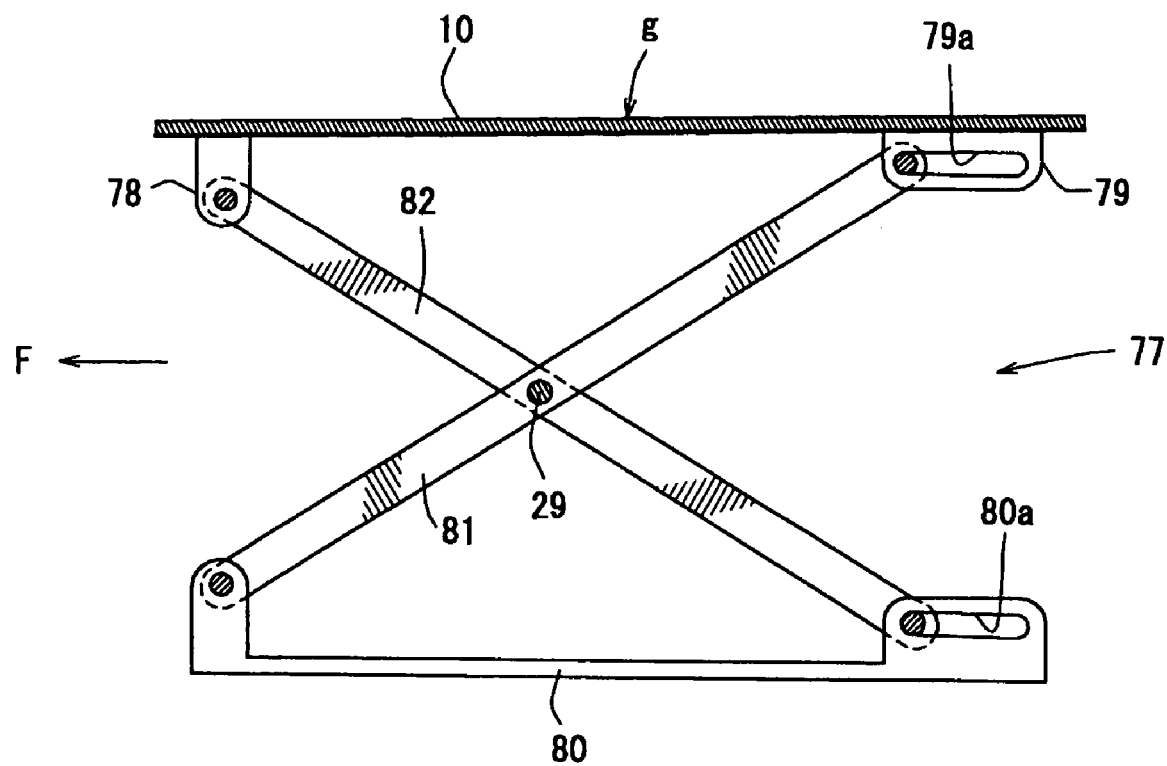
FIG. 27 is a side view showing an upper position of the movable floor panel.

In a movable floor panel adjusting mechanism 77 shown in FIGS. 25 through 27, support brackets 78 and 79 are attached to bottom face of the movable floor panel 10, and a support member 80 is fixed at the side of the fixed floor panel 7 (see the previous drawing). The front end of the support member 80 and a long hole 79a at the rear bracket 79 are coupled by a link 81 via pins, and a long hole 80a of the support member 80 and the front bracket 78 are coupled by another link 82 via pins.

And, the flexible shaft 29 is provided at an intersection portion of the above-described two links 81 and 82 which are assembled in a X shape. Herein, the distance between the intersection portion and front ends of the links 81 and 82 is configured so as to be longer than the distance between the intersection portion and rear ends of the links 81 and 82.

Also, the flexible shaft 29 provided at the intersection portion is configured so as to transfer the rotational force only to the link 81 of the two links 81 and 82. Accordingly, the movable floor panel 10 is moved vertically and slant to the positions d, f, g shown in FIGS. 25, 26 and 27 via the links 81 and 82 during the rotation of the flexible shaft 29.

In the movable floor panel adjusting mechanism 77 shown in FIGS. 25 through 27, the vertical position and operating angle of the movable floor panel 10 on which the heel of the drivers L, M and S operating the pedals 9 and 51 is placed can be adjusted by an offset arrangement of the intersection portion as shown in FIG. 4. Namely, the movable floor panel 10 slants in the front-high and rear-low state in its low position d shown in FIG. 25, it lies almost horizontally in its middle position f shown in FIG. 26, and it slants reversely in the front-low and rear-high state in its high position g shown in FIG. 27. Herein, an arrow F in FIGS. 25 through 27 shows the vehicle's forward direction.

Figure 28:
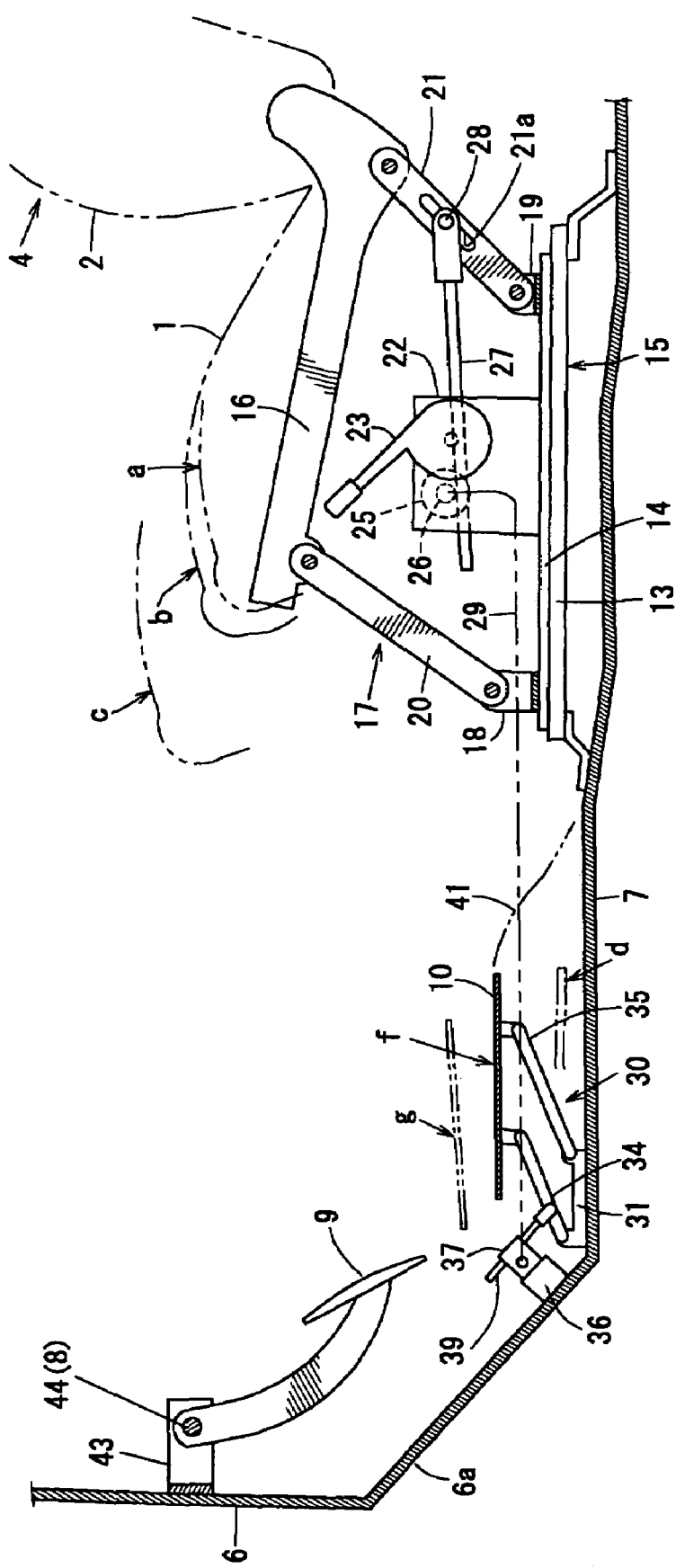
FIG. 28 is a side view showing a driver driving position adjusting device of a vehicle according to further another embodiment.

FIG. 28 shows further another driver driving position adjusting device of a vehicle. In the previous embodiments shown in FIGS. 5 and 18, the seat position adjusting device 17, movable floor panel adjusting mechanism 30 and pedal position adjusting devices 42, 42B are adjusted together. In the embodiment shown in FIG. 28, however, both the seat position adjusting device 17 and the movable floor panel adjusting mechanism 30 are adjusted together.

Namely, the embodiment shown in FIG. 28 shows the driver driving position adjusting device of a vehicle which comprises the seat position adjusting device 17 operative to adjust the seat face position of the seat 4, the movable floor panel adjusting mechanism 30 operative to adjust at least the vertical position of the movable floor panel 10 on which the leg portion of the driver operating the pedal 9 is placed, and the driving position adjusting operating device (see the lever 23 and the flexible shaft 29) operative to operate the seat position adjusting device 17 and the movable floor panel adjusting mechanism 30.

Accordingly, the seat position adjusting device 17 adjusts the seat face position of the seat 4, the movable floor panel adjusting mechanism 30 adjusts at least the vertical position of the movable floor panel 10 on which the leg portion (see heel) of the driver operating the pedal 9 is placed, and the driving position adjusting operating device (see the lever 23 and the flexible shaft 29) operative to operate the seat position adjusting device 17 and the movable floor panel adjusting mechanism 30.

Accordingly, the seat face of the seat 4 can be adjusted in the upper position and the vertical position of the movable floor panel 10 can be adjusted upward for the smaller size of driver, whereas the seat face of the seat 4 can be adjusted in the lower position and the vertical position of the movable floor panel 10 can be adjusted downward for the larger size of driver. As a result, regardless of the body size of driver, both the proper driving position and the clear front view can be obtained, and such proper driving position can be obtained even though the longitudinal adjusting distance of the seat 4 is small, and also the proper pedal operation can be obtained by adjusting the vertical position of the movable floor panel 10.

Since other structures, functions and effects of the embodiment shown in FIG. 28 are substantially the same as those of the previous embodiment, the same parts are denoted by the same reference characters and detailed descriptions on those are omitted here.

Figure 29:
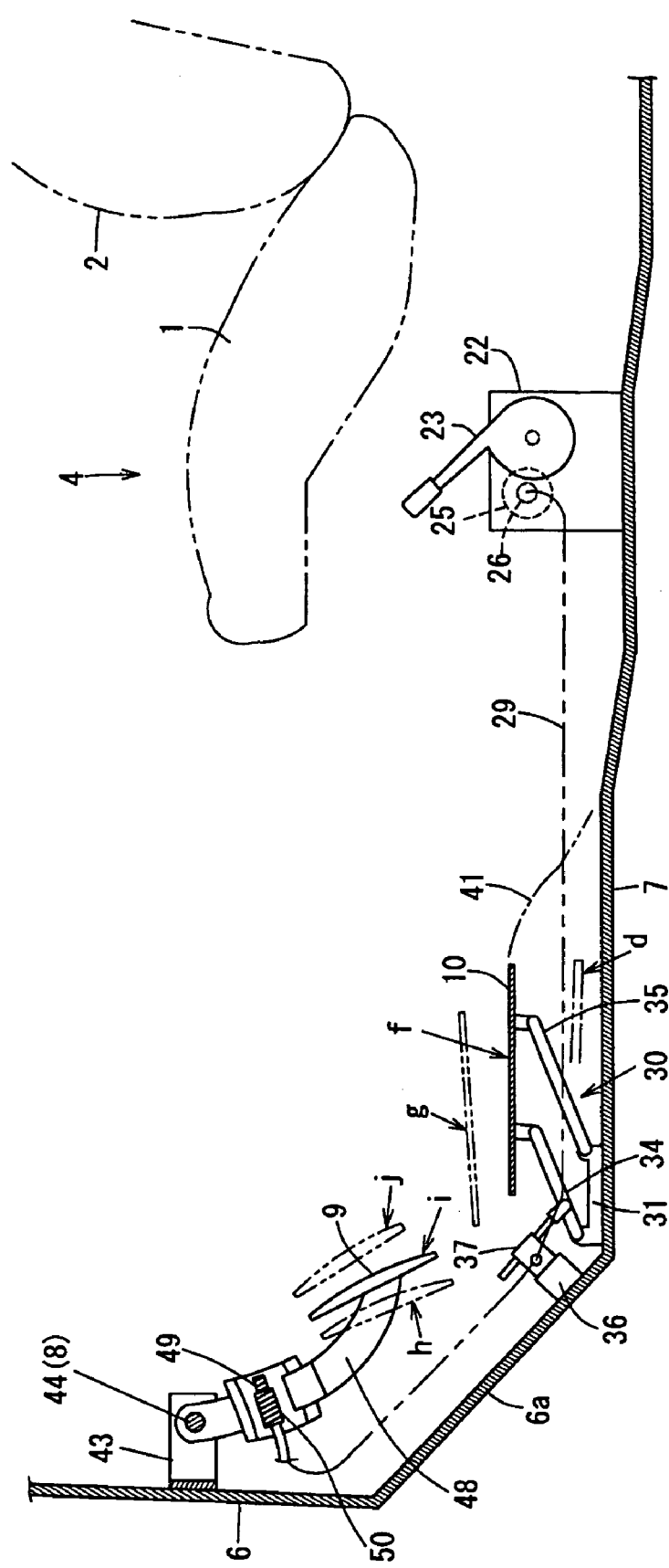
FIG. 29 is a side view showing a driver driving position adjusting device of a vehicle according to further another embodiment.

FIG. 29 shows further another driver driving position adjusting device of a vehicle. In the previous embodiments shown in FIGS. 5 and 18, the seat position adjusting device 17, movable floor panel adjusting mechanism 30 and pedal position adjusting devices 42 and 42B are adjusted together. In the embodiment shown in FIG. 29, however, both the movable floor panel adjusting mechanism 30 and the pedal position adjusting devices 42 and 42B are adjusted together.

Namely, the embodiment shown in FIG. 29 shows the driver driving position adjusting device of a vehicle which comprises the pedal position adjusting devices 42 and 43B operative to adjust at least pedal operating angles of the pedals 9 and 51 operated by the leg portions of the drivers L, M and S, the movable floor panel adjusting mechanism 30 operative to adjust at least the vertical position of the movable floor panel 10 on which the leg portions of the drivers L, M and S operating the pedals 9 and 51 are placed, and the driving position adjusting operating device (see the lever 23 and the flexible shaft 29, 29A and 29B) operative to operate the pedal position adjusting devices 42 and 42B and the movable floor panel adjusting mechanism 30.

Accordingly, the pedal position adjusting devices 42 and 43B adjusts at least pedal operating angles of the pedals 9 and 51 operated by the leg portions of the drivers L, M and S at substantially the same angles regardless of the body size of drivers L, M and S, the movable floor panel adjusting mechanism 30 adjusts at least the vertical position of the movable floor panel 10 on which the leg portions of the drivers L, M and S operating the pedals 9 and 51 are placed, and the driving position adjusting operating device (see the lever 23 and the flexible shaft 29, 29A and 29B) operates the pedal position adjusting devices 42 and 42B and the movable floor panel adjusting mechanism 30.

Accordingly, the movable floor panel 10 can be adjusted respectively: in the upper position g for the small size of driver S; in the middle position f for the medium size of driver M; and in the lower position d for the larger size of driver L. Also, the pedal operating angles of the pedals 9 and 51 can be adjusted at substantially the same angles regardless of the body size of drivers L, M and S.

As a result, since the foot of even small size of driver S reaches the pedals 9 and 51 and thereby the driver sits on the seat 4 properly, the driver driving position can be further improved, thereby improving the operations of the pedals 9 and 51 and the steering wheel. Also, proper views for vehicle side mirrors, providing the narrower view angle, and vehicle meters are obtained.

Also, since the pedal operating angle is maintained at substantially the same angle regardless of the body size of drivers L, M and S, the optimization of the leg portion of driver during the pedal operation can be attained.

Likewise, since other structures, functions and effects of the embodiment shown in FIG. 29 are substantially the same as those of the previous embodiment, the same parts are denoted by the same reference characters and detailed descriptions on those are omitted here.

FIGS. 30 through 36 show further another embodiment of a driver driving operating adjusting device which is operative to adjust the steering position as well.

Figure 30:
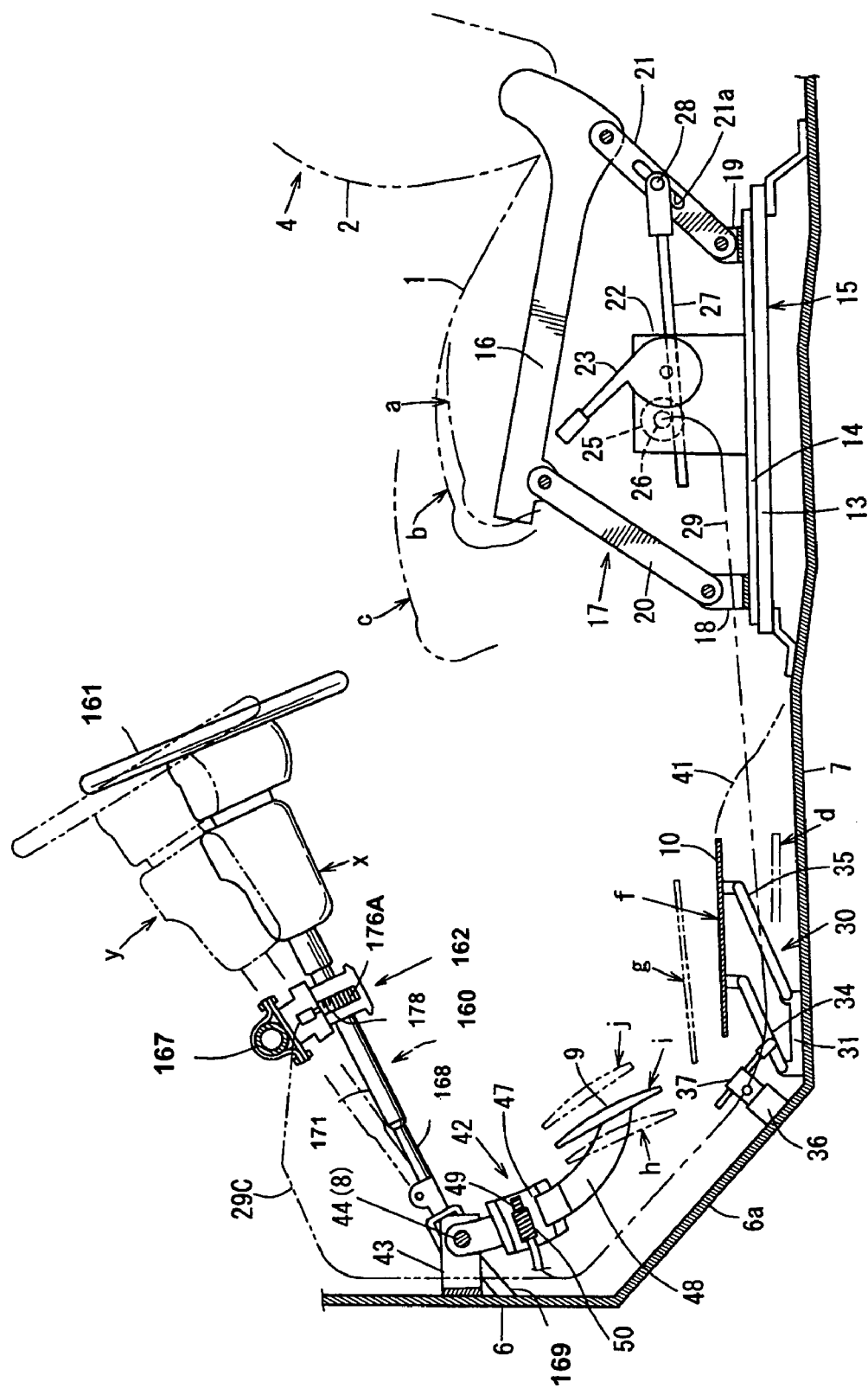
FIG. 30 is a side view showing a driver driving position adjusting device of a vehicle according to further another embodiment.

As shown in FIG. 30, there is provided a steering position adjusting device 162 which adjusts together the positions and angles of a steering shaft 160 and a steering wheel 161.

The steering position adjusting device 162 is configured as shown in FIGS. 31 through 34. Behind a dash lower 164 interposed between a cowl panel 163 and the dash lower panel 6 is provided a steering support member 167 as a vehicle body rigidity member laterally via steering support brackets 165 and 166.

Meanwhile, the steering shaft 160 comprises a first shaft 168 and a second shaft 169, which are interconnected via a universal joint 170 as a steering joint. The first shaft 168 is configured so as to be adjusted around the above-described rotational center 8 by locating a lower portion of the first shaft 168 at the rotational center 8 in a vehicle width direction.

At a lower portion of the second shaft 169 is provided a steering gear, and a steering wheel 161 is provided at an upper portion of the first shaft 168. A main part of the first shaft 168 is covered by a steering column 171 as a shaft tube.

Figure 32:
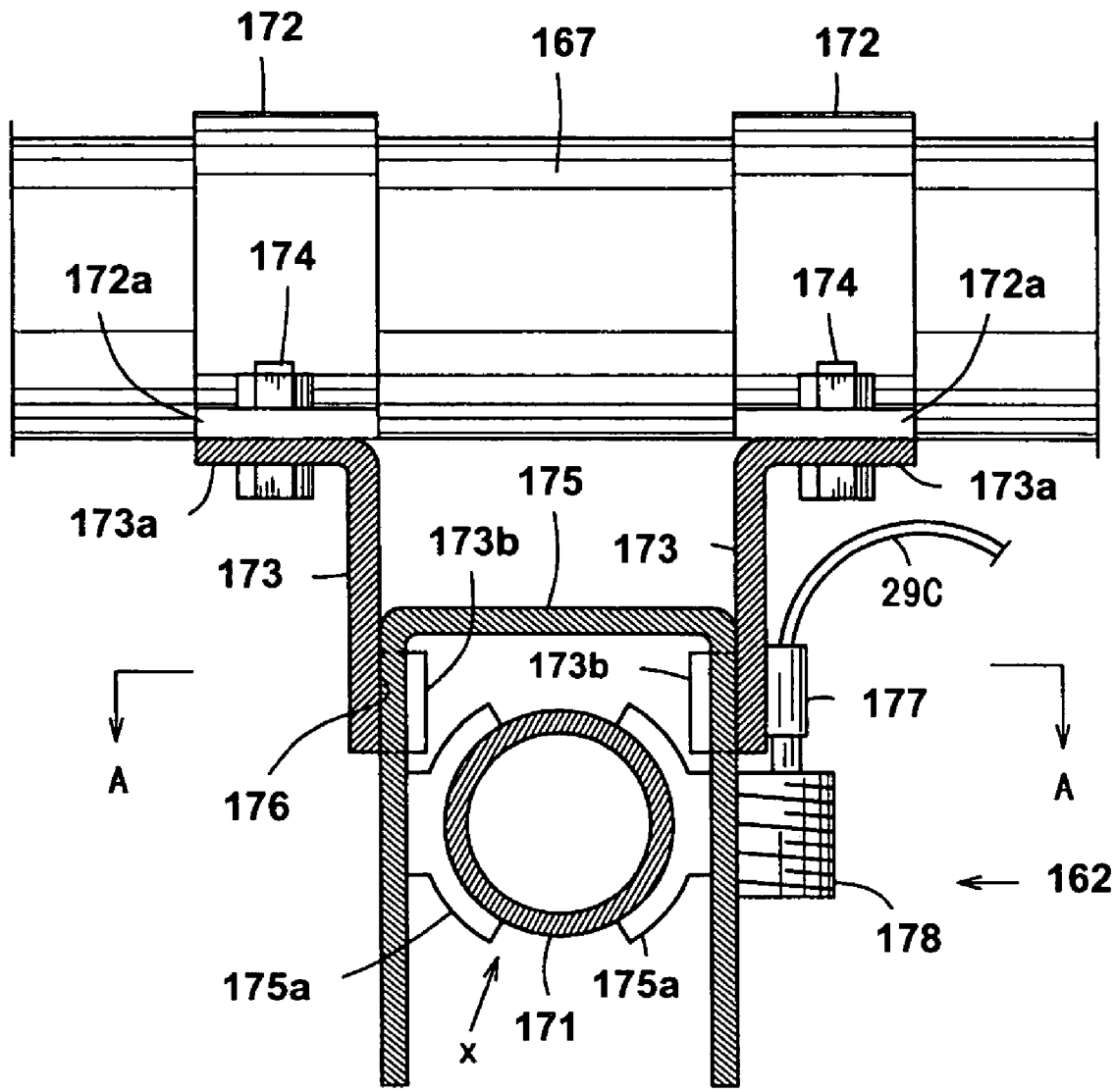
FIG. 32 is an explanatory diagram of a steering position for a large size of driver.
Figure 33:
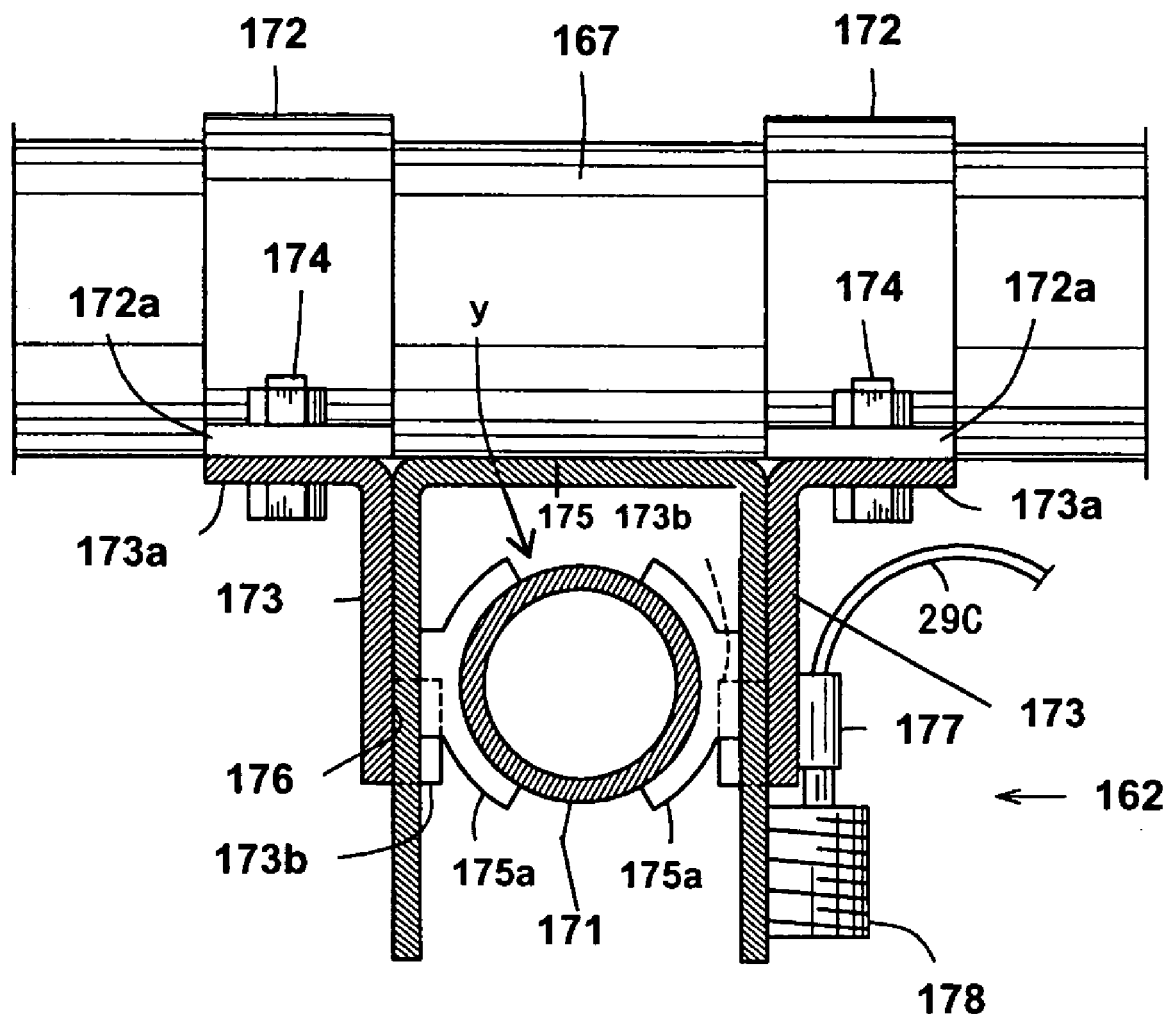
FIG. 33 is an explanatory diagram of a steering position for a small size of driver.
Figure 34:
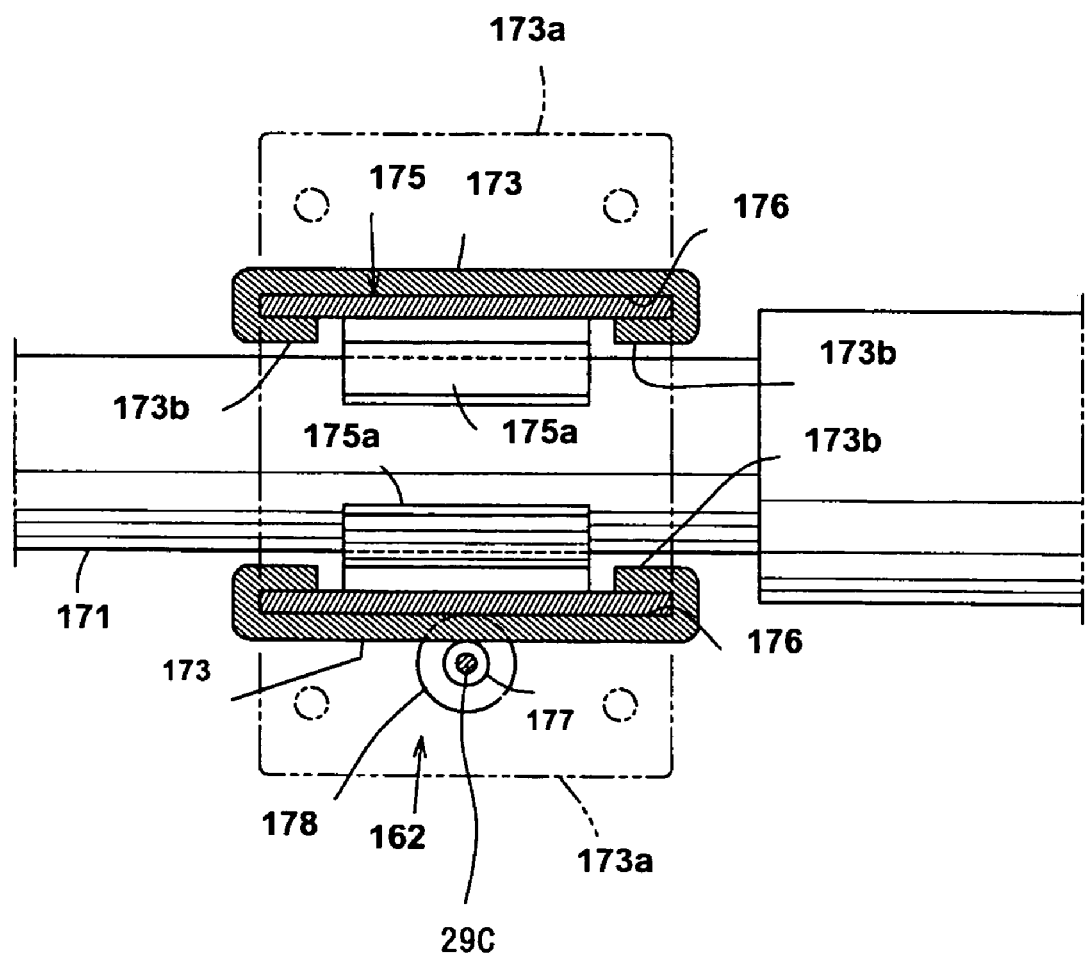
FIG. 34 is a sectional view taken along line A-A of FIG. 32.

A pair of upper and lower steering support members 172 and 173 are attached to the steering support member 167 which crosses the steering column 171 above the steering column 171 as shown in FIGS. 32 and 33. Namely, a lower flange 172a of the upper steering support member 172 and an upper flange 173a of the lower steering support member 173 are connected by a bolt-nut 174, thereby fixing the steering support members 172 and 173 to the steering support member 167.

The lower steering support member 173 is L-shaped, and return pieces 173b and 173b are formed integrally at respective facing inner sides of the pair of right and left steering support members 173 and 173. These return pieces 173b and 173b constitute a pair of right and left guide grooves 176 and 176 which guides a revere-U-shaped slider 175 to go up or down.

The slider 175 holds the steering column 171 from both sides by a pair of cramp portions 175a and 175a which are formed integrally at the inside of the slider 175, which moves up or down along the guide grooves 176 and 176. A rack portion 176A (see FIG. 31) is formed on at least one of side piece portions of the reverse-U-shaped slider 175, extending in the vertical direction.

Figure 31:
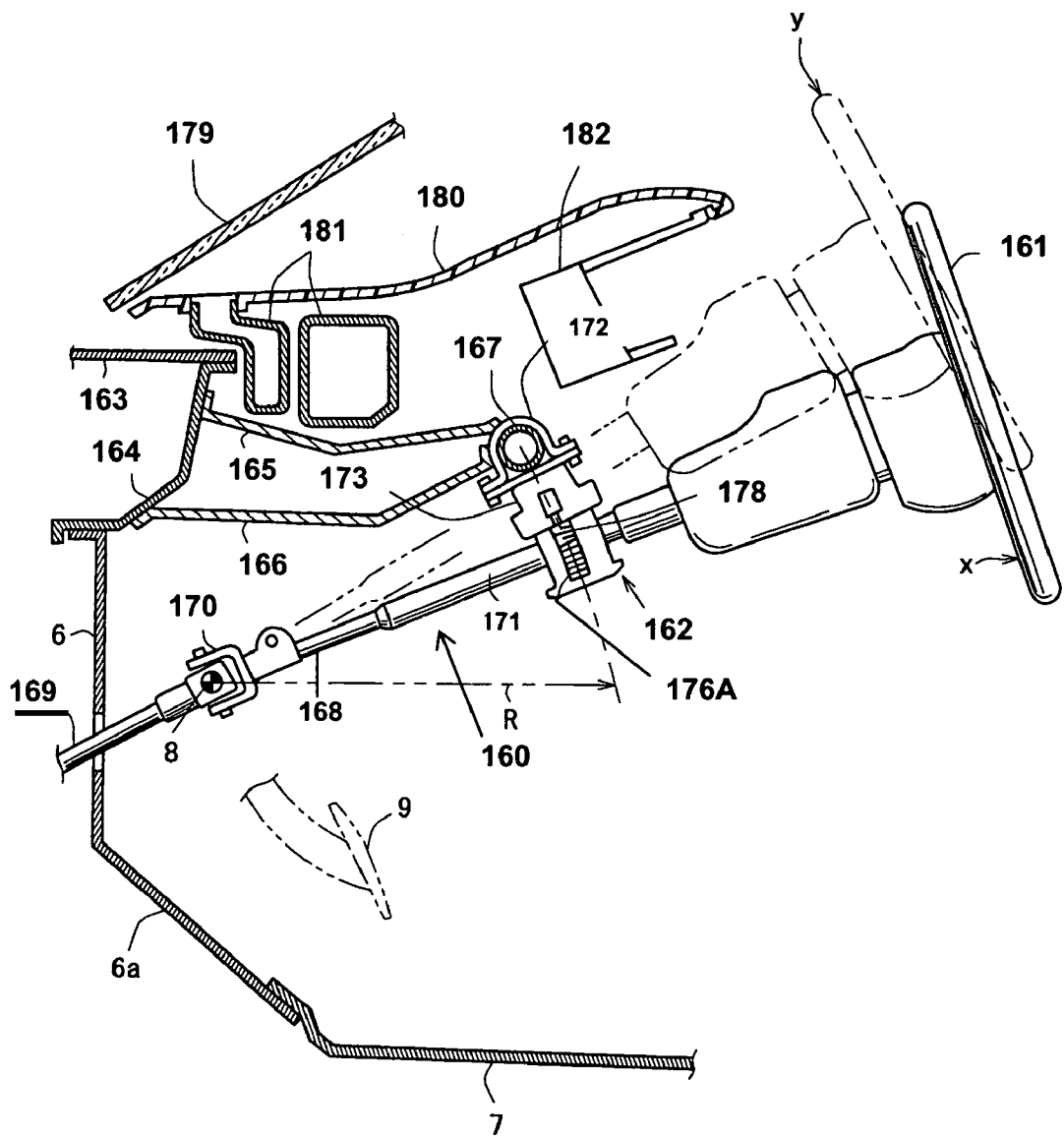
FIG. 31 is a side view showing a steering position adjusting device.

The rack portion 176A is formed so as to have the same curvature as an ark with a radius R having its center corresponding to the rotational center 8 as shown in FIG. 31. Meanwhile, a holder 177 of a flexible shaft 29C is attached to an outside face of the fixed-side steering support member 173, and a worm 178 meshing with the rack portion 176 is driven by the flexible shaft 29C.

The flexible shaft 29C can be provided by splitting the main flexible shaft 29 via a gearbox like the gearbox 52 shown in FIG. 14 at a disposition portion of the pedal position adjusting device 24.

Namely, the above-described steering position adjusting device 162 is configured so as to adjust together the position and the angle of the first shaft 168 and steering wheel 161 via the steering column 171 by use of the reverse-U-shaped slider 175 which is moved up or down along the guide grooves 176 and 176 by the worm 178 and rack portion 176A according to the rotation of the flexible shaft 29C.

Herein, the position shown by the solid line in FIGS. 30 and 31 and the position x in FIG. 32 correspond to the large size of driver L, the position shown by the two-dotted broken line in FIGS. 30 and 31 and the position y in FIG. 33 correspond to the small size of driver S, and the middle position between the both positions x and y corresponds to the standard size of driver M. Herein, reference numerals 179, 180, 181 and 182 in FIG. 31 denote respectively a windshield, instrument panel, air conditioning duct and meter.

Further, in the present embodiment, there is provided a driving position adjusting operating device operative to adjust the seat position adjusting device 17, movable floor panel adjusting mechanism 30, pedal position adjusting devices 42 and 42B and steering position adjusting device 162 as shown in FIG. 30. Herein, the lever 23 (see FIG. 30) and the flexible shafts 29, 29A, 29B (see FIG. 14) and 29C constitute the above-described driving position adjusting operating device.

And, this driving position adjusting operating device comprising the lever 23 and the flexible shafts 29, 29A, 29B and 29C operates the seat position adjusting device 17, the movable floor panel adjusting mechanism 30, pedal position adjusting devices 42 and 42B and steering position adjusting device 162 such that these devices are adjusted together with a specified relationship.

Namely, when the seat cushion 1 of the seat 4 is moved by the seat position adjusting device 17 from the rear-and-lower position a to the front and upper position c by way of the middle position b so as to locate the eyes line e of respective drivers L, M and S on the identical line as shown in FIG. 1, the movable floor panel 10 is moved by the movable floor panel adjusting mechanism 30 from the lower position d to the upper position g by way of the middle position f, the accelerator pedal 9 and the brake pedal 51 are moved by the pedal position adjusting devices 42 and 42B from the position h away from the driver to the position j close to the driver by way of the middle position i, and the position and angle of the steering shaft 160 are moved around the rotational center 8 by the steering position adjusting device 162 from the position x to the position y.

Also, as described in the previous embodiment, the seat position adjusting device 17 is configured so as to adjust not only the longitudinal position and vertical position of the seat cushion 1 but also the seat face angle of the seat cushion 1. Accordingly, the seat face angle of the seat cushion 1 is adjusted from its front-high and rear-low state to its horizontal state as shown in FIG. 3 according to the movement of the seat cushion 1 from the position a shown in FIG. 6 to the position c shown in FIG. 8 by way of the position b shown in FIG. 7.

Further, the movable floor panel adjusting device 30 is configured so as to adjust not only the vertical position of the movable floor panel 10 but also its angle with respect to the floor panel 7 together. Accordingly, the movable floor panel 10 is adjusted from the front-high and rear-low position (see FIG. 9) to the front-low and rear-high position (see FIG. 11) by way of the horizontal position (see FIG. 10) according to the movement of the movable floor panel 10 from the lower position d (see FIG. 9) to the upper position g (see FIG. 11) by way of the middle position f (see FIG. 10). Herein, the angles θ and φ (see FIG. 4) between the movable floor panel 10 in respective positions d, f, g and the pedal in the corresponding positions h, i, j are configured so as to have the same values regardless of their positions.

Additionally, the above-described pedal position adjusting devices 42 and 42B are operated such that the operating angles (see the angles θ and φ in FIG. 4) of the driver to operate the pedals 9 and 51 have the same angles in the respective positions h, i, j shown in FIG. 5. And, the pressing-face height of the pedals 9 and 51 is also adjusted together with the movable floor panel 10 in such a manner that it is located: in the lower position h when the movable floor panel 10 is in the lower position d (see FIG. 9); in the middle position i when the movable floor panel 10 is in the middle position f (see FIG. 10); and in the upper position j when the movable floor panel 10 is in the lower position g (see FIG. 11).

Namely, relationships between the drives L, M and S and the respective positions of the seat cushion 1, movable floor panel 10, pedals 9 and 51 and steering is set in such a manner that the positions a, d, h, x is for the large size of driver L, the positions b, f, i is for the medium size of driver M, and the positions c, g, j, y is for the small size of driver S.

As described above, according to the embodiment, there is provided the driver driving position adjusting device of a vehicle comprising the steering position adjusting device 162 operative to adjust the steering position, the movable floor panel adjusting mechanism 30 operative to adjust at least the vertical position of the movable floor panel 10 on which the leg portions of the drivers L, M and S operating the pedals 9 and 51 are placed, and the driving position adjusting operating device (see the lever 23, flexible shafts 29, 29A, 29B and 29C) operative to operate the steering position adjusting device 162 and the movable floor panel adjusting mechanism 30.

Accordingly, the steering position adjusting device 162 adjusts the steering position, the movable floor panel adjusting mechanism 30 adjusts at least the vertical position of the movable floor panel 10 on which the leg portions of the drivers L, M and S operating the pedal (at least one of the accelerator pedal, brake pedal and clutch pedal) are placed, and the driving position adjusting operating device (see respective parts 23, 29, 29A, 29B and 29C) operates the steering position adjusting device 162 and the movable floor panel adjusting mechanism 30.

Accordingly, the movable floor panel 10 can be adjusted respectively: in the upper position for the small size of driver S; in the lower position for the large size of driver L; and in the middle position for the standard size of driver M, so that respective drivers can operate the pedal with their proper leg-portion angles. In addition to this, the steering position (see positions of the steering shaft 160 and steering wheel 161) can be adjusted according to the body size of driver.

As a result, the proper driving position can be obtained regardless of the body size of drivers L, M and S. Particularly, the optimization of the leg-portion angle (angles of thighs, lower legs, and feet) and the arm-portion angle (angles of upper arms, lower arms, and hands) can be attained.

Also, the steering position adjusting device 162 is operative to adjust the steering position such that the steering is moved around the rotational center 8 of the pedals 9 and 51. Accordingly, the positional relationship between the drivers' arm portion and the steering wheel 161 can be made proper regardless of the body size of driver, maintaining the proper driving position.

Further, the movable floor panel adjusting mechanism 30 is operative to adjust the vertical position and the panel angle of the movable floor panel 10. Accordingly, since the movable floor panel adjusting mechanism 30 adjusts not only the vertical position (i.e., height) of the movable floor panel 10 but also the panel angle of the movable floor panel 10, the relative angles $\theta$ and $\phi$ between the pedals 9 and 51 and the movable floor panel 10 can be maintained at the substantially constant angle during the vertical movement of the movable floor pedal 10. Also, even though the size or the heel size of driver's shoes change, such change may be absorbed properly by pressing the appropriate position of the pedals 9 and 51 (see the pedal center).

Additionally, the above-described driving position adjusting operating device (see the lever 23 and flexible shafts 29, 29A, 29B and 29C) is operative to operate the movable floor panel adjusting mechanism 30 and the steering position adjusting device 162 such that the devices are adjusted together with the specified relationship. Accordingly, since both the movable floor panel adjusting mechanism 30 and the steering position adjusting device 162 are operated together by the driving position adjusting operating device (see the respective parts 23, 29, 29A, 29B and 29C), the operation can be simplified and improved.

The specified relationship is arranged such that the movable floor panel 10 adjusted by the movable floor panel adjusting mechanism 30 is moved upward from the lower position when the steering wheel 161 adjusted by the steering position adjusting device 162 is moved upward. Accordingly, further optimization of the leg-portion angle of the drivers L, M and S operating the pedals 9 and 51 and the arm-portion angle of the drivers operating the steering wheel 161 can be attained.

Also, the steering position adjusting device 162 is operative to adjust also the angle of the steering (see the angle of steering shaft 160 and steering wheel 161). Accordingly, since not only the steering position but the steering angle are adjusted, the operation of steering wheel 161 can be further improved.

Further, there are provided the pedal position adjusting devices 42 and 42B operative to adjust the operating angles of the pedals 9 and 51 operated by the drivers L, M and S. Accordingly, since the pedal operating angles of the pedals 9 and 51 are adjusted in addition to the adjustment of position of the movable floor panel 10, the leg of even small size of driver S can reach the pedals enough to provide the proper driving position. This proper driving position can also improve the operation of pedals 9 and 51 and steering wheel 161 and provide the driver with the proper sitting on the seat 4. Thus, proper views for vehicle side mirrors, providing the narrower view angle, and vehicle meters are obtained as well.

Further, there is provided the seat position adjusting device 17 operative to adjust the seat face position of the seat 4 for the drivers L, M and S. Accordingly, the seat face position of the driver seat 4 is adjusted by the seat position adjusting device 17 in addition to the adjustments of the vertical position of the movable floor panel 10 by the movable floor panel adjusting mechanism 30 and the steering position by the steering position adjusting device 162, even the small size of driver S can operate the pedals 9 and 51 properly and the clear front view of the driver S can be obtained.

Further, when the seat 4 adjusted by the seat position adjusting device 17 is moved forward and upward from the rear-and-lower position, the movable floor panel 10 adjusted by the movable floor panel adjusting mechanism 30 is moved upward from the lower position and the pedals 9 and 51 adjusted by the pedal position adjusting device 42 are moved around the rotational center 8 of the pedals 9 and 51 toward the driver.

The movement of the pedals 9 and 51 around the rotational center 8 means the both adjustments of the pedal operating position and the pedal operating angle. Accordingly, the seat face of the seat 4 and the movable floor panel 10 can be adjusted in their upper positions and the pedal operating position and angle of the pedals 9 and 51 can be adjusted to be suitable for the small size of driver S, the seat face of the seat 4 and the movable floor panel 10 can be adjusted in their lower positions and the pedal operating position and angle of the pedals 9 and 51 can be adjusted to be suitable for the large size of driver L, and the seat face and the movable floor panel 10 can be adjusted in their middle positions and the pedal operating position and angle of the pedals 9 and 51 can be adjusted to be suitable for the standard size of driver M.

As a result, regardless of the body size of drivers L, M and S, both the proper driving position and the clear front view, even for the small size of driver S, can be obtained, and such proper driving position can be obtained even though the longitudinal adjusting distance of the seat 4 is small, and also the proper pedal operation can be obtained by adjusting the movable floor panel. Additionally, since the pedal operating position and angle of the pedals 9 and 51, the position of the movable floor panel 10 and seat face position of the seat 4 are adjusted, the optimization of the leg-portion angle and the pedal operating direction of the driver operating the pedals 9 and 51 can be attained. Further, the optimization of the arm-portion angle of the driver operating the steering wheel 161 can be attained by the adjustment of steering position.

The difference of body size of the drivers L, M and S is mainly expressed to the difference of the total length of the thighs and the lower legs (i.e., the difference of length of the legs). Accordingly, the angle between the thigh and lower leg of driver on the seat 4 and the operating direction to press the pedal face by the driver who sits on the seat 4 with legs being upward-joint bent depend on the body size of the driver sitting on the seat. Herein, since the seat face position of the seat 4 and the pedal operating position and angle are adjusted respectively by the seat position adjusting device 17 and the pedal position adjusting devices 42 and 42B, the both (the seat face position and the pedal operating position and angle of the pedals 9 and 51) can be adjusted so as to be suitable for the driver's body size. As a result, the optimization of the leg-portion angle and the pedal operating direction of the driver operating the pedals 9 and 51 can be attained, and the proper pedal operation can be obtained regardless of the body size of drivers L, M and S.

Also, according to the embodiment in which the seat 4, pedals 9 and 51, movable floor panel 10, and the steering are adjusted such that the driver is moved along the specified arc having the center corresponding to the rotational center 8 of the pedals 9 and 51 under a state where the specified driver position is maintained (comfortable position from the human engineering standpoint), the driver can obtain the comfortable driving positions in any positions.

Figure 35:
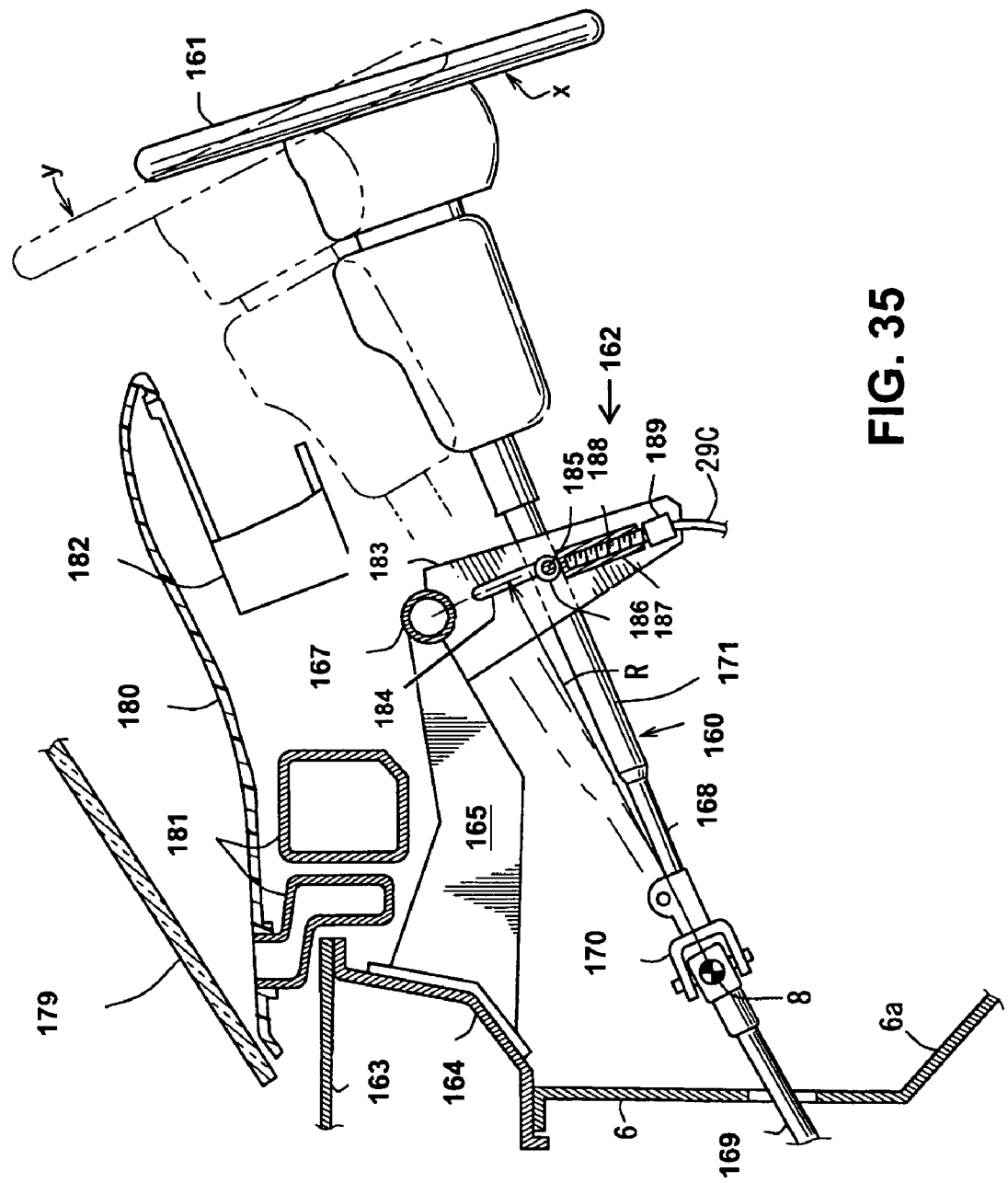
FIG. 35 is a side view showing a steering position adjusting device according to another embodiment.

FIG. 35 shows the steering position adjusting device 162 according to another embodiment. A steering support member 183 (only one thereof is illustrated), which is coupled to the steering support member 167 and the steering support bracket 165, is provided at both sides of the steering column 171. And, a long hole 184 is formed at the steering support member 183 so as to have the same curvature as the arc with the radius R having its center corresponding to the rotational center 8, and a pin 185 projecting on the steering column 171 is inserted in the long hole 184.

Further, at a projecting portion of the pin 185 projecting from the long hole 184 on the steering support member 183 is provided a nut member 187 via a ring 186. A screw member 188 meshing with the nut member 187 is driven by the flexible shaft 29C, and the screw member 188 is rotated via an attachment 189 during the rotation of the flexible shaft 29C. Accordingly, the steering shaft 160 and the steering wheel 161 ate adjusted along the long hole 184 in the positions x and y.

Since this embodiment also performs substantially the same functions and effects as those of the previous embodiment, the same parts shown in FIG. 35 as those shown in the previous figure are denoted by the same reference characters and detailed description on them are omitted here.

Figure 36:
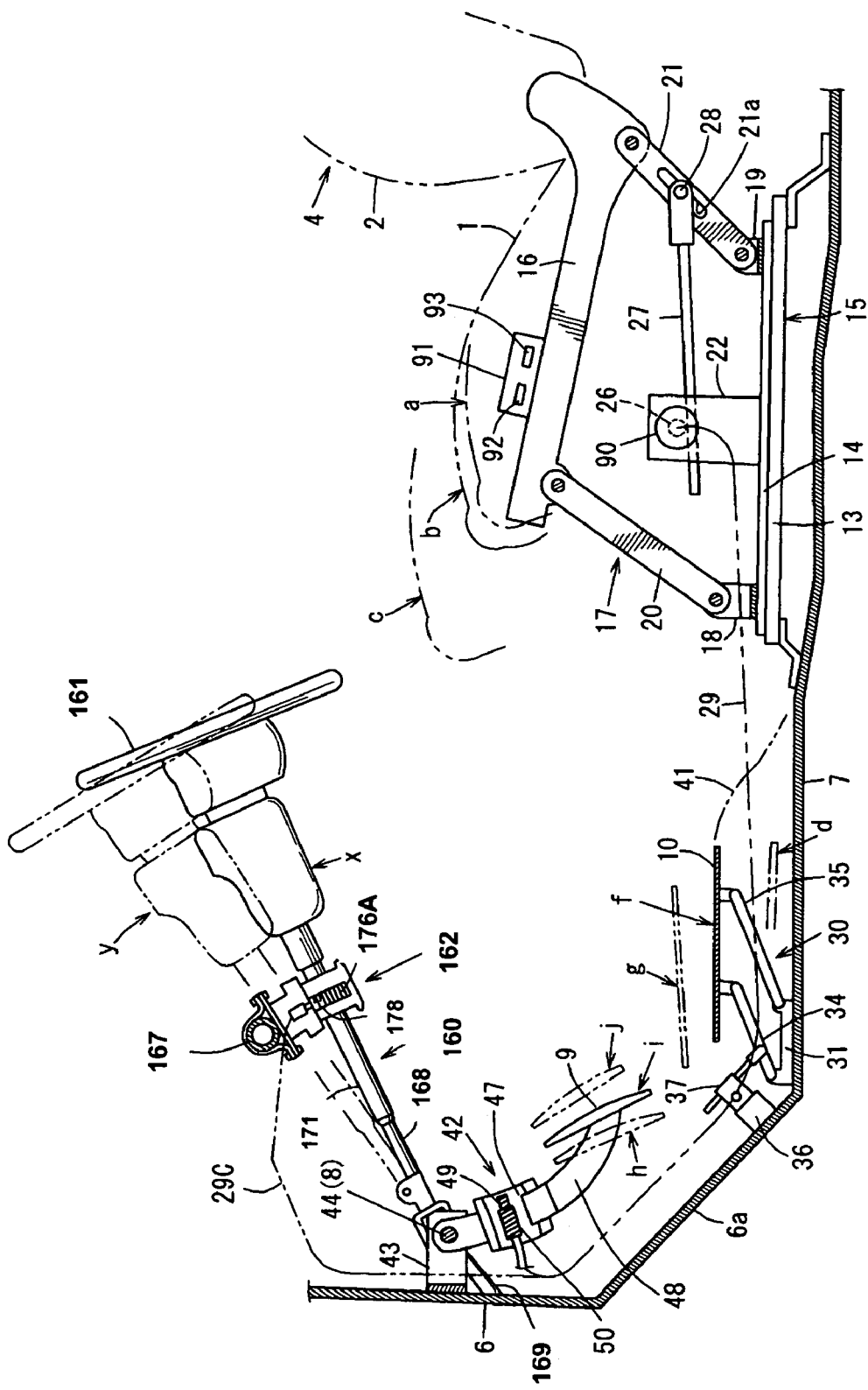
FIG. 36 is a side view showing a driver driving position adjusting device of a vehicle according to further another embodiment.
Figure 37:
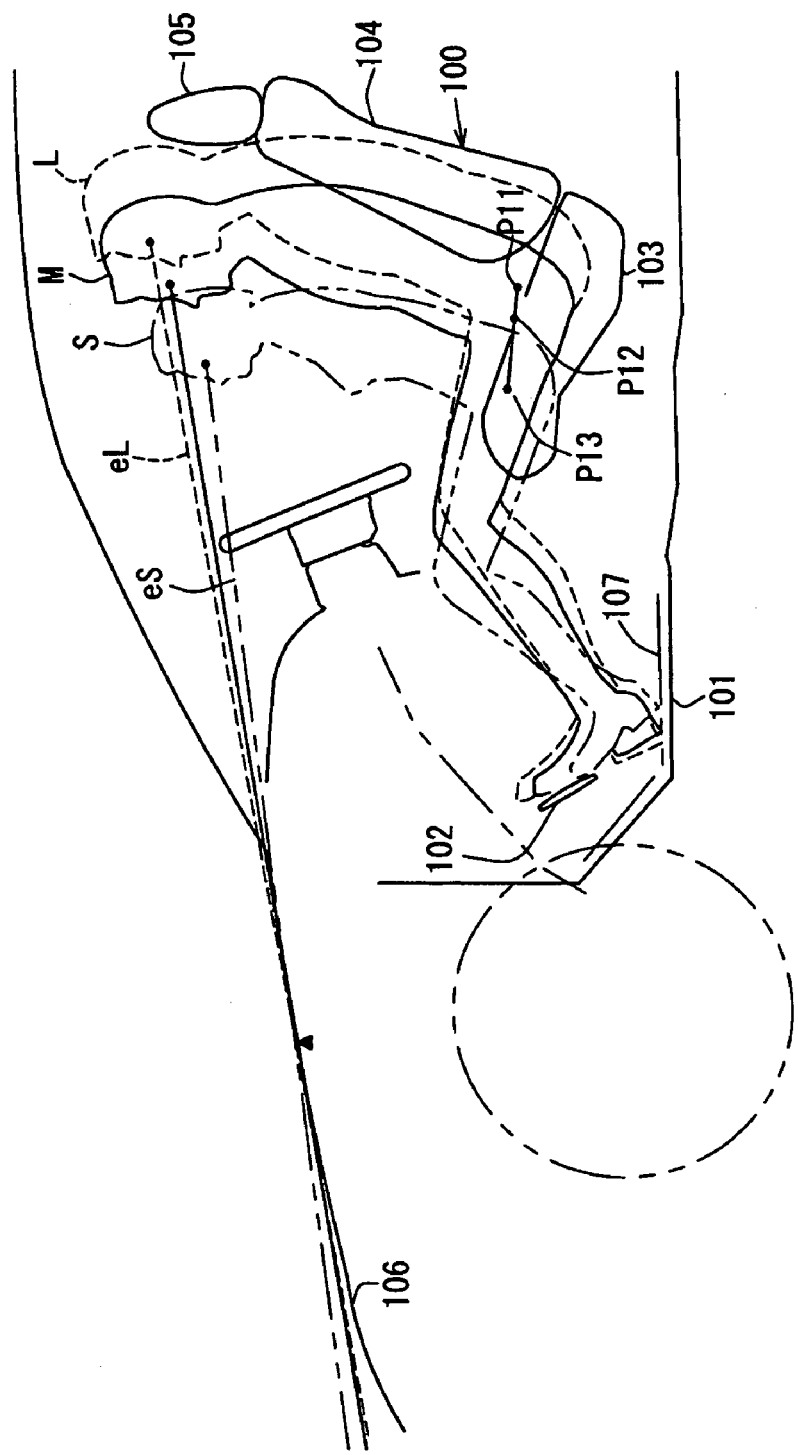
FIG. 37 is a side view showing a problem of a conventional vehicle.
Figure 38:
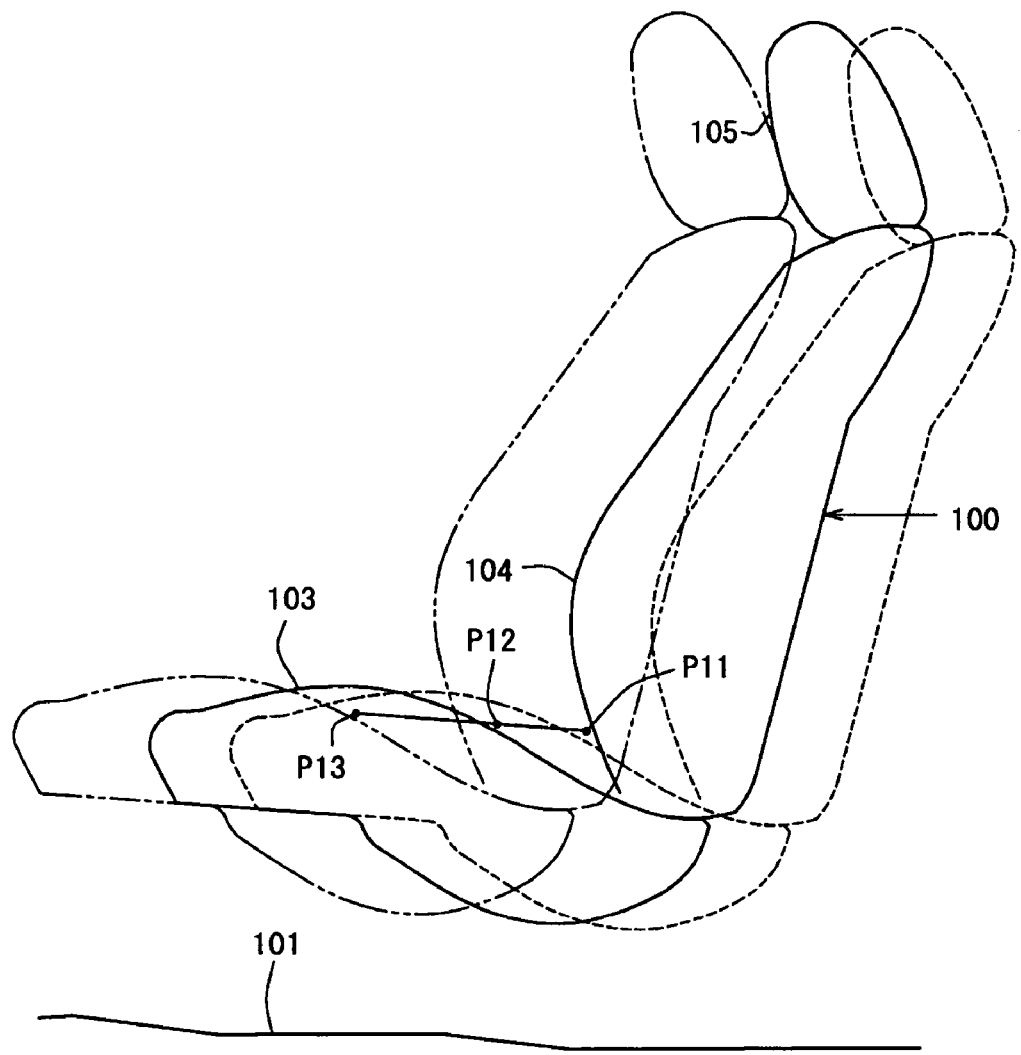
FIG. 38 is a side view showing a conventional seat adjustment of a vehicle.
Figure 39:
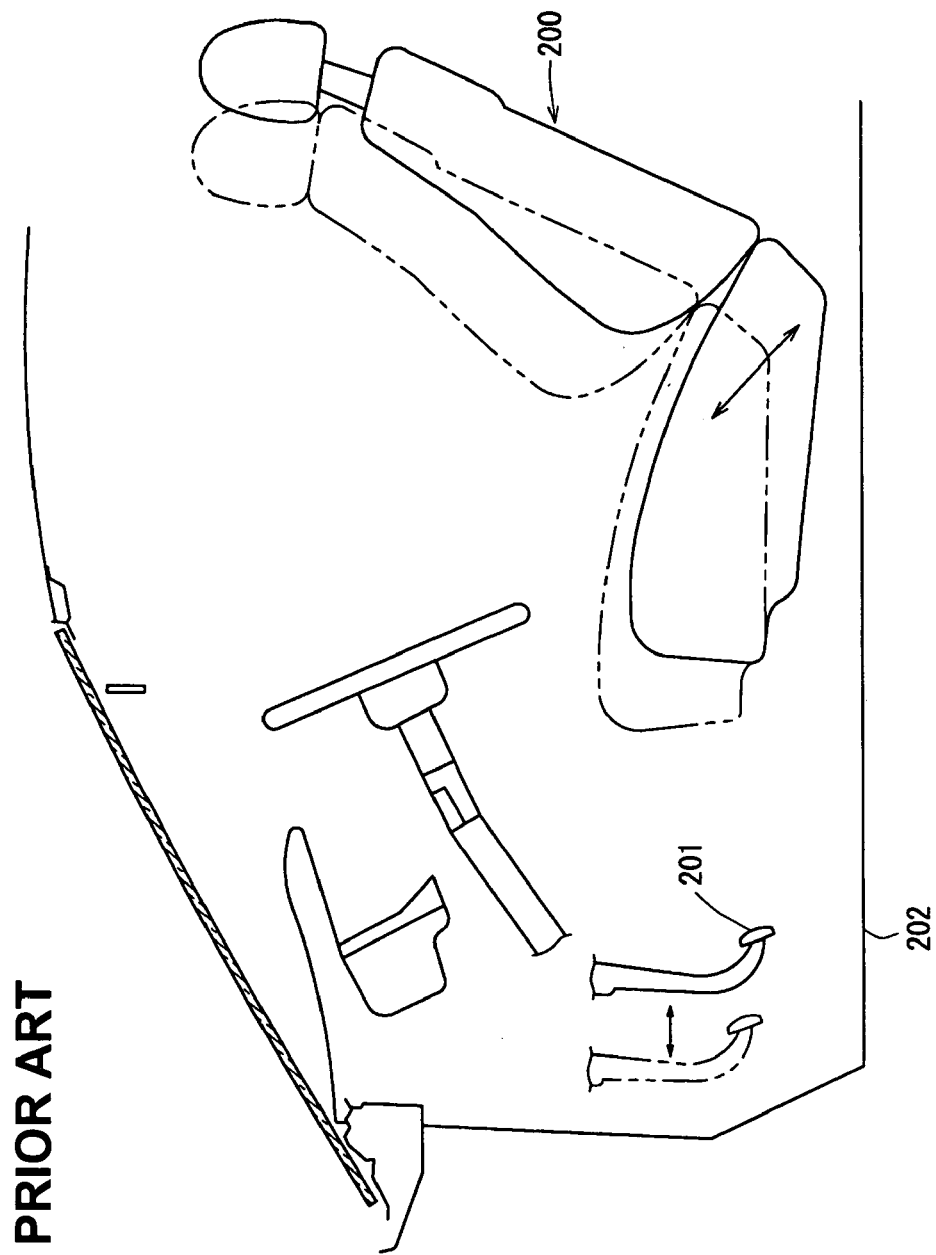
FIG. 39 is a side view showing a conventional driver driving position adjusting device of a vehicle.

FIG. 36 shows another embodiment of the driver driving position adjusting device of a vehicle. In the previous embodiment, the pinion 26 (or worm) in the gearbox 22 at the seat positioning adjusting device 17 is manually driven by the lever 23 fixed to the gear 24. In the embodiment shown in FIG. 36, however, the pinion 26 and the worm are driven by the motor (reversible motor) 90, and there is provided a switch box 91 at the seat frame 16, which comprises a first switch (switch for rotating the motor in the certain direction) 92 and a second switch (switch for rotating the motor in the reverse direction) 93.

In other words, the first and second switches 92 and 93 for driving the motor and the flexible shafts 29, 29A, 29B and 29C constitute the electrically-operated driving position adjusting operating device operative to operate the seat position adjusting device 17, the movable floor panel adjusting mechanism 30, the pedal position adjusting devices 42 and 42B, and the steering position adjusting device 162.

Since this electrically-operated driving position adjusting operating device also performs substantially the same functions and effects as those of the previous embodiment, the same parts shown in FIG. 36 as those shown in FIG. 30 are denoted by the same reference characters and detailed description on them are omitted here.

Herein, the present invention should not limited to the above-described embodiments, but any other modifications and improvements may be applied within the scope of a sprit of the present invention. For example, the above-described devices may be, of course, applied to a MT (mechanical transmission type) vehicle equipped with the accelerator, brake and clutch pedals.

What is claimed is:

1. A driver driving position adjusting device of a vehicle, comprising:
   a floor panel position adjusting device operative to adjust at least a vertical position of a floor panel on which a leg portion of a driver operating a pedal is placed;
   an adjusting device comprising at least a seat position adjusting device operative to adjust a seat face position of a driver seat including a seat cushion and a seat back; and
   a driving position adjusting operating device operative to operate said floor panel position adjusting device and the seat position adjusting device of said adjusting device,
   wherein said seat position adjusting device comprises a pair of support links that are provided so as to support the driver seat in such a manner that a front-located link of the support links pivotally supports a font portion of the driver seat and a rear-located link of the support links pivotally supports a rear portion of the driver seat, and said seat position adjusting device is operative to adjust a height and an angle of the seat cushion of the driver seat by changing an inclination angle of the support links so that the seat face position of the driver seat can be adjusted.

2. The driver driving position adjusting device of a vehicle of claim 1, wherein:
   said adjusting device further comprises a pedal position adjusting device operative to adjust an operating angle of the pedal operated by the leg portion of the driver;
   said driving position adjusting operating device is operative to adjust the seat, pedal and floor panel such that the driver is moved along a specified arc having a center thereof which corresponds to a rotational center of the pedal under a state where a specified driver position is maintained, and is operative to operate said floor panel position adjusting device and said pedal position adjusting device such that the devices are adjusted together with a specified relationship; and
   said seat position adjusting device is operative to adjust the angle, a longitudinal position and a vertical position of the seat cushion of the driver seat so that the seat face position of the driver seat can be adjusted.

3. The driver driving position adjusting device of a vehicle of claim 1, wherein said adjusting device further comprises a pedal position adjusting device operative to adjust an operating angle of the pedal to be operated by a leg portion of the driver, there is provided another driving position adjusting operating device operative to operate said floor panel position adjusting device and the pedal position adjusting device of said adjusting device, and
   wherein the floor panel and the pedal are adjusted so that an angle therebetween has substantially the same value regardless of positions thereof.

4. A driver driving position adjusting device of a vehicle, comprising:
   a floor panel position adjusting device operative to adjust at least a vertical position of a floor panel on which a leg portion of a driver operating a pedal is placed;
   an adjusting device operative to adjust at least one of a seat face position of a driver seat including a seat cushion and a seat back, an operating angle of the pedal to be operated by the leg portion of the driver, and a position of a steering; and a driving position adjusting operating device operative to operate said floor panel position adjusting device and said adjusting device, wherein said floor panel position adjusting device is operative to adjust the vertical position and a panel angle of the floor panel.

5. The driver driving position adjusting device of a vehicle of claim 4, wherein said adjusting device comprises a pedal position adjusting device operative to adjust at least the operating angle of the pedal to be operated by the leg portion of the driver, and said driving position adjusting operating device is operative to operate said floor panel position adjusting device and said pedal position adjusting device.

6. The driver driving position adjusting device of a vehicle of claim 4, wherein said adjusting device comprises a steering position adjusting device operative to adjust the position of the steering, and said driving position adjusting operating device is operative to operate said floor panel position adjusting device and said steering position adjusting device.

7. The driver driving position adjusting device of a vehicle of claim 4, wherein said adjusting device comprises a seat position adjusting device operative to adjust the seat face position of the driver, and said driving position adjusting operating device is operative to operate said floor panel position adjusting device and said seat position adjusting device.

8. The driver driving position adjusting device of a vehicle of claim 4, wherein:

said adjusting device comprises a seat position adjusting device operative to adjust the seat face position of the driver seat and a pedal position adjusting device operative to adjust the operating angle of the pedal operated by the leg portion of the driver; and said driving position adjusting operating device is operative to adjust the seat, pedal and floor panel such that the driver is moved along a specified arc having a center thereof which corresponds to a rotational center of the pedal under a state where a specified driver position is maintained, and is operative to operate said floor panel position adjusting device and said pedal position adjusting device such that the devices are adjusted together with a specified relationship.

9. The driver driving position adjusting device of a vehicle of claim 4, wherein the panel angle of the floor panel is adjusted so as to change from a front-high and rear-low position to a front-low and rear-high position when the floor panel is moved upward from a lower position.

10. The driver driving position adjusting device of a vehicle of claim 4, wherein said adjusting device further comprises a pedal position adjusting device operative to adjust an operating angle of the pedal to be operated by a leg portion of the driver, there is provided another driving position adjusting operating device operative to operate said floor panel position adjusting device and the pedal position adjusting device of said adjusting device, and wherein the floor panel and the pedal are adjusted so that an angle therebetween has substantially the same value regardless of positions thereof.

11. A driver driving position adjusting device of a vehicle, comprising:

a floor panel position adjusting device operative to adjust at least a vertical position of a floor panel on which a leg portion of a driver operating a pedal is placed;

an adjusting device comprising at least a seal position adjusting device operative to adjust a seat face position of a driver seat including a seat cushion and a seat back; and a driving position adjusting operating device operative to operate said floor panel position adjusting device and the seat position adjusting device of said adjusting device, wherein the floor panel adjusted by said floor panel position adjusting device is moved upward when the seat adjusted by said seat position adjusting device is moved forward and upward.

12. The driver driving position adjusting device of a vehicle of claim 11, wherein said adjusting device further comprises a pedal position adjusting device operative to adjust an operating angle of the pedal operated by the leg portion of the driver, said driving position adjusting operating device is operative to adjust the seat, pedal and floor panel such that the driver is moved along a specified arc having a center thereof which corresponds to a rotational center of the pedal under a state where a specified driver position is maintained, and is operative to operate said floor panel position adjusting device and said pedal position adjusting device such that the devices are adjusted together with a specified relationship, and a position of the floor panel is adjusted by said floor panel position adjusting device in relation to the seat position adjustment of said seat position adjusting device.

13. The driver driving position adjusting device of a vehicle of claim 11, wherein said adjusting device further comprises a steering position adjusting device operative to adjust a position of the steering, and said driving position adjusting operating device is operative to operate said floor panel position adjusting device and said adjusting device.

14. A driver driving position adjusting device of a vehicle, comprising:

a floor panel position adjusting device operative to adjust at least a vertical position of a floor panel on which a leg portion of a driver operating a pedal is placed;

an adjusting device comprising a seat position adjusting device operative to adjust a seat face position of a driver seat and a pedal position adjusting device operative to adjust an operating angle of the pedal to be operated by a leg portion of the driver; and a driving position adjusting operating device operative to operate said floor panel position adjusting device and said adjusting device, wherein a position of the pedal is adjusted by said pedal position adjusting device in relation to a seat position adjustment of said seat position adjusting device, and the pedal adjusted by said pedal position adjusting device is moved toward the driver when the seat adjusted by said seat position adjusting device is moved forward and upward from a rear and lower position thereof.

15. The driver driving position adjusting device of a vehicle of claim 14, wherein said driving position adjusting operating device is operative to adjust the seat, pedal and floor panel such that the driver is moved along a specified arc having a center thereof which corresponds to a rotational center of the pedal under a state where a specified driver position is maintained, and is operative to operate said floor panel position adjusting device and said pedal position adjusting device such that the devices are adjusted together with a specified relationship.

16. A driver driving position adjusting device of a vehicle, comprising:

a floor panel position adjusting device operative to adjust at least a vertical position of a floor panel on which a leg portion of a driver operating a pedal is placed;

an adjusting device comprising at least a steering position adjusting device operative to adjust a position of a steering, the steering position adjusting device being configured to move the steering around a rotational center provided at a lower portion of a steering shaft of the steering; and a driving position adjusting operating device operative to operate said floor panel position adjusting device and the steering position adjusting device of said adjusting device, wherein said driving position adjusting operating device operative operates the floor panel position adjusting device and the steering position adjusting device such that the floor panel adjusted by said floor panel position adjusting device is moved upward from a lower position thereof when a steering wheel of the steering adjusted by said steering position adjusting device is moved upward and forward.

17. A driver driving position adjusting device of a vehicle, comprising:

a floor panel position adjusting device operative to adjust at least a vertical position of a floor panel on which a leg portion of a driver operating a pedal is placed;

an adjusting device comprising at least a seat position adjusting device operative to adjust a seat face position of a driver seat including a seat cushion and a seat back; and a driving position adjusting operating device operative to operate said floor panel position adjusting device and the seat position adjusting device of said adjusting device, wherein said seat position adjusting device is operative to adjust a height and an angle of the seat cushion of the driver seat so that the seat face position of the driver seat can be adjusted, and the angle of the seat cushion of the driver seat is adjusted so as to change from a front-high and rear-low position toward a horizontal position when the driver seat is moved forward and upward.

18. A driver driving position adjusting device of a vehicle comprising:

a floor panel position adjusting device operative to adjust at least a vertical position of a floor panel on which a leg portion of a driver operating a pedal is placed;

an adjusting device comprising at least a pedal position adjusting device operative to adjust an operating angle of the pedal to be operated by a leg portion of the driver; and a driving position adjusting operating device operative to operate said floor panel position adjusting device and the pedal position adjusting device of said adjusting device, wherein the pedal adjusted by said pedal position adjusting device is moved toward the driver when the floor panel adjusted by said floor panel position adjusting device is moved upward from a lower position thereof, said adjusting device further comprises a seat position adjusting device operative to adjust a seat face position of the driver seat; and said driving position adjusting operating device is operative to adjust the seat, pedal and floor panel such that the driver is moved along a specified arc having a center thereof which corresponds to a rotational center of the pedal under a state where a specified driver position is maintained, and is operative to operate said floor panel position adjusting device and said pedal position adjusting device such that the devices are adjusted together with a specified relationship.

* * * * *